(12) United States Patent
Kushler et al.

(10) Patent No.: US 7,382,358 B2
(45) Date of Patent: Jun. 3, 2008

(54) SYSTEM AND METHOD FOR CONTINUOUS STROKE WORD-BASED TEXT INPUT

(75) Inventors: Clifford A. Kushler, Lynnwood, WA (US); Randal J. Marsden, Edmonton (CA)

(73) Assignee: Forword Input, Inc., Lynnwood, WA (US)

( * ) Notice: Subject to any disclaimer, the term of this patent is extended or adjusted under 35 U.S.C. 154(b) by 78 days.

(21) Appl. No.: 11/533,714

(22) Filed: Sep. 20, 2006

(65) Prior Publication Data

US 2007/0040813 A1    Feb. 22, 2007

Related U.S. Application Data

(63) Continuation-in-part of application No. 10/346,366, filed on Jan. 16, 2003, now Pat. No. 7,098,896, which is a continuation-in-part of application No. 10/710,575, filed on Jul. 21, 2004.

(60) Provisional application No. 60/718,984, filed on Sep. 20, 2005, provisional application No. 60/806,522, filed on Jul. 3, 2006.

(51) Int. Cl.
*G09G 5/00*    (2006.01)

(52) U.S. Cl. .................... 345/168; 345/169; 345/173

(58) Field of Classification Search ........ 345/168–179; 715/773, 863, 864; 178/18.01–18.07, 19.01–19.06
See application file for complete search history.

(56) References Cited

U.S. PATENT DOCUMENTS

| | | | | |
|---|---|---|---|---|
| 5,574,482 A | * | 11/1996 | Niemeier | 345/173 |
| 5,748,512 A | * | 5/1998 | Vargas | 708/142 |
| 6,008,799 A | | 12/1999 | Van Kleeck | |

OTHER PUBLICATIONS

Illium Software InScribe; Fast, Accurate, Easy Text Entry Input International Characters; illiumsoft.com; Apr. 19, 2007.
Illium Software; Mobile Computing; illiumsoft.com; Apr. 19, 2007.
Illium Software Go Inside; Sliding In Text with InScribe; illiumsoft.com; Apr. 19, 2007.
Illium Software InScribe; CE Reviews; winecity.com; Apr. 19, 2007.

* cited by examiner

*Primary Examiner*—Vijay Shankar
(74) *Attorney, Agent, or Firm*—Black Lowe & Graham PLLC

(57) ABSTRACT

The disclosed System enables word-level text entry on a small displayed keyboard by tracing an input path that begins on or near the key of the first letter, passes through or near the key of each letter in sequence, and terminates in the vicinity of the key of the last letter. The input path is processed by scoring it against words in a database that includes an indication of relative frequency. A correctly spelled word is output even when the input path corresponds to an incorrect spelling of a word. Words are ranked according to a score calculated from the weighted distances from each associated key to determined input path points, further weighted by the frequency of use and by other characteristics of the input path. Alternate word choices are presented to the user in a manner to minimize distraction. Efficient editing mechanisms and other enhancements are included.

59 Claims, 26 Drawing Sheets

SYSTEM AND METHOD FOR CONTINUOUS STROKE WORD-BASED TEXT INPUT

PRIORITY CLAIM

The application is a continuation-in-part of U.S. patent application Ser. No. 10/710,575 filed on Jul. 21, 2004 and entitled "System and Methods for Continuous Stroke Word-Based Text Input" which, itself, is a continuation-in-part of the application of the same name, filed on Jan. 16, 2003, and having U.S. patent application Ser. No. 10/346,366; this application claims priority as well from U.S. Provisional Patent Application Ser. No. 60/718,984 entitled "Double Tap, Automatic Edit and Return of the Cursor to the Previous Position" and filed on Sep. 20, 2005 as well as U.S. Provisional Patent Application Ser. No. 60/806,522 entitled "Portable Computer Device" and filed on Jul. 3, 2006.

FIELD OF THE INVENTION

The invention relates to a text input system and, more specifically, to a text input system where words are entered by tracing a continuous path on a displayed keyboard, such as a touch screen text input system.

BACKGROUND OF THE INVENTION

The origin of the modern keyboard as the primary method for inputting text from a human to a machine dates back to early typewriters in the 19th century. As computers were developed, it was a natural evolution to adapt the typewriter keyboard to use as the primary method for inputting text. For a skilled typist, it has remained the fastest way possible to input text into the computer.

With ongoing efforts to make computers smaller and more portable, the physical keyboard has become one of the most significant limiting factors in just how small a device can become: the physical size of the human finger is not something computer designers could change. As a result, computers for certain portable applications have been designed without a physical keyboard, and use touch-screen based input methods as the primary form of human-computer interface. (This is also the case for some applications where people are physically unable to use a keyboard, such as persons with physical disabilities.)

Input methods that are designed for portable touch-screen based devices have two primary requirements that frequently conflict with each other. The method of input must be as fast as possible and at the same time the method of input must take as little of the display screen as possible. Unfortunately, as the space taken up for input on the display screen is decreased, it becomes difficult to increase speed without adversely affecting accuracy.

In spite of a recent surge in the market for pen-based computing devices, many people who must generate text still do so with a standard keyboard. To date, pen-based computing has not replaced conventional portable laptop computers as was originally forecast, for the simple reason that text input on pen-based computers is too slow. Other devices sacrifice half of the area of the face of the device in order to include a "thumb" keyboard with miniature keys that are difficult to use, time-consuming, and error-prone. At the same time, such an approach means that the area relegated to a physical keyboard can no longer be used to provide a much larger display with correspondingly more efficient and enjoyable access to information.

Analogous to one-finger typing, the current state-of-the art for inputting using a virtual keyboard is called "point and tap". A stylus is moved from letter to letter and a "tap" is performed by contacting the screen on the desired key to select it. This results in the need to constantly lift the stylus from the screen and set back down again, significantly slowing input. Cursive handwriting was invented to allow a better (and faster) flow from letter to letter and reduce the number of pen (or quill) lifts. In a similar way, the current invention reduces the number of taps required when inputting using an on-screen keyboard, thus speeding text entry.

The natural way for a human to create text on anything other than a machine is to "write" it by hand, so it is not surprising that handwriting recognition software has been developed to allow a user to enter text by writing on the screen of the computer. However natural, handwriting is slow. Each letter requires several strokes of the stylus, making it very inefficient. Further, with varying handwriting styles, accuracy of this software is still below user-acceptance levels (see MacKenzie, I. S., & Chang, L. (1999), A performance comparison of two handwriting recognizers. Interacting with Computers, 11, 283-297.). As mentioned above, the reliance on the use of "digital ink" by even the "latest and greatest" of computer touch-screen technology, the Tablet PC, provides clear evidence that handwriting recognition is still not good enough to satisfy most users. Furthermore, even if a completely accurate method of handwriting recognition were available, handwriting itself is simply too slow and tiring to provide a satisfactory input method (especially on a touch-screen, which does not provide the same "feel" as a pen on actual paper).

There are two large shortcomings of on-screen keyboards: first they take up valuable screen space on the computer needed for whatever task is requiring text input. Second, and more importantly, they are slow because the user is forced to tap one letter at a time—effectively reducing the user to input text in a way that is analogous to single finger typing on a regular physical keyboard.

Another factor in slowing text entry on touch-screen keyboards was the time it takes to lift the stylus from the screen and then bring it back down between each key selection ("tapping"). This is a fundamental problem in that, particularly for devices that must utilize touch-screen keyboards that are reduced in size, the additional actions of lifting the stylus and bringing it back into contact with the screen in a controlled manner drastically slow down the input process. In addition, there is a need for an input system that is generally able to determine and produce the correctly spelled word intended by the user even when the user enters an erroneous gesture (where the user made one or more errors in the attempt to enter a correctly shaped gesture for the intended word) or an incorrect gesture (where the user's conception of the spelling of the intended word is incorrect—for example, entering a gesture corresponding to the key sequence "freind" in order to input the word that is actually spelled "friend").

The present invention allows rapid gestural input of virtually every word, with the very rare exception of a word not yet present in the lexical database of the system, which therefore must be entered once by tapping each letter in order to add it to the database. To maximize the user's potential for rapid text entry, the system needs to accommodate a wide variety of errors in the entry of word input gestures ("input paths") and still determine and produce the correctly spelled word intended by the user. Erroneous input paths are an almost inevitable result of any text input system, as each user will tend to try to input text faster and faster, until an unacceptable number of errors limits the effective rate of text entry. The robustness of the present invention with respect to erroneous and incorrect input paths is an important characteristic of the present system that allows much faster entry of input paths since there is a greatly reduced need for precision. There is also a need to accommodate errors caused by "the environment"—for example, such as trying to use a touch-screen device in a moving car, where the stylus may bounce unintentionally off of the touch-screen while trying to enter text. There is also a need to facilitate simple and rapid recovery from misrecognition errors, where the intended word was identified by the system but a different word was actually output due to having a higher priority. Finally, to accommodate greater speed in the entry of gestures, there is a need to allow the user to be less precise in entering gestures without sacrificing the ability to consistently interpret the user's gestures in such a way that they are correctly matched with the intended word. This includes a need for the system to be able to frequently identify a correctly spelled word from an input path corresponding to an incorrect spelling of the word, as well as the need to accommodate a wide variety of path tracing errors including inadvertent gross errors in entering a path for an intended word.

It is also relevant to consider that, in contrast to the usual expectations for new hardware technology, handheld touch-screen devices are in some instances being developed with slower rather than faster processors. This is particularly true for touch-screen devices that are also cellular phones, as it is very important to create phone devices that extend the battery life as long as possible on a single charge, and slower processors help in that regard. Thus, it is very important to create a system that uses the most efficient means possible to identify the intended word as often as possible given these constrained resources. Furthermore, mass-market devices such as touch-screen cellular phones are designed to be able to be produced as cheaply as possible, which also tends to put a premium on the use of memory resources by applications which target these devices, so that minimizing the size of such applications (and in particular the databases required for such applications) is another critical goal.

The present invention solves all of the above problems. As described below, the various aspects of the present invention combine to yield an unexpected result—that visually guided gesturing with reference to a displayed virtual keyboard is far faster than tapping, and can be used to enter words from a vocabulary that is large enough (for example, over 60,000 words in one implementation of a system for the English language) that the user only needs to resort to tapping to enter an unusual name or word the first time that word is entered using the system. This initial entry of a new word can reasonably be viewed as a process that is outside the normal text entry method, since once such a word has been tapped in it is then known to the system and can thereafter be entered using gesturing. The present invention, however, also includes aspects with respect to the tapping of words that improve upon anything known in the prior art. And, as will be shown in the following description, the present system allows the user to easily enter distinct words that "collide" because they otherwise map to the same basic gesture, or input path. Also importantly, the method presented can be implemented such that the processing resources and memory required are within acceptable limits for virtually all of the handheld touch-screen devices being developed.

SUMMARY OF THE INVENTION

The method of the present invention is distinguished by a number of characteristics: 1) each word is input using one continuous motion in contacting a virtual keyboard on a screen, significantly reducing the number of controlled movements that must be executed to input each word; 2) a the sequence of keys associated with the letters of a potential word candidate from a database is matched to the path of the contact action such that each such matched key need only be within a determined threshold distance from the matched path location; 3) the sequence of keys associated with the letters of a potential word candidate may be matched with points along the path of the contact action in an order other than the order in which the associated letters occur in the spelling of the word candidate; 4) one or more keys of the sequence of keys associated with the letters of a potential word candidate may be left unmatched with any point along the path of the contact action; and 5) candidate words associated with relatively higher levels of frequency of use may be entered with relatively higher levels of imprecision. This significantly increases text entry speed. The approach used allows the input path contact action to exhibit an overall "average" level of imprecision (that can be adjusted by varying the determined matching threshold distance) with respect to the intended candidate word, as well as to exhibit one or more instances of "extraordinary" imprecision. Since, in general, when input path contact actions are performed at higher and higher rates of speed they tend to be entered with less and less precision, this enables a user of the system to perform input path contact actions at significantly higher speeds.

The present invention uses word-level analysis to match the input path traced out on the keyboard with the most likely word or words in the system's database. The user is presented with a list of the identified matching words, and can either accept the default choice (the word identified by the system as being the most likely match), or select one of the alternate word choices or request the system to display further potentially matching words if the desired word does not appear in the list. When the system determines that the likelihood that the default choice is in fact the user's intended word is sufficiently greater than the likelihood of the second-most-likely word, then the default word is output without displaying a list of alternate word choices. Other aspects of the system provide feedback to the user in such a way as to minimize the necessity to distract the user from the task of composing and entering text.

A further advantage is obtained for the present invention through the insight that, due to the effect of practice, a user of the system will naturally tend to trace out paths more quickly for words with which the user is more familiar (which tend to be generally higher-frequency words). Conversely, when the user is entering a word that is unfamiliar, seldom used, or of whose spelling the user is unsure, the input path will tend to be traced out at a slower speed. This relationship can be used to change a number of the parameters used in carrying out the analysis of the input path itself and the subsequent comparison of the analyzed path with potentially matching words in the database.

The present invention provides a keyboard text entry system that is well-suited for devices with touch-sensitive input panels or touch-sensitive display screens. The user enters a word by tracing out a continuous path that starts near the first letter of the word, passes within a threshold distance of each letter of the word in sequence, and ends when the last letter of the word is reached. However, the system also accommodates a variety of path tracing errors, such that the user's intended word is still correctly recognized when the path does not pass within a threshold distance of one or more letters of the word, or when the path passes within a threshold distance of one or more letters of the word in a sequence other than the sequence of the letters in the correct spelling of the word.

The keyboard may be displayed on a touch-sensitive display screen (hereinafter referred to as a touch-screen) and the user contacts the display by means of a stylus. It should be understood, however, that the system can be applied to any system where the user can trace out a continuous path on a displayed keyboard, for example, a touch-sensitive screen that is contacted with the user's finger, or even a standard computer display monitor (not a touch-sensitive screen) where the point of "contact" is the location of an on-screen cursor whose location on the display is controlled by a mouse (or equivalent positional control device) and where the acts of "contacting" and "breaking contact with" the screen are indicated by closing and opening a switch (or performing some other equivalent control action, such as "dwelling" near a location without moving the mouse for a period of time longer than a selected threshold). In another embodiment, the beginning and end of each input path is indicated gesturally as a feature of each input path, for example, by starting with the displayed cursor above the area defined by the displayed keyboard, and moving the cursor down into the keyboard area to the vicinity of the first letter of an intended word to begin an input path, then moving the cursor back up above the keyboard area once the cursor has been moved to the vicinity of the final key of the intended word. Other approaches include the use of other positional control devices such as joysticks, eye-gaze control systems, etc., to control the movement of the displayed cursor over the keyboard.

The operation of the system will be described with reference to an aspect comprising a touch-screen contacted by a stylus, but this should not be construed as limiting the scope of the invention, but simply as a means to provide illustrations of some of the present aspects of this method. The method simply processes a user-generated stream of location data, which begin at a known point (in the touch-screen model, the point where the stylus first contacts the screen), proceed through a sequence of two-dimensional data point locations which have a known relationship to a defined virtual keyboard area in the same two-dimensional space (in the touch-screen model, the sequence of points detected where the stylus is moved while in contact with the screen), and which end at a known point (in the touch-screen model, the point where the stylus last contacts the screen). In certain embodiments, the times when the data points are generated, or equivalently for these embodiments, the time intervals between the data points, are also processed, and can also be provided by various equivalent technologies.

The term "letter" in the context of the present invention is to be understood to include any character that appears in the spelling of one or more words of the database. The term "word" in the context of the present invention is to be understood to include any sequence of characters that is stored in the database that can be matched against an input path and output as text. Thus, for example, if the word "can't" is among the words in the database of the system, it is possible to enter the word by tracing out a path that starts near the letter "c," passes through or near the letters "a" and "n," then through or near the key associated with the apostrophe, and ends near the letter "t." Similarly, hyphenated words, alphanumeric words, and other words containing special characters can all be included in the database and entered as text using the system of the present invention, providing that each of the characters used in the database is associated with at least one key on the keyboard. Alternatively, in another embodiment, words such as "can't" may be entered without tracing the path through or near the key associated with the apostrophe, since there has been an observed tendency for some users to enter such words in that fashion.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
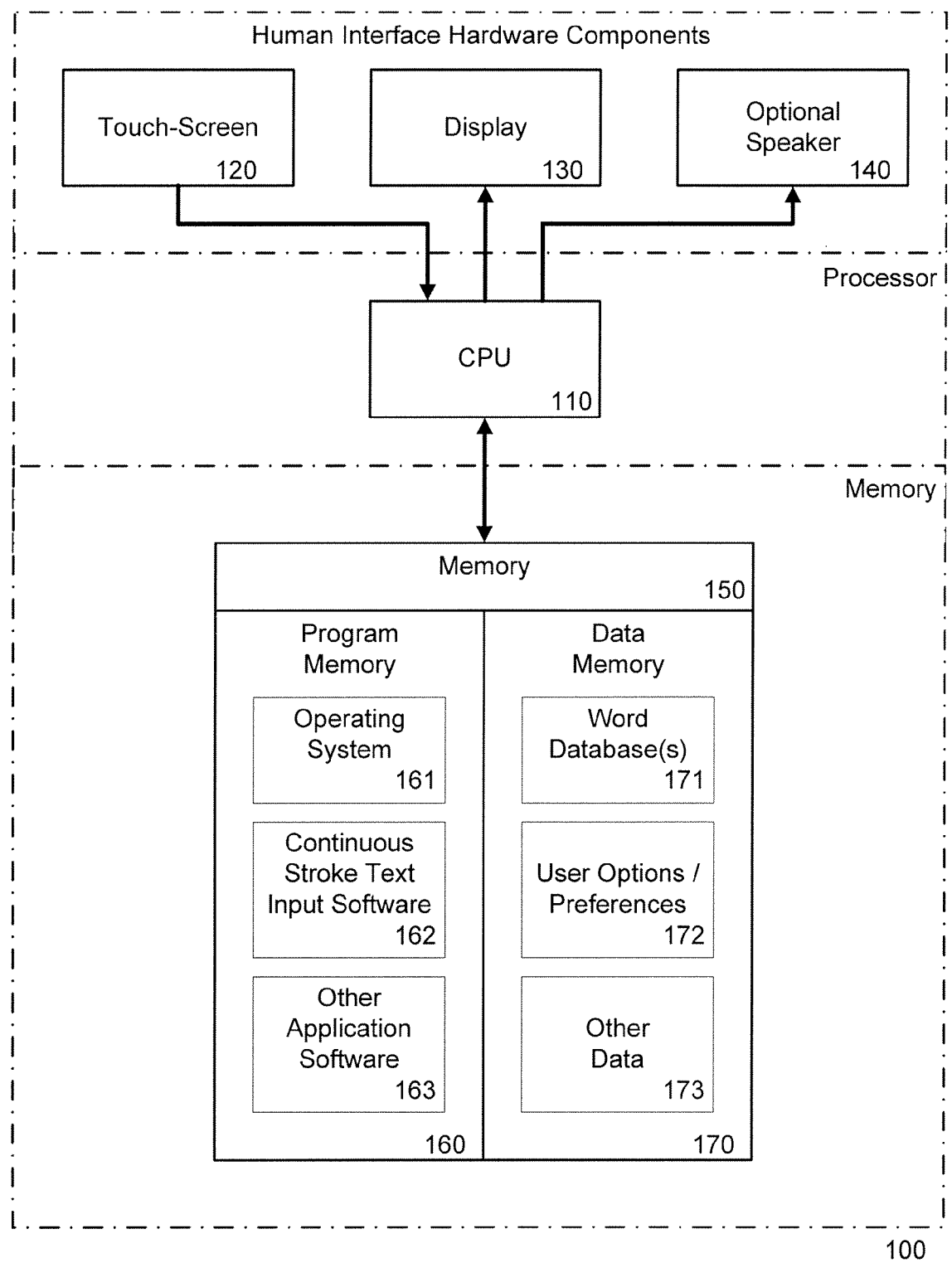
FIG. 1 is a hardware block diagram showing the typical hardware components of a system which embodies the method of the present invention such as that shown in FIGS. 2A through 2E.

FIG. 1 shows a simplified block diagram of the hardware components of a typical device 100 in which the System and Method for Continuous Stroke Word-Based Text Input is implemented. The device 100 includes a touch-screen 120 provides input to the CPU (processor) 110 notifying it of contact events when the screen is touched, typically mediated by a hardware controller that interprets the raw signals received from the touch-screen and communicates the information to the CPU 110 using a known communication protocol via an available data port. Similarly, the CPU 110 communicates with a hardware controller for a display 130 to draw on the display 130. Optionally a speaker 140 is also coupled to the processor so that any appropriate auditory signals can be passed on to the user as guidance (predominantly for error signals). The processor 110 has access to a memory 150, which may include a combination of temporary and/or permanent storage, and both read-only and writable memory (random access memory or RAM), read-only memory (ROM), writable non-volatile memory such as FLASH memory, hard drives, floppy disks, and so forth. The memory 150 includes program memory 160 that contains all programs and software such as an operating system 161, a Continuous Stroke Word-Based Text Input software 162, and any other application programs 163. The memory 150 also includes data memory 170 that includes the word database(s) 171 required by the Continuous Stroke Word-Based Text Input software 162, storage for maintaining a record of user options and preferences 172, and any other data 173 required by any element of the device 100.

In one aspect, the input path analysis component determines the sequence of first and second order differences (corresponding to rates of change) of the x- and y-coordinates of the sequence of points in the input path. The ratio of the x and y first order differences corresponds to the "slope" of the input path at each point, such that the second order difference corresponds to the rate of change in the slope. A second order difference hovering near zero corresponds to a segment of the input path that is a relatively straight line. A small, relatively constant second order difference indicates a constant rate of change in the slope corresponding to a segment of the input path that has a slight, constant curvature. A sharp peak or rapid change in the second order difference corresponds to a relatively sharp change in direction of the input path. In another aspect, since the magnitude of the first and second order differences is also a function of the frequency with which contact location data points are sampled and collected by the operating system as well as the speed at which the user is moving the point of contact, the first and second order differences at each point along the input path are calculated with respect to two points at a fixed distance preceding and following the given point along the input path. In another aspect, to simplify computational requirements, this fixed distance is approximated by a fixed sum of the absolute magnitude of the x- and y-first order differences.

In yet another aspect, when the system detects that the input path has crossed over itself in a loop (as in the entry of a small circle in the entry of a DoubleLetter gesture, as defined below), the magnitude of the fixed distance used is reduced to approximately the radius of the loop, and the magnitude of the second order difference calculated is scaled according to the ratio of the standard fixed distance to the reduced fixed distance used.

In another aspect, the input path analysis component identifies different types of inflection points in the input path. For example, PenDown, the location where the stylus first makes contact with the touch-screen, PenUp, the location where the stylus breaks contact with the touch-screen, AngleThreshold, a location where there is a significant change in the direction of the input path, and TAP, a location where the stylus is more or less immediately lifted after contacting the screen, corresponding to a case of a one-letter word or the selection of a single function key. In one embodiment, the AngleThreshold inflection point is identified at a location where the sum of the absolute magnitudes of the x and y second order differences reaches a local maximum, having exceeded a pre-determined minimum threshold.

In another aspect, an additional type of inflection point is defined which corresponds to a location where the stylus paused in the trajectory of the input path for more than a determined threshold time interval (a PauseThreshold inflection point). In another aspect, more than one type of PauseThreshold inflection point is defined based on two or more distinct threshold time intervals. In another aspect, an additional type of inflection point is defined which corresponds to an AngleThreshold inflection point where it is also determined that the stylus paused in the trajectory of the input path for more than a determined threshold time interval within a determined distance along the input path from the location determined for the AngleThreshold inflection point (a PauseAngle inflection point). In other aspects, the distance calculated between a key matched to an inflection point is adjusted according to various characteristics of the input path in the neighborhood of the matched point as well as the preceding and following keys of the word and the input path points to which these keys are matched.

In another aspect, an additional type of inflection point is defined which corresponds to a predetermined type of stylus movement, or gesture, that the user can execute to indicate entry of a double letter (DoubleLetter) to distinguish between the entry of the words such as "feel" and "fell," and to increase the likelihood of correct recognition of a word with a double letter when the input path is entered quickly (and less precisely). When a DoubleLetter inflection point type is included, a distinguishable movement is performed at or near the key associated with the letter "e" in the case of the word "feel," but at or near the key associated with the letter "l" in the case of the word "fell," enabling the system to distinguish between the input paths for the two words. In another aspect, the movement associated with a DoubleLetter inflection point type is a relatively small circular motion of the stylus at or near the location of the key associated with the letter to be doubled. The location of a DoubleLetter inflection point is defined as the center of the relatively small circular gesture traced by the user. In another aspect, each successive additional repetition of the movement associated with a DoubleLetter inflection point denotes an additional occurrence of the letter in the word being entered. For example, the word "AAA" would be entered by contacting the screen at or near the key associated with the letter "a," executing two small circles with the stylus, and lifting the stylus from the touch-screen.

In another aspect of the system, an alternate gesture is recognized by the system to indicate the user's expectation that a key that occurs twice in succession in the word being entered is located in the neighborhood of where the gesture is performed. This alternate gesture consists of making a back-and-forth movement on or near the key that is expected to occur twice in succession, such that at least two Angle inflection points are created within a predetermined threshold distance of each other (hereafter referred to as a "Scribble" gesture). In another aspect, the path segments that connect the inflection points that are included in the Scribble gesture are required to be path segments that do not differ by more than a predefined threshold from being horizontal. In another aspect, one or more scoring penalties are associated with the use of the Scribble gesture in order to help distinguish its use and allow it to be used without having a significant negative impact on correctly recognizing words for which all or part of the input path could also resemble a Scribble gesture (e.g. the word "there" where the path from the "h" to the "e"-"r"-"e" creates two successive adjacent Angle inflection points on or near the last three keys, immediately prior to the inflection point at the final path location. Without appropriate penalties, this input path would often be mistakenly analyzed as a path that most likely corresponds to the word "three." In one aspect, an additional penalty is assessed when the inflection points included in a Scribble gesture (i.e. that are determined by the matching algorithm to match a repeated key in a candidate word) include either the Pen Down inflection point (the initial point of stylus contact) or the Pen Up inflection point (the final point of stylus contact). In another aspect, an additional penalty is assessed when there are only a total of two inflection points included in a Scribble gesture. In another aspect, an additional penalty is assessed when there are only a total of two or three inflection points included in the entire input path that includes the Scribble gesture. These penalties combine, for example, such that a short left-to-right path that happens to be drawn starting just to the left of the letter "e" and continuing until just to the right of the letter "e" (as a path intended to enter the word "we") is not incorrectly interpreted to correspond to a word "ee." In another aspect, there is a penalty assessed for any use of a Scribble gesture to match a repeated key. In another aspect, the penalty assessed for the use of a Scribble gesture to match a repeated key is applied only one time in a given word (e.g. if the Scribble gesture is entered three times in an input path for the word "addressee", this penalty is still only assessed one time). This allows users who prefer the Scribble gesture to use it successfully in longer words and words containing more than one repeated key. In shorter words, the back-and-forth movement of the Scribble gesture may have to be repeated more than two or three times in order to avoid confusion with other short words (as in the "there" vs. "three" example above).

In another aspect, a scoring metric function is calculated as a measure of how well a given word matches an input path, where in general, a lower matching metric value indicates a better match with the input path. In one aspect, the scoring metric is calculated as the sum of the distances from the identified inflection points to the keys associated with the letters with which the inflection points are matched, plus the distances to any additional letters that are matched to points along input path segments between successive inflection points, where each distance is measured from the key to the nearest point along the input path as described above. In another aspect, the scoring metric function is calculated as the sum of the squares of these distances. In another aspect, prior to calculating the sum, a weighting function is applied to each distance (or squared distance) where the weight applied to each distance is determined according to the type of inflection point from which the distance was measured. In order to normalize the results so that the metric can be used to meaningfully compare results between words with differing numbers of letters, the weighted sum is divided by the sum of the weighting factors used in calculating the sum. The different weighting factors used for the various inflection point types reflect the differing expected levels of confidence that an inflection point of the given type has been accurately located and that in fact the detected inflection point reflects a relatively higher probability that a letter of the word being input should be located nearby.

In another aspect of the system, a letter of a word being scored may also be matched to a point lying along a path segment between two detected inflection points (a "segment match"). Separately or in combination, the aspects of identifying the point of matching according to the location of the second difference local maximum, and of adjusting the weighting applied to a match according to the length ratio and/or the value of the second difference local maximum allow the user to enter input paths in an intuitive and flexible manner. In another aspect, the distance measured from a key to a corresponding matched point on the input path is adjusted according to various characteristics of the input path in the neighborhood of the matched point as well as the preceding and following keys of the word and the input path points to which these keys are matched. These aspects create a continuum of gestural variation that enable the user to enter an input path that is determined by the system to match the keys corresponding to the letters of the intended word without having to enter the path so carefully that a distinct inflection point is created corresponding to each letter.

In another related aspect, in calculating the scoring metric for a word, for each successive letter of the word, the distance of the letter-key from the path point with which it is matched is adjusted by a factor that is a function of a variety of measurable aspects of the input path, the particular points with which the letter-keys of a word are matched, and the relationships between these matched path points and the locations of the matched letter-keys themselves. This approach provides useful results because it enables each locally calculated matching score to be influenced by aspects of the input path that extend, to a greater or lesser extent, beyond the local neighborhood of the matched locations, in a way that reflects the likelihood that the input path truly corresponds to the word being scored.

In another aspect, the context in which a word is to be input is used in combination with a language model to modify the frequencies associated with words in the database. In one approach to language modeling, words in the database include an indication of the word's part of speech (noun, verb, adjective, etc.). A model of the syntax of the language of the words in the database (e.g. English) is used to analyze the sequence of words input by the user. At a minimum, this model takes into account only the word previously output. The language model provides information that certain classes of words (or certain specific words) are more likely or less likely to follow the preceding output word. The frequency information stored with each word provides information as to how frequently each word tends to be used irrespective of context. The information provided by the language model then modifies the frequency associated with a word in the context determined by one or more preceding words. In another approach to language modeling, the database includes information about common word collocations—pairs of words wherein one word tends to follow the other. In another embodiment, to limit the size of the database, language modeling information is added only for pairs of words with similar "ideal" input paths (i.e. words that correspond to similar sequences of key locations so that error-free input paths for both words would closely resemble each other). The language modeling information helps to determine which of the words with similar ideal input paths is more likely in the contexts modeled. In another aspect, language modeling information is added only for pairs of words with similar ideal input paths when both words exceed a minimum threshold frequency.

The frequency information stored with a word in the database provides an indication of how frequently the word tends to be encountered in general usage. In another aspect, the frequency information associated with a word in a particular user's database is modified in accordance with the specific usage of that word by that user.

In another aspect, the frequency associated with words in the database is adjusted to differ in one or more cases from the actual frequency with which the word is encountered in general usage. This is done by further lowering the frequency associated with lower frequency words that have ideal input paths that are similar to the ideal input path of a high-frequency word. This improves the likelihood that a high-frequency word will, with high probability, be identified as the most likely matching word when the user tries to enter an input path corresponding to the high-frequency word. In another aspect, when the potentially conflicting word is a very low frequency word, or is determined to have an ideal input path that is particularly close to the ideal input path of a high-frequency word, the word may be eliminated from the database. In one embodiment, an ideal input path is created by automatically drawing the path that connects in sequence the centers of the letter-keys corresponding to the spelling of a high-frequency word. A smoothing process is then applied to this ideal input path so that it more closely resembles an input path that might have been manually drawn with a stylus. This input path is then processed by the system, and lower frequency words in an initial database that receive a numerical score that is within a threshold difference of the numerical score of the high-frequency word itself are re-assigned a lower frequency in a final database. In another embodiment, the input path is then processed by the system such that, in computing the numerical score for other lower frequency words, when the distance measured for a given letter-key of a lower frequency word from the created input path exceeds a given threshold distance, that threshold distance is subtracted from the measured distance before calculating the numerical score. In another embodiment, the threshold distance subtracted from the measured distance is added to the measured distance for the closest letter-key of the high-frequency word in calculating a numerical score for the high-frequency word with which the numerical score of the lower frequency word is to be compared. In yet another embodiment, the threshold distance varies with respect to whether the measured distance is measured in a direction which is essentially perpendicular to a tangent to the input path at the point from which the distance is measured, or whether the distance is measured from one of the endpoints of the input path in a direction which is essentially parallel to the initial or final segment, respectively, of the input path. This approach allows the adjustment of frequencies assigned to potentially competing lower frequency words to account for the wide variety of input paths that may be entered for a given high-frequency word.

In another aspect, the input path analysis component analyzes the input path as the path is being input, so that the path-matching component can begin to identify potentially matching candidate words with little or no delay once the stylus is lifted from the screen. The location at which the screen is first contacted is recorded within the system as the first detected inflection point, and is identified as an inflection point of type PenDown. In the case where the stylus is again lifted from the screen without being moving more than a threshold distance or remaining in contact with the screen for more than a threshold time period, this first inflection point is recorded as a solitary inflection point of type TAP. In an alternate aspect, as contact location data is received from the touch-screen controller, it is immediately processed through a smoothing algorithm to remove any jitter introduced by the touch-screen digitizer. The path data is then used to calculate the first and second difference of the data stream in both the x- and y-coordinate. The stream of second difference data is then passed through a filter to determine when the sum of the absolute magnitudes of the x- and y-second differences exceeds any of the one or more thresholds determined for an inflection point of type AngleThreshold. Each time any such threshold is exceeded, an inflection point of type AngleThreshold is identified at the contact location determined by the data point at which sum of the absolute magnitudes of the second differences attains its maximum value prior to once again falling below the exceeded threshold. When the stylus is finally lifted from the touch-screen, the location at which the screen is last contacted is recorded within the system as the last detected inflection point, and is identified as an inflection point of type PenUp.

After the input path analysis component identifies the inflection points associated with an input path, the path-matching component examines the words stored in the system database to determine which words are the most likely matching candidates. While the aspect described herein is a simple and computationally efficient method to identify which words of a database best match an input path, it is to be understood that other alternative approaches could achieve this goal, and should not be considered to be outside the scope of the present invention. In another aspect, the words in the database are organized in a fashion to conserve the amount of storage required while also facilitating efficient searching by the path-matching component.

Another characteristic of the input path that can be easily and reliably identified by the input path analysis component is the total length of the path of the input path. The length of the input path cannot be reliably associated with the length of a word in terms of the number of letters in the word, since a word could have a small number of widely separated letters (e.g. "ape") or a larger number of closely spaced letters (e.g. "deceased"). However, the average expected length for each word is easily calculated for any given keyboard layout and on-screen configuration. In an alternate aspect, the expected path length for a word is calculated as the sum of the distances between the centers of the keys associated with the letters of the word in sequence. In the example of the word "ape," this would be the sum of the distance from the "a" key to the "p" key, plus the distance from the "p" key to the "e" key. Since the expected path length is only an approximation of what to expect from an actual input path for a given word, in another aspect, the range of expected path lengths associated with the words of a database are divided up into a relatively small number of ranges, each such range being associated with a class of words whose expected path length falls into that range. The expected input path length class associated with each word can then be stored along with the word without significantly increasing the size of the database, or alternatively, words in the database can be stored in groups according to expected input path length class. In either case, the number of words that need to be examined in detail by the path-matching component is greatly reduced since the actual length of the input path as measured by the input path analysis component is used by the path-matching component to simply pass over words belonging to an expected input path length class that is significantly different. In an alternate aspect, the word selection component calculates a running average of the ratio of the actual measured length of the input path to the expected input path length class of the word selected for output, and the path-matching component uses this ratio to determine which expected input path length classes will be examined for a given measured input path length.

In another aspect, the distance from the input path to any potentially matching letter-key is compared to a maximum matching threshold distance, such that whenever a letter-key is found to lie further from any possible matching point in the input path than this threshold distance, the word is eliminated as a possible candidate. In one embodiment, this serves to speed up the evaluation process, since as soon as the path-matching algorithm identifies a letter of a word that is outside the threshold distance from any possible matching point on the input path, the algorithm immediately proceeds to evaluate the next candidate word. In another embodiment, this approach is used to identify the number and type of instances where a candidate word fails to match an input path, such that these instances form the basis of assessing a penalty in determining the scoring metric value that reflects how closely the word is determined to match the input path. In this and in other embodiments disclosed elsewhere, each maximum matching threshold distance used is a function of the object from which the distance is measured (for example, different types of inflection points, or points that lie on path segments between detected inflection points), and may be further modified from any default value as a function of other parametric characteristics of the input path (for example, the average pen speed). Thus, as used in this disclosure, the phrase "maximum matching threshold distance" or "a predetermined maximum matching threshold distance" does not in general refer to a single, unique value, but is specific to each particular instance in which it is applied.

In another aspect, when the system determines that the stylus has been moved with a greater than average speed in the course of entering an input path, then the input path can be even less precise, in proportion to the increase in stylus speed. In one embodiment, this is achieved by increasing the maximum matching threshold distance between a point on the input path and the letter-key of the word with which the input path point is matched. This threshold distance is adjusted for all points of the path in proportion to the average stylus speed along the entire input path, or in another embodiment, it is adjusted separately for each point that is matched with a letter-key of a word based on the average stylus speed in the neighborhood of the matched point. Similarly, a greater than average stylus speed in the course of inputting a word results in a proportionately greater preference toward matching words of higher frequency. In a similar line of reasoning, to the extent that the entered input path is longer and/or has a higher than average number of inflection points detected, then the input path can be proportionately less precise, since the more letters there are in the intended word the less likely the input path will closely match any other word. Thus, in another aspect, the amount by which the letter-to-path threshold distances are increased is a function of the total length of the input path. In another aspect, the amount by which the letter-to-path threshold distances are increased is a function of the number of inflection points identified in the input path. In another aspect, when the scoring metric for the most-closely-matching word falls below a determined threshold, then the letter-to-path maximum allowable threshold distances are increased, and the database of potentially matching words is searched again using these larger letter-to-path threshold distances.

In another aspect, when the distance from a determined inflection point of the input path to the next corresponding letter-key of a word is greater than the determined maximum matching threshold distance, the word is retained as a word candidate and a scoring penalty is applied to the word that is used in computing the scoring metric for the word (hereinafter, the "skipping penalty" since the inflection point is "skipped" in the matching process for the word). In another aspect, an additive skipping penalty is assessed against the word being scored by adding a determined weighted penalty amount to the sum of the weighted distances of the letter-keys of the word from the path points with which they are matched in calculating the scoring metric for the word. In another aspect, a multiplicative skipping penalty is assessed against a word being scored by increasing a determined multiplicative penalty factor by which the sum of the weighted distances of the letter-keys of the word from the path points with which they are matched is multiplied when calculating the scoring metric for the word. This skipping penalty approach enables the system in a significant number of cases to correctly identify the intended word despite significant errors on the part of the user in entering the input path.

In another aspect, skipping penalties are also assessed when a letter-key of a word is greater than the determined maximum matching threshold distance from any potentially corresponding point of the input path (hereinafter, a "letter-skipping penalty"). This corresponds to a letter-omission spelling error in tracing out the input path for an intended word. In an aspect analogous to that for inflection point skipping penalties, an additive letter-skipping penalty (or, in the case of a letter substitution, an additive letter-substitution penalty) is assessed against the word being scored. In another aspect, a multiplicative letter-skipping penalty (or, in the case of a letter substitution, a multiplicative letter-substitution penalty) is assessed against the word being scored by increasing a determined multiplicative penalty factor by which the sum of the weighted distances of the letter-keys of the word from the path points with which they are matched is multiplied when calculating the scoring metric for the word. In another aspect, a multiplicative letter-transposition penalty is assessed against the word being scored by increasing a determined multiplicative penalty factor by which the sum of the weighted distances of the letter-keys of the word from the path points with which they are matched is multiplied when calculating the scoring metric for the word.

In another aspect, the method used to determine the distance of a letter-key from certain types on inflection points is adjusted to accommodate the commonly observed tendency of many users to "overshoot" an intended letter in tracing out an input path. In another aspect, the location determined as the final point of the input path is adjusted from the actual final data point received from the touch-screen digitizer to accommodate certain types of erroneous or misleading data commonly received at the point at which the stylus is lifted from the touch-screen.

In another aspect, when an inflection point is detected that follows by less than a determined threshold distance along the input path from an immediately preceding inflection point, the following inflection point is not recorded and is treated as an "ordinary" path point. This approach accommodates a tendency common among many users where the stylus is occasionally moved in an erratic manner when the direction of movement is significantly changed, or immediately after first making contact with the touch-screen. It also accommodates the user by making it possible to indicate the location of a desired letter along an otherwise relatively straight portion of the input path by moving the stylus in a small "zig-zag" motion on or near the location of the intended letter-key. This approach is advantageous since, with a small amount of practice, such a zig-zag motion can be executed more quickly than a pause, and thus can be used to more rapidly enter an input path that is intended to correspond to a lower-frequency word for which the input path would otherwise closely match the ideal input path for a higher frequency word. As in the previously mentioned example, where the words "pot," "pit," "put" and "pout" all correspond to a straight-line path from "p" to "t," and where "pout" is the lowest frequency word of this group, the user can easily enter the word "pout" by contacting the touch-screen near the letter-key for 'p' and making a small zig-zag motion near both the 'o' and 'u' before lifting the stylus near the 't'.

In another aspect, words in the database also include an indication of the frequency of use associated with the word. The frequency of use associated with a word is then combined with the weighted sum of distances in calculating the scoring metric whose value is used to determine the relative ranking of potentially matching candidate words.

In another aspect, one or more of the words identified as the most likely candidates by the path-matching component are offered to the user for selection by a word selection component. In one aspect, a predetermined number of the most likely candidates, for example, four, are displayed in a word choice list from which the user can select the intended word for insertion into the text being composed. In another aspect, if the user makes no explicit selection of a candidate word from the word choice list, when a subsequent input action is taken (for example, the user begins to trace out a next input path or an explicit character is selected for output), the default word choice (the word deemed to be the most likely candidate) is automatically accepted for insertion into the text being composed. In another aspect, when no action is taken by the user for a threshold period of time following the display of a word choice list, the default word choice is automatically accepted for insertion into the text being composed.

In another aspect, a single tap on the keyboard is recognized by the input path analysis component as an inflection point of type TAP. The path-matching component processes an inflection point of type TAP by first determining a default letter associated with the key within whose boundaries the location of the tap contact occurred (the "tap location letter"). As the user proceeds to continue tapping the keyboard, then the sequence of taps generates a word object at the text insertion point comprised of the tap location letters concatenated in the sequence that the corresponding keys are tapped (the "tap location word"). In another aspect, if this word is not deleted from the output text being generated by the user before typing a space or proceeding to trace out an input path to input a next word, if the word is not already present in the database it is automatically added to a user word list of words added by this user to the database of words initially present in the system.

In many languages, a variety of alternate forms of certain letters are commonly used, generally consisting of letters with various diacritic marks. For example, depending on the language, other forms of the letter "e" that are commonly used include the letters "è," "é," "ê," and "ë" (other forms are also possible—this is simply an illustrative example). Most on-screen keyboards require the user to select a special alternate mode to display one or more alternate keyboards from which the desired alternate letter form must be selected. In the present invention, such alternate letter forms are handled in three distinct and advantageous ways. First, each alternate form of a letter that is used in the language (or languages) of the words in the database is associated with the same key with which the base form of the letter is associated ("e" in the current example). Since the information specifying which alternate forms of letters are used in the spelling of words is included in the database, the user is able to enter such words with alternate letter forms just as words without alternate letter forms are entered—that is, simply by tracing out an input path that passes through or near the sequence of keys associated with the base forms of all the letters in the word. In a case where two words are present in the database corresponding to exactly the same sequence of keys (i.e. words that are identical except for the occurrence of one or more alternate letter forms), these words will generally both be added to the word choice list, with the word having a higher frequency of use appearing higher in the word choice list.

The second manner in which alternate letter forms are handled in an advantageous way is in the entry of new words composed of a sequence of tap location letters. In the present invention, the user does not need to select an alternate keyboard in order to explicitly select an alternate letter form to spell out a new word that is not present in the database. In another aspect, alternate letter forms can be selected by contacting the key with which the base form of the letter is associated and maintaining contact with the key (without sliding off of it) for a period of time exceeding a predetermined threshold length of time. Once the threshold time period is exceeded, a "pop-up list" of the alternate letter forms associated with the key is displayed, at which time the user can slide the point of contact to the desired alternate form of the letter in the list, lifting the stylus to select the alternate form as the tap location letter. Alternatively, once the "pop-up list" of alternative letter forms is displayed, the stylus is lifted from the screen and then used to tap the desired alternate letter form to select it from the displayed list. This alternate letter form is then added as usual to the tap location word, enabling the user to easily create any desired sequence of letters in spelling a new word, including alternate letter forms, without having to change the mode of the keyboard. The third manner in which alternate letter forms are handled in an advantageous way is described below, wherein a first and second default letter-form are defined for a letter-key.

In another aspect of the invention, the keyboard layout is modified to enhance the system's ability to distinguish between input paths that might otherwise be more difficult to distinguish. Due to its familiarity to the vast majority of users, the standard "QWERTY" keyboard arrangement is by most users. A disadvantage of this layout is the proximity of the vowels "u," "i," and "o." In another aspect, additional "inactive" areas are defined within the layout of the keyboard, effectively increasing the separation between the centers of certain otherwise adjacent keys, such that when the user attempts to quickly position the stylus near one of the keys, there is on average a greater distance from the stylus position to the other key. In another aspect, the pairs of letter-keys between which inactive areas are placed in a virtual keyboard used for a particular target language is determined by analyzing the frequency of word pairs in the database for the target language which are identical with respect to the sequence of letter-keys with which each word of the pair is associated except for pairs of adjacent ("interchangeable") letter-keys. In another aspect, the keyboard layout is further modified to enhance the system's ability to correctly analyze input paths by stretching the keyboard in the vertical direction.

Figure 2A:
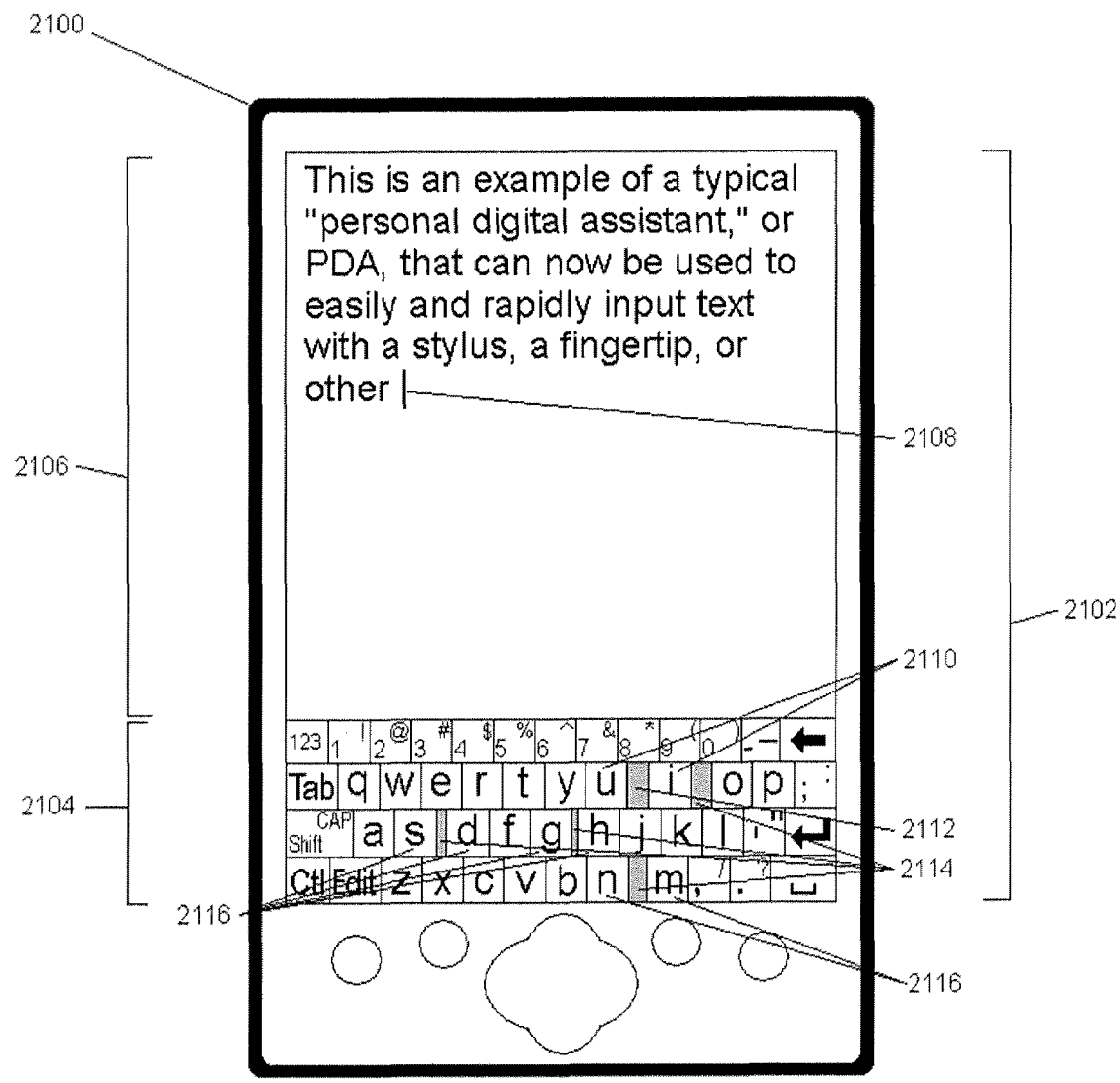
FIG. 2A is a schematic view of an embodiment of a portable computer with a touch-screen display on which a keyboard system of the present invention is displayed.

In one aspect of the invention, the keyboard layout is modified to enhance the system's ability to distinguish between input paths that might otherwise be more difficult to distinguish. Due to its familiarity to the vast majority of users, the standard "QWERTY" keyboard arrangement is preferred by most users. A disadvantage of this layout is the proximity of the vowels "u," "i," and "o." Since the system is designed to allow the user to be imprecise in tracing out an input path, and since these vowels are often interchangeable in otherwise identical words (e.g. "hut," "hit," and "hot"), the proximity of these vowels in the standard "QWERTY" arrangement gives rise to a significant proportion of the incidence of failure to offer the user's intended word as the default choice. In another aspect, additional "inactive" areas are defined within the layout of the keyboard, effectively increasing the separation between the centers of the three adjacent vowel keys, and as a result making it easier for the user to quickly position the stylus relatively nearer to the intended letter of the three. While these unlabeled key areas are referred to as "inactive," this is only in the sense that a tap which occurs precisely within such an inactive keyboard area elicits no response from the system. Otherwise, the system still processes any input path points that lie within such an inactive area in exactly the same manner as input path points that fall anywhere else within the virtual keyboard. By keeping the each of the virtual keys at approximately the same size, the user is still encouraged to aim for the center of the key area associated with any letter. This helps to maximize the benefit of inserting inactive areas between keys that are most likely to be interchangeable in otherwise identical word contexts. Since confusion between the "u" and the "y", or between the "o" and the "p" is not a significant concern, it is not necessary to also insert inactive areas between these keys. Similarly, the adjacent consonant pairs "s-d," "g-h" and "n-m," are often interchangeable, or are interchangeable in one or more pairs of words which are both frequently used words (for example, "has" and "had"), and in another aspect, inactive areas are placed between one or more of these virtual key pairs to increase the separation between the centers of these keys. The preceding examples all relate to a virtual keyboard and corresponding database for the English language. In another aspect, the location of each displayed text character key ("letter-key") is defined by the screen coordinates of the center of the key, which is the location used when determining the distance of the letter associated with the key from any point on the input path. Hereinafter, the expression "letter-key of a word" refers to the letter-key with which a character in the spelling of a word is associated. In another aspect, the pairs of letter-keys between which inactive areas are placed in a virtual keyboard used for a particular target language is determined by analyzing the frequency of word pairs in the database for the target language which are identical with respect to the sequence of letter-keys with which each word of the pair is associated except for pairs of adjacent ("interchangeable") letter-keys. In another aspect, such an analysis is used to design a new keyboard layout in which such pairs of frequently interchangeable letter-keys are positioned so as not to be adjacent, such that the determined layout does not require inactive areas. In another aspect, the analysis is performed to identify pairs of frequently interchangeable letter-keys with respect to a plurality of target languages such that a single layout is designed which tends to minimize such potential adjacent letter-key confusion across the entire set of analyzed languages. In another aspect, each of the languages in the set of target languages analyzed is associated with a weight that is applied to the frequency determined for each pair of letter-keys, such that the potential letter-key confusion identified for a target language with a higher weighting has a greater effect on the final layout determined than the potential letter-key confusion identified for a target language with a lower weighting. FIG. 2A shows a schematic view representative of a typical handheld portable computer 2100 (often called a "personal digital assistant" or PDA) that incorporates on its touch-screen 2102 display a keyboard 2104 designed and used in accordance with the present invention. The keyboard 2104, when used in accordance with the present invention, generates text which is output to the text display region 2106 at a text insertion location 2108. The term "keyboard" in this application refers to any keyboard that is implemented on a touch-sensitive surface, including both a keyboard presented on a touch-sensitive display as in FIG. 2A, and also a keyboard imprinted on a touch-sensitive surface. Keyboard 2104 explicitly shows the 26 letters of the English alphabet on 26 individual keys, arranged in approximately the standard "QWERTY" arrangement found on most keyboards.

In another aspect, the keyboard layout is further modified to enhance the system's ability to correctly analyze input paths by stretching the keyboard in the vertical direction. By increasing the distance between adjacent rows of the keyboard, the user is more easily able to quickly trace out an input path that correctly positions both line segments and inflection points within the actual row of the keyboard that contains the key of the intended letter. This improves the performance of the path-matching component since it greatly reduces confusion between candidate words that differ only in letters that are in adjacent rows (e.g. "hot" and "not"). The scoring metric computation by the path-matching component can then be modified to apply increased weight to the vertical component of the distance between the key of a letter of a candidate word and the location of an inflection point.

In another aspect, distances between the (x, y) coordinates of key locations and inflection points are calculated by first increasing the magnitude of the difference between the y-coordinate values. In one aspect, the value of the difference in y-coordinate values is doubled prior to calculating the distance. In another aspect, this differential weighting of the y-coordinate values in calculating distances is applied only when calculating the distances between key locations and inflection points, and it is not applied when calculating the distances between key locations that are matched to path locations that are on path segments between detected inflection points. In another aspect, this differential weighting of the y-coordinate values in calculating distances is not applied when calculating the distances between key locations in the top alphabetic row of the keyboard (i.e. the second row of a standard "QWERTY" keyboard) and inflection points that are positioned above the vertical midpoint of the top alphabetic row of the keyboard, nor is it applied when calculating the distances between key locations in the bottom row of the keyboard and inflection points that are positioned below the vertical midpoint of the bottom row of the keyboard.

Since very few words (except possibly passwords) tend to include numeric digits from the uppermost "numeric" row of a standard "QWERTY" keyboard, there is no need to additionally penalize the matching score for keys in the top alphabetic row when measured to points above the vertical midpoint of the row. Similarly, there is no need to additionally penalize the matching score for keys in the bottom alphabetic row when measured to points below the vertical midpoint of the row. The only area where finer vertical discrimination is helpful is between the middle alphabetic row and the alphabetic rows above and below it. The current aspect enables the user to "overshoot" above keys in the top row, and below keys in the bottom row without causing a significant negative impact on the matching metric score for a word. This enables the user to be considerably less precise, simply "aiming high" for a key in the top row, and likewise "aiming low" for a key in the bottom row.

In accordance with one embodiment, between certain pairs of keys, such as the "u" and the "i" keys 2110 as shown on keyboard 2104, an "inactive" area 2112 is placed that significantly increases the separation between these two keys in comparison to the separation between other adjacent keys. Other inactive areas are placed between other pairs of adjacent keys associated with letters that occur in pairs of words that are identical save for the substitution of one of these letters for the other. Thus, similarly, and for the same reason, "inactive" areas 2114 are between the "s" and "d" keys, between the "g" and "h" keys, and between the "n" and "m" keys 2116.

Figure 2B:
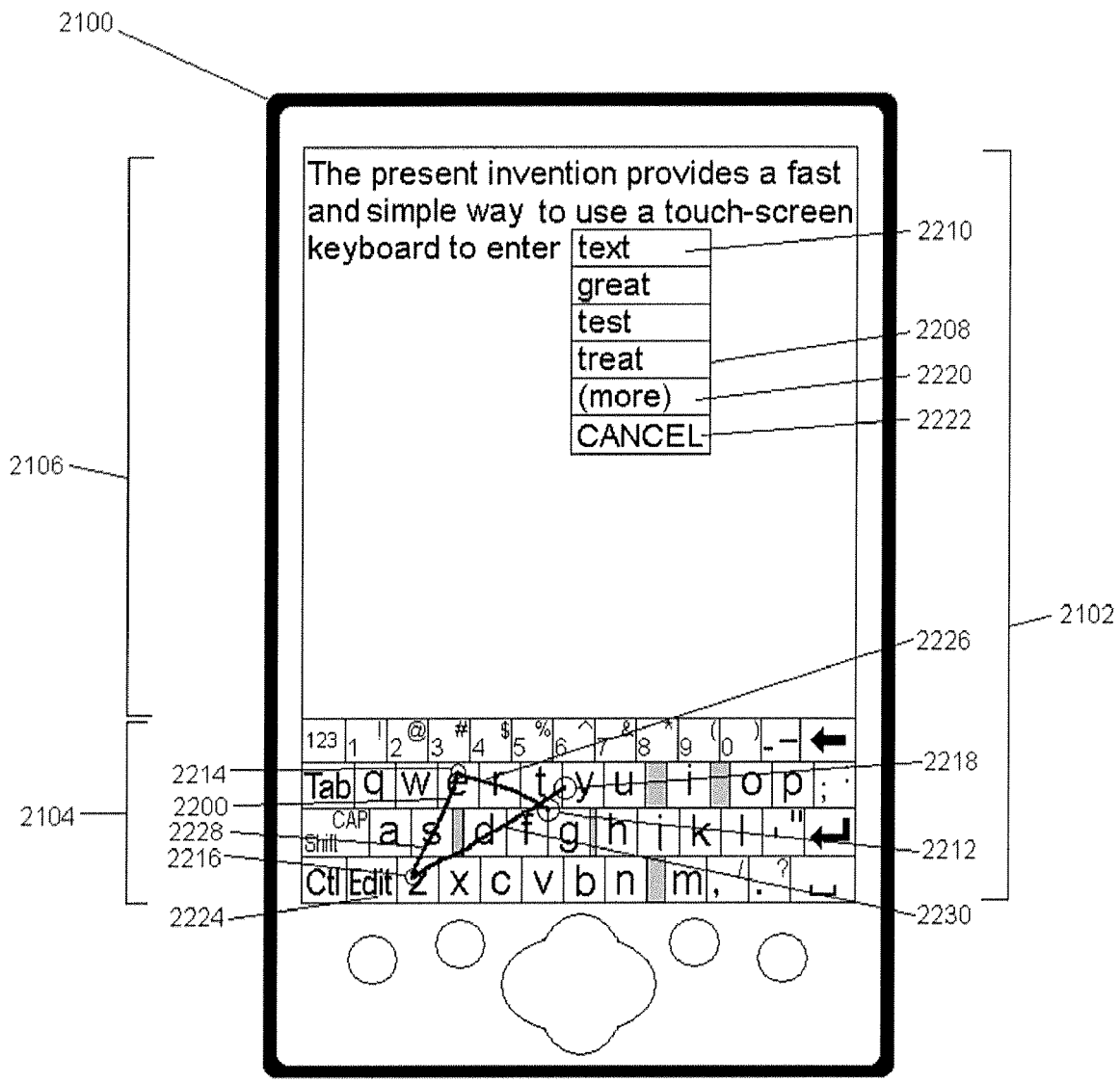
FIG. 2B is the same view showing an embodiment of a word selection list displayed after a user has completed tracing out an input path and has lifted the stylus from the touch-screen.

Text is generated by contacting keyboard 2104 at or near the key associated with the first letter of the word being input, and tracing out a continuous path that passes through or near each letter of the word in sequence, and breaking contact with the touch-screen when the last letter of the word is reached. FIG. 2B shows the same schematic view of the computer 2100, where the path of a representative input path 2200 is shown superimposed on the displayed keyboard 2104. In one embodiment, the user may select as an option whether the path of the input path is in fact literally drawn on the display, and erased when a word is selected from a selection list 2208 displayed in the display region 2106, or when the selection list 2208 is not displayed because the difference in the scoring metric calculated for the most-closely matching and second-most-closely matching words falls below a determined threshold, or when the selection list 2208 is canceled. In the example shown in FIG. 2B, this option is turned on for illustrative purposes. In this example, the user has attempted to enter the word "text," and the system has successfully matched the word "text" as the most likely candidate word so that it is displayed in a default word choice location 2210 in selection list 2208. The path of an input path 2200, as entered by a user using a touch device, such as a stylus pen, starts at an initial contact point 2212, which location is received by the processor and recorded by an input path analysis component that is being executed by the processor as the PenDown inflection point for the input path. In this example, the user moves the stylus so that the path then moves along path segment 2226 first to the region of the letter-key associated with the letter "e," then turns sharply to move along path segment 2228 in a direction that is only approximately toward the region of the letter-key associated with the letter "x," creating an AngleThreshold inflection point that is recognized by the input path analysis component at location 2214. Then, in the vicinity of (though not on) the key associated with the letter "x," the path turns sharply back up toward the letter-key associated with the letter "t," creating a second AngleThreshold inflection point that is recognized by the input path analysis component at location 2216 within the bounds of the letter-key associated with the letter "z.". Finally, after traveling along path segment 2230, the stylus is lifted from the touch-screen at location 2218, which is recorded by the input path analysis component as a PenUp inflection point for the input path. In another embodiment, the selection list 2208 also shows three additional candidate words having the next three highest scoring metric values, which in an example shown in FIG. 2B are the words "great," "test," and "treat." In the embodiment, when a letter of a word lies more or less along a straight path between the preceding and following letters (as in the case of the letter "r" in "great"), there is no need to do anything other than continue the path of the input path through or near the intended letter. Thus, in accordance with another embodiment, in the example of FIG. 2B, although only four inflection points were identified by the input path analysis component, the processor identifies the words "great" and "treat" (which have more than four letters) as potentially matching candidates since the four inflection points identified are within the determined maximum matching threshold distance of the letters "g" (or "t" in the case of "treat"), "e," "a" and "t.".

In another embodiment, the selection list 2208 also includes a "(more)" function 2220, the selection of which causes the processor to identify and display the next four additional candidate words having the highest scoring metric values of the remaining words in the database. In the example of FIG. 2B, although not shown, the next four such candidates are "gear," "year," "rest" and "heart", and would be displayed in selection list 2208 in response to a selection of the "(more)" function 2220. If for any reason the user chooses not to select any word in the displayed selection list 2208, the selection list display can be closed by selecting a "CANCEL" function 2222. In another embodiment, activating a back-space or delete key also cancels a displayed selection list 2208 without selecting any of the displayed words for output.

In yet another embodiment, when the user enters input paths with sufficient precision and finds that the default is virtually always the intended word, the user can choose to turn off the selection list display such that only the default word is displayed at the insertion point. If the user wishes to select a word choice other than the already-output default word, a Re-Edit function key 2224 that is presented in the keyboard 2104 is activated before proceeding in order to display a selection list with alternate word choices. In another embodiment, instead of turning off the selection list display entirely, the user can choose a different value for threshold difference between the scoring metric for the most-closely-matching and the second-most-closely-matching words that must be exceeded to suppress the display of the selection list, so that the selection list is displayed less frequently. Alternatively, in another embodiment, the user can simply choose to reduce the number of word choices displayed in the selection list 2208.

Figure 2C:
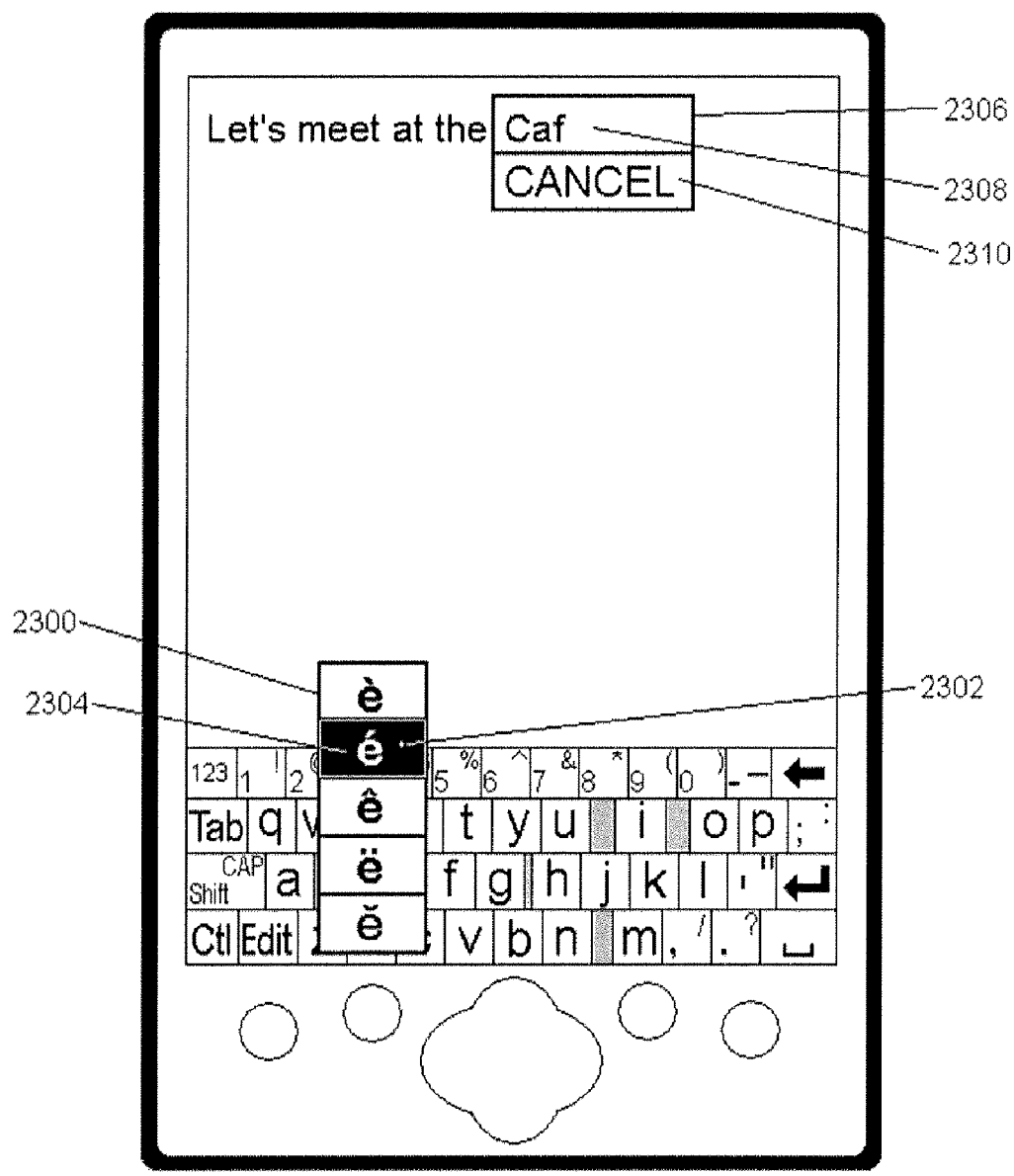
FIG. 2C is the same view showing an embodiment of an alternate letter form pop-up selection list displayed after a user has touched the stylus on the "e" key, and maintained contact with the key past a predetermined time threshold.

In accordance with another embodiment, although not normally displayed explicitly on the keys of keyboard 2104, various alternate letter forms, such as letters with diacritic markings, are associated with each key that is associated with and displays the base form of the letter with alternate forms. In accordance with another embodiment, FIG. 2C shows a "pop-up" menu 2300 of alternate letter forms of the letter "e" that is displayed after a user has touched the stylus on the "e" key, and maintained contact with the key past a predetermined time threshold. In the example shown in FIG. 2C, the user has slid the stylus' point of contact 2302 up to the list row 2304 containing the alternate letter form "é," which is correspondingly highlighted, so that when the user lifts the stylus from the screen, the letter "é" will be explicitly added to the word currently being spelled through conventional "tapping." This embodiment enables a user to explicitly enter alternate forms of letters to spell out words that are not yet present in the system's database, without having to switch to an alternate keyboard layout display. In the example shown in FIG. 2C, the user is in the process of spelling out the word "Café," and has already "tapped" the Shift key, followed by the "c," "a" and "f" keys, creating the TAP location word object "Caf" which appears in a word selection list 2306 at the text insertion point as a default (and only) word object in the list. In another embodiment, the each letter associated with each of a sequence of tapped letter-keys is output directly at the text insertion point such that the TAP location word object (in the current example, "Caf") appears directly in the text being output, so that no selection list is displayed. In this alternate embodiment in which no selection list is displayed, the TAP location word is implicitly selected and no explicit selection action need be performed by the user.

When the user lifts the stylus from the screen at position 2302, the letter "é" will be appended to the TAP location word to form the word "Café," which, in accordance with another embodiment, can be explicitly selected by tapping the selection list 2306 at row 2308, or implicitly selected by proceeding to enter a continuous stroke input path for a next word. Alternatively, the user can cancel the current selection list by selecting the row 2310 associated with the CANCEL function. In the alternate embodiment in which no selection list is displayed, the user can cancel the TAP location word by deleting it from the output text prior to typing a space (or other character which is not allowed as a character within a database word) or entering an input path for a word to follow the TAP location word in the output text. In another preferred embodiment, when the stylus taps on a letter-key and remains in contact with the key past the predetermined time threshold, a menu of the alternate letter forms associated with the letter-key is displayed so that the user can lift the stylus from the letter-key and tap the displayed menu on the desired alternate letter form to select it for output at the text insertion point.

Figure 2D:
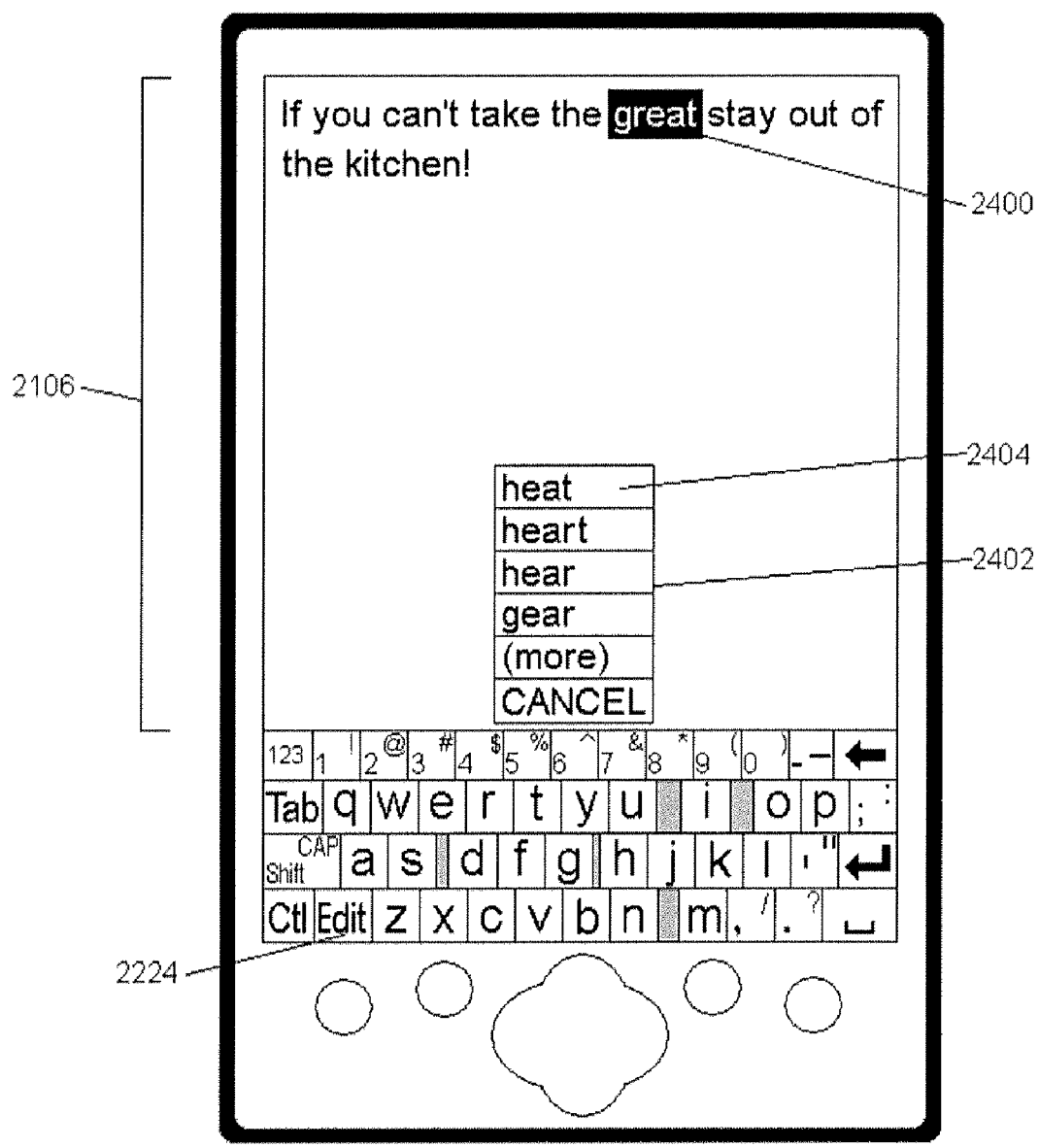
FIG. 2D is the same view showing the result of activating an embodiment of the "Re-Edit" function that assists the user in correcting a previously output word when the user failed to select the intended word from the word selection list.
Figure 2E:
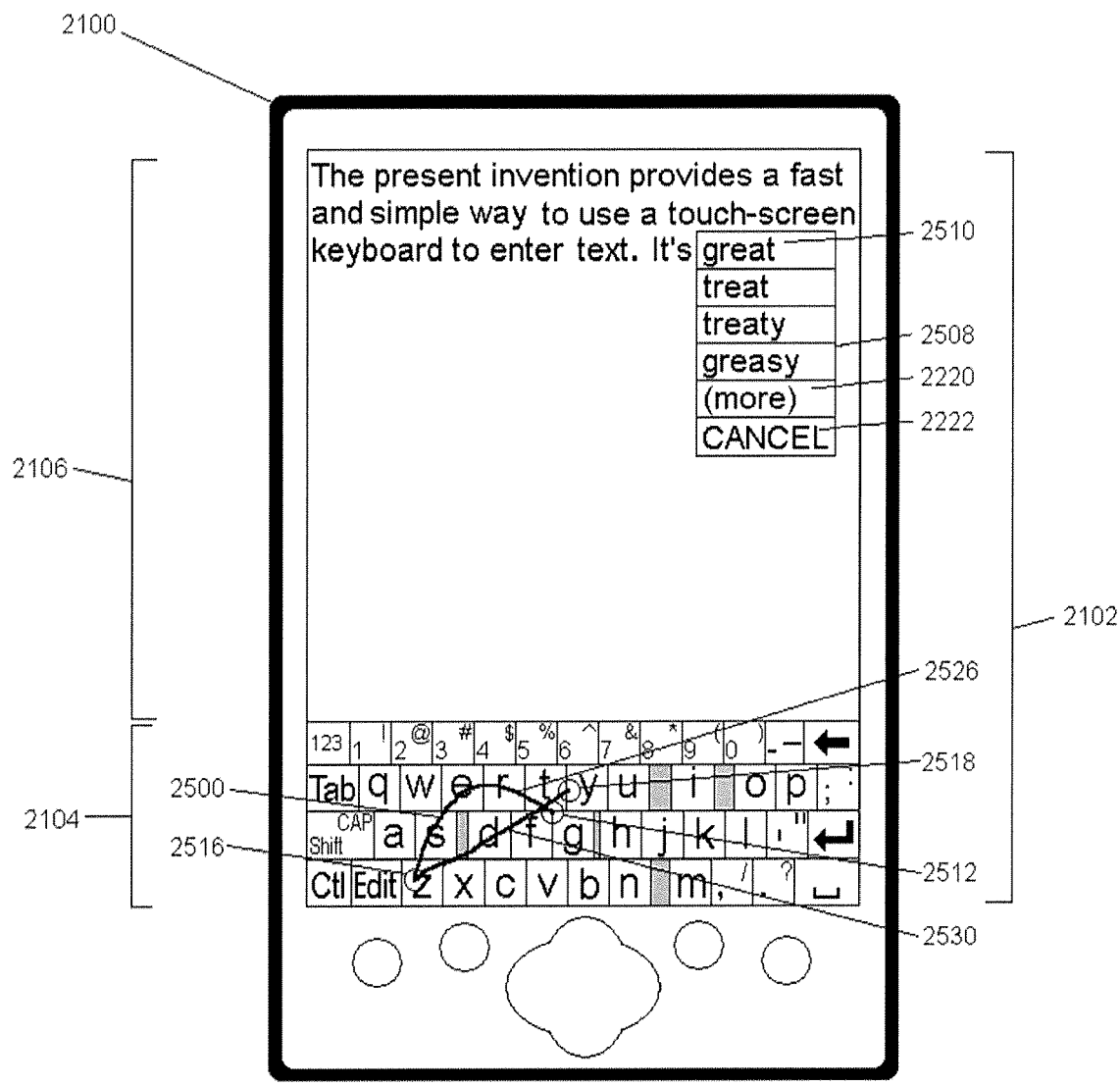
FIG. 2E shows the same view, showing a word selection list displayed after a user has completed tracing out an input path very similar to that shown in FIG. 2B.

To illustrate another aspect of the invention, FIG. 2E shows another input path 2500 for comparison with the path 2200 shown in FIG. 2B. In this example, the user has attempted to enter the word "great," and the system has successfully matched the word "great" as the most likely candidate word so that it is displayed in a default word choice location 2510 in selection list 2508. The input path shown in FIG. 2e starts at an initial contact point 2512, which location is virtually identical to the initial contact point 2212 of FIG. 2B. As a natural result of the user's intention to enter the two letters "r" and "e" following the initial letter "g" (corresponding to the intended word great), the initial path segment 2526 passes through both of the corresponding letter-keys before continuing to curve downward toward the general region of the letter-key "a." A significant benefit of the present invention is the fact that the user does not need to strive to make the input path conform to any particular pattern—the user is free to simply trace out any path that represents a reasonable attempt to traverse the keyboard in sequence near the letter-keys of the intended word. Thus, as shown in the representative input path of FIG. 2E, while the user is free to intentionally create an AngleThreshold inflection point at any desired location (to increase the likelihood that the intended word will be correctly identified by the system as the most likely matching candidate), there is no requirement to artificially create a AngleThreshold inflection point near either of two letter-keys for "r" or "e," and consequently no inflection point has been created in the example input path shown. The first AngleThreshold inflection point detected by the analysis of the input path shown occurs at location 2516, where having reached the region of the letter-key associated with the letter "a," the user begins to move the stylus toward the region of the letter-key associated with the letter "t," the final letter of the intended word. In consequence, while the initial path segment 2526 does not have a detected inflection point in the region of the letter-key associated with the letter "e" (as is the case with the input path shown in FIG. 2B), it does exhibit a distinct curvature so that the length of the input path segment 2526 from location 2512 to the inflection point at location 2516 is significantly greater than the straight-line distance between those locations. Note that, except for the path segment curvature just noted, and the resulting absence of any AngleThreshold inflection point on input path segment 2526, which is in contrast to the corresponding but relatively straight path segments 2226 and 2228 of FIG. 2B with the intervening AngleThreshold inflection point 2214, input path 2200 of FIG. 2B and input path 2500 of FIG. 2E are extremely similar in that: 1) the initial and final contact locations (PenDown locations 2212 and 2512, and PenUp locations 2218 and 2518, respectively) are virtually identical in both cases; 2) the points of closest approach to each of the significant letter-keys ("t", "g", "r", "e", "a", "x" and again "t") are virtually identical in both cases; and 3) the locations of the AngleThreshold inflection points 2216 and 2516 and in consequence their distances from the letters "a" and "x" are also virtually identical in both cases. The combination of the various aspects described below produce a surprising result: that the characteristics of various input paths that are reliably detected by the analysis methods of the present invention in a computationally very efficient manner arise as a result of a user's natural and intuitive approach to tracing out input paths for words.

In another aspect, when a word is generated for output immediately following a previously output word, the system automatically outputs a space prior to outputting the generated word, eliminating the need to perform any additional action for the great majority of space characters output. Similarly, when a word is generated for output immediately following one of a set of punctuation characters and other characters that are normally followed by a space, the system also automatically outputs a space prior to outputting the generated word. For example, when a string of one or more digits is typed, a space is usually entered before any following word. However, in another aspect, certain words are designated such that no space is automatically generated prior to outputting one of the designated words after one or more of the designated characters. For example, following a string of digits with any one of the four words "st", "nd", "rd" or "th" (as in the strings "1st", "22nd", "103rd" or "11th") suppresses the automatic generation of an intervening space such that the intended text output is generated.

Note that, in the case of a period, with the prevalence of the use of the period in entering URLs and e-mail addresses (in which no space generally appears following a period), automatically spacing after each period can be counter-productive, since there is a significant effort involved in editing the text to remove an unwanted space that appears in the text output at a position no longer adjacent to the text-output cursor location. In another aspect, the system does not automatically generate a space following a period. The database of words is augmented to include designated "punctuation words" comprised entirely of punctuation characters and/or spaces, and wherein one or more of these words are marked in the database such that, when they are generated as output by the system, no space is automatically generated preceding or following them. For example, to facilitate the entry of an end-of-sentence period, the database includes a two-character textual object comprised of a period followed by a space. Following the output of the final word of a sentence, the user simply contacts the keyboard in the vicinity of the key associated with a period and moves the point of contact to the vicinity of the key associated with a space before lifting the stylus. This generates a period and space immediately following the final word of the sentence, creating a well-formed sentence according to the user's intention. To facilitate the entry of an end-of-sentence period followed by two spaces, the database includes a three-character textual object comprised of a period followed by two spaces, which the user enters by contacting the keyboard in the vicinity of the key associated with a period and moving the point of contact to the vicinity of the key associated with a space, and performing a "double-letter gesture" (as described below) before lifting the stylus. In another embodiment, when the most closely matching word is a "punctuation word" (as described previously), then the punctuation word is automatically accepted as the textual interpretation of the input path and is generated as the output of the system even when the difference between it and the second-most-closely matching word does not exceed a determined threshold.

Figure 3A:
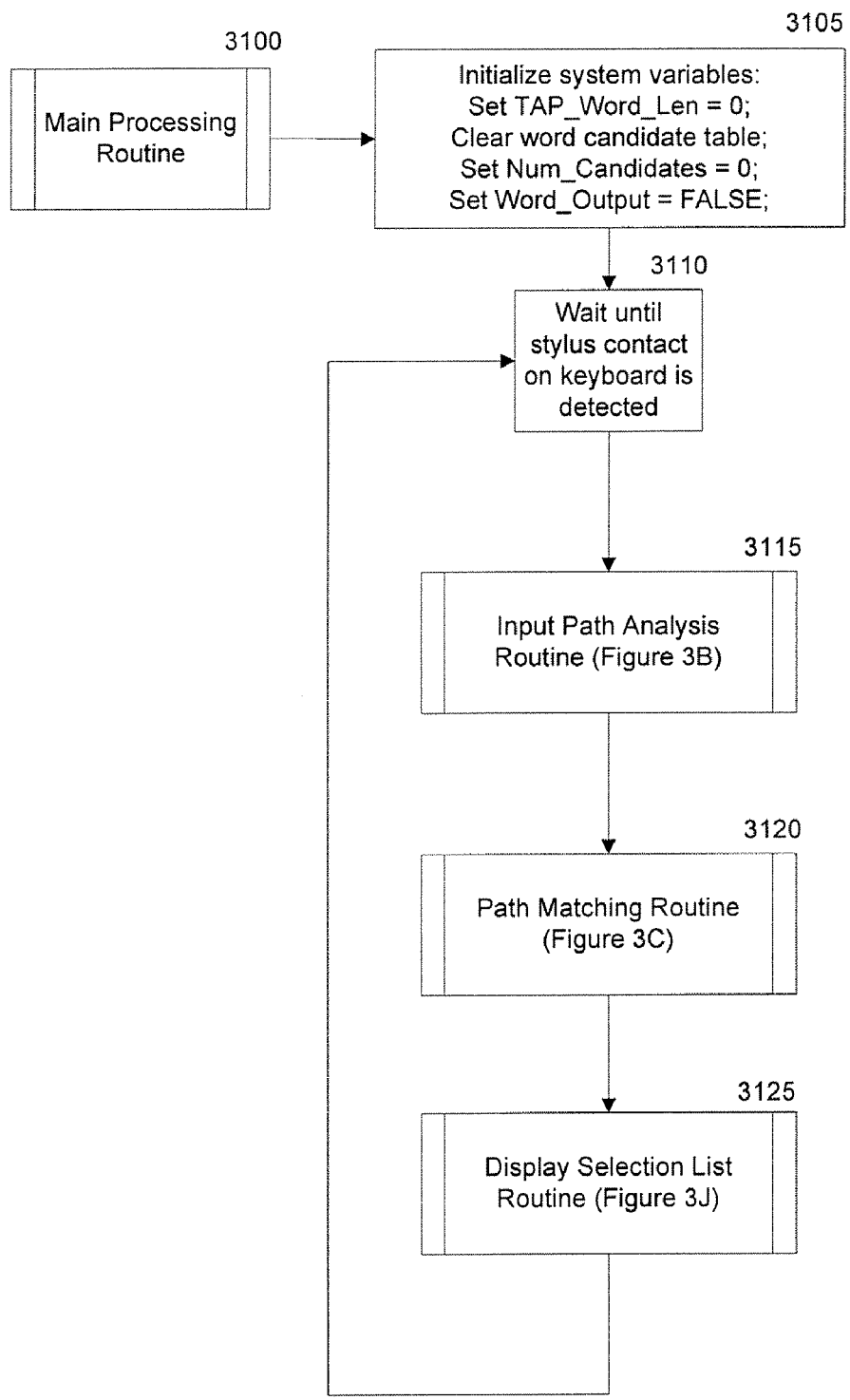
FIGS. 3A through 3J show an embodiment of a software algorithm to implement the method of the present invention in order to determine the most likely word or words in a database that match an input path traced out by a user.
Figures 1, 3B:
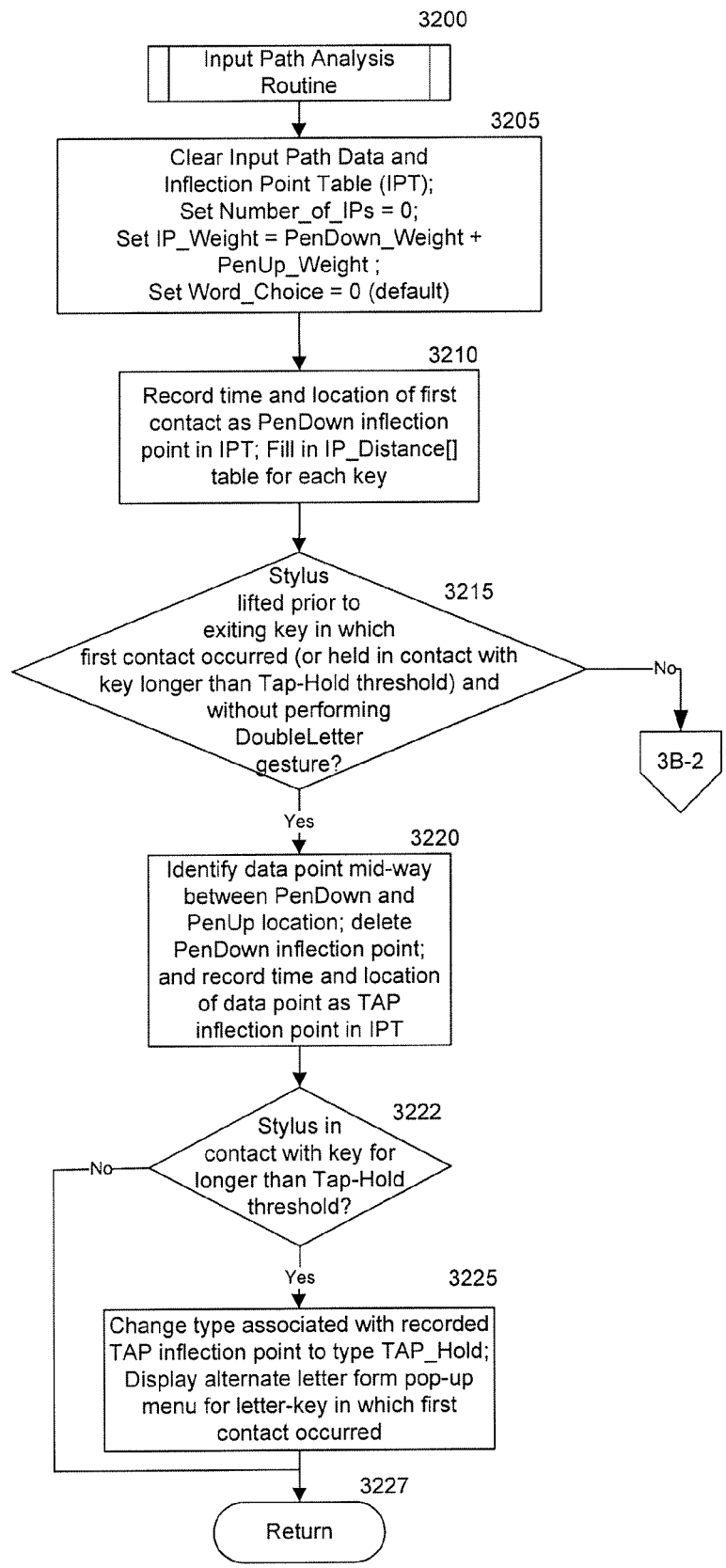
Figures 2, 3B:
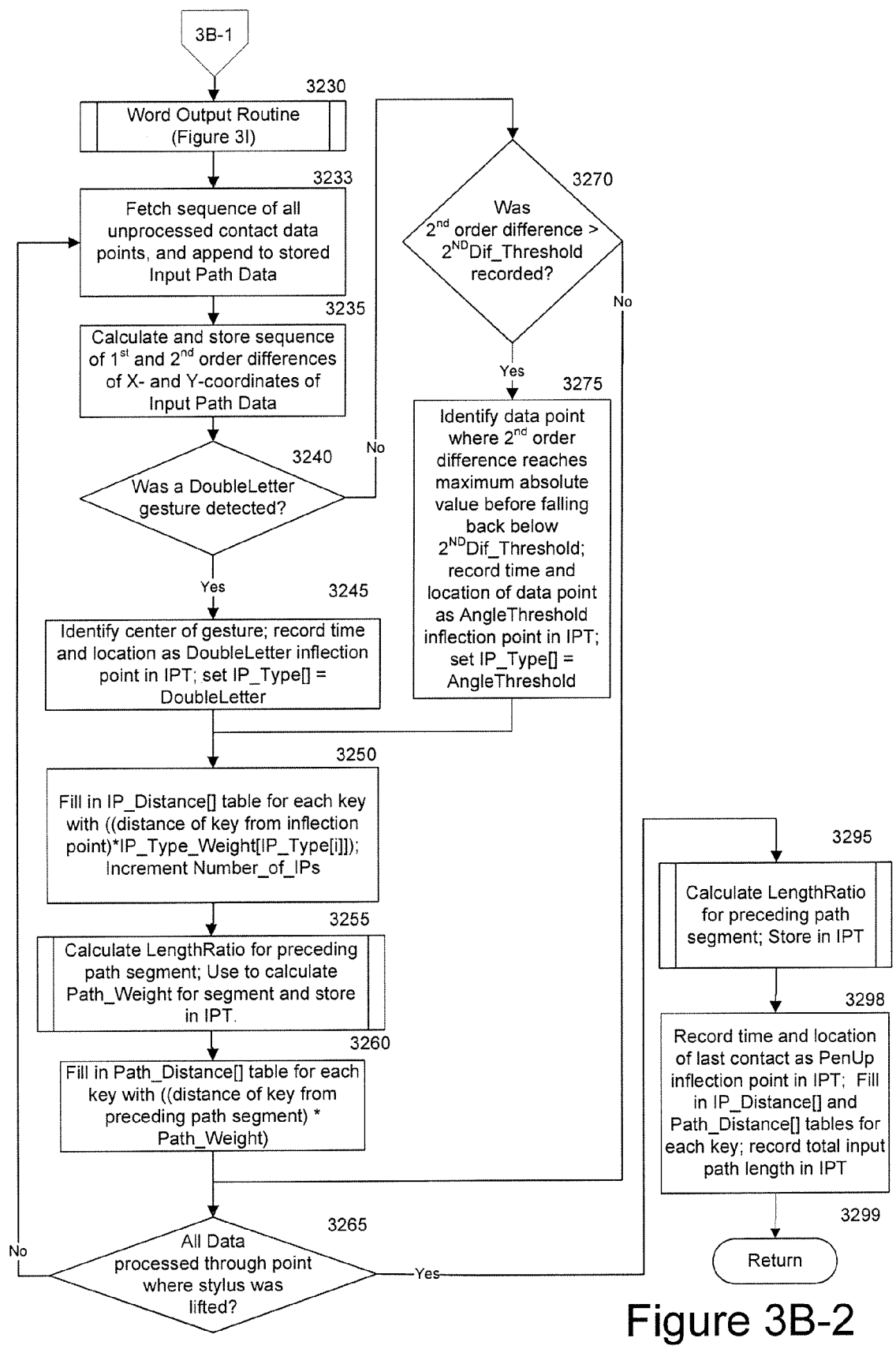
Figures 1, 3C:
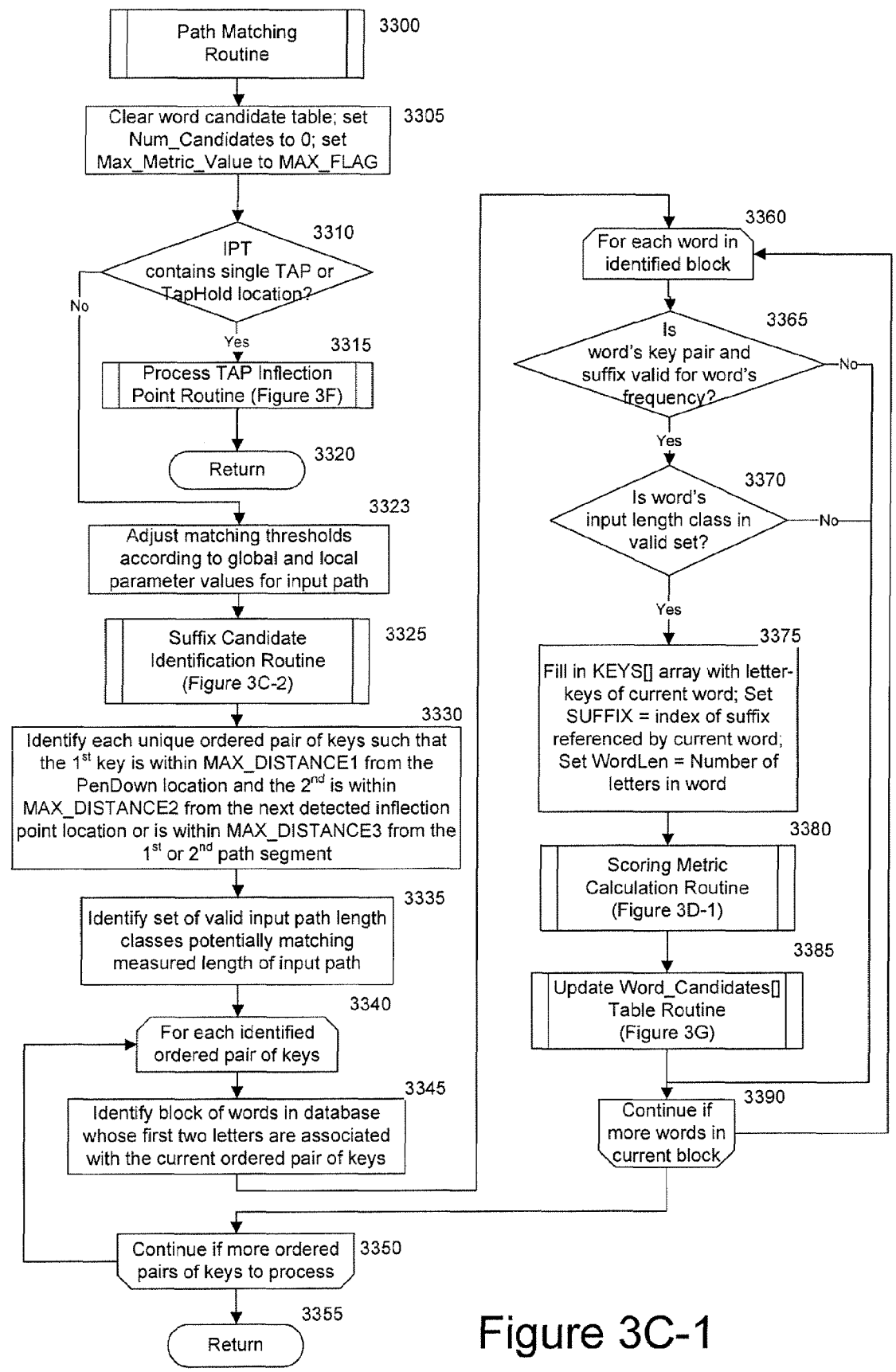
Figures 2, 3C:
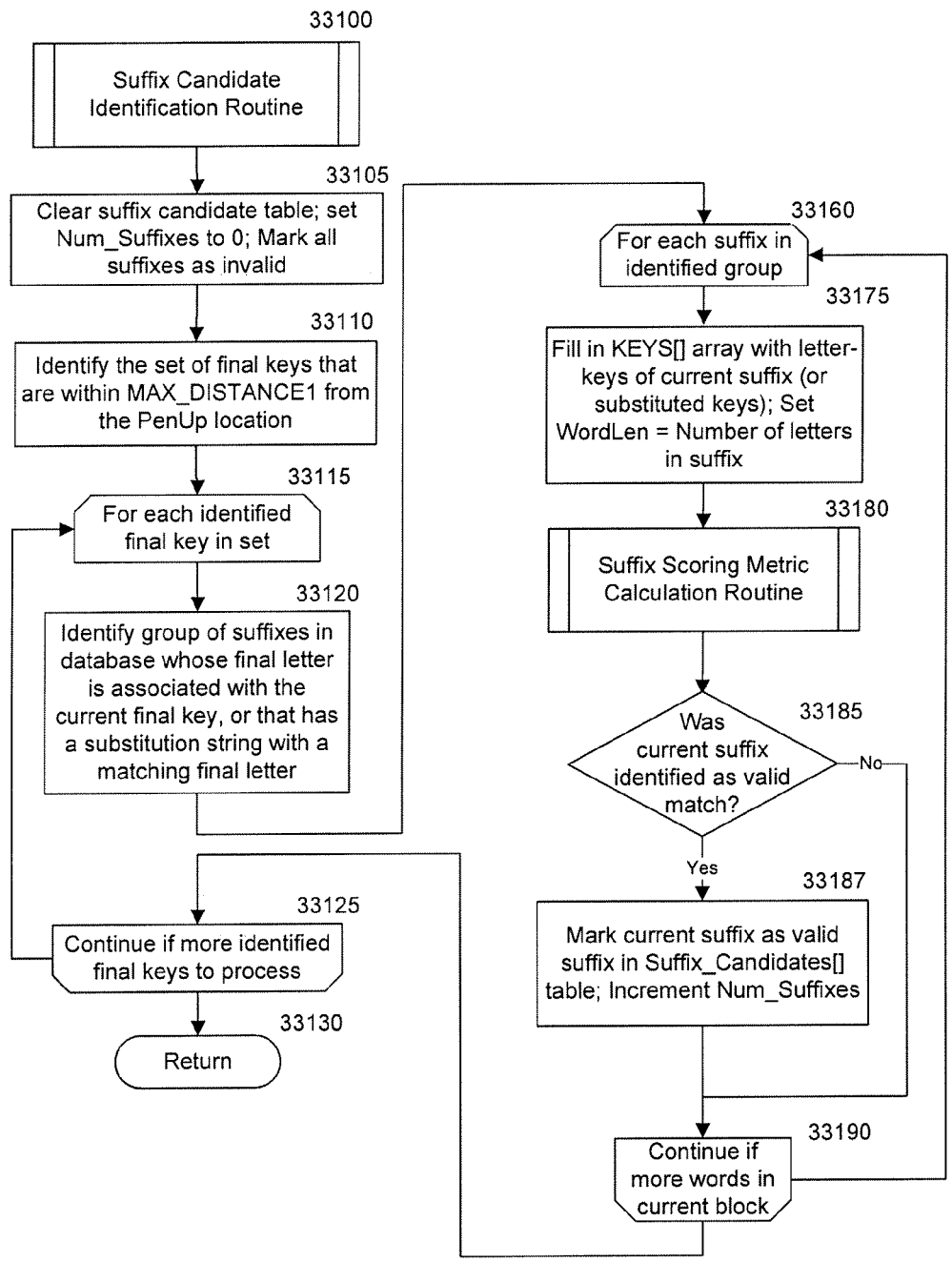
Figures 1, 3D:
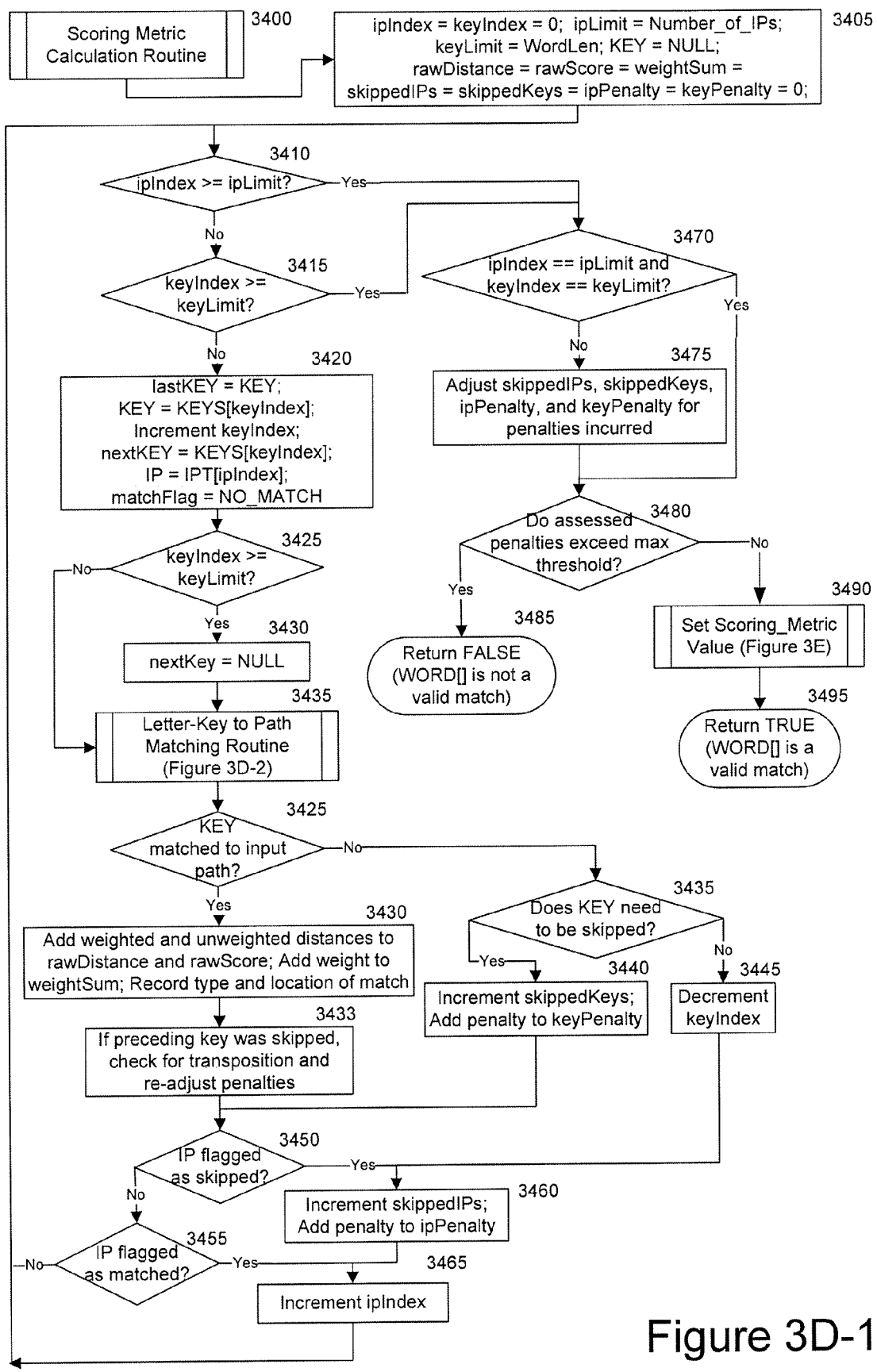
Figures 2, 3D:
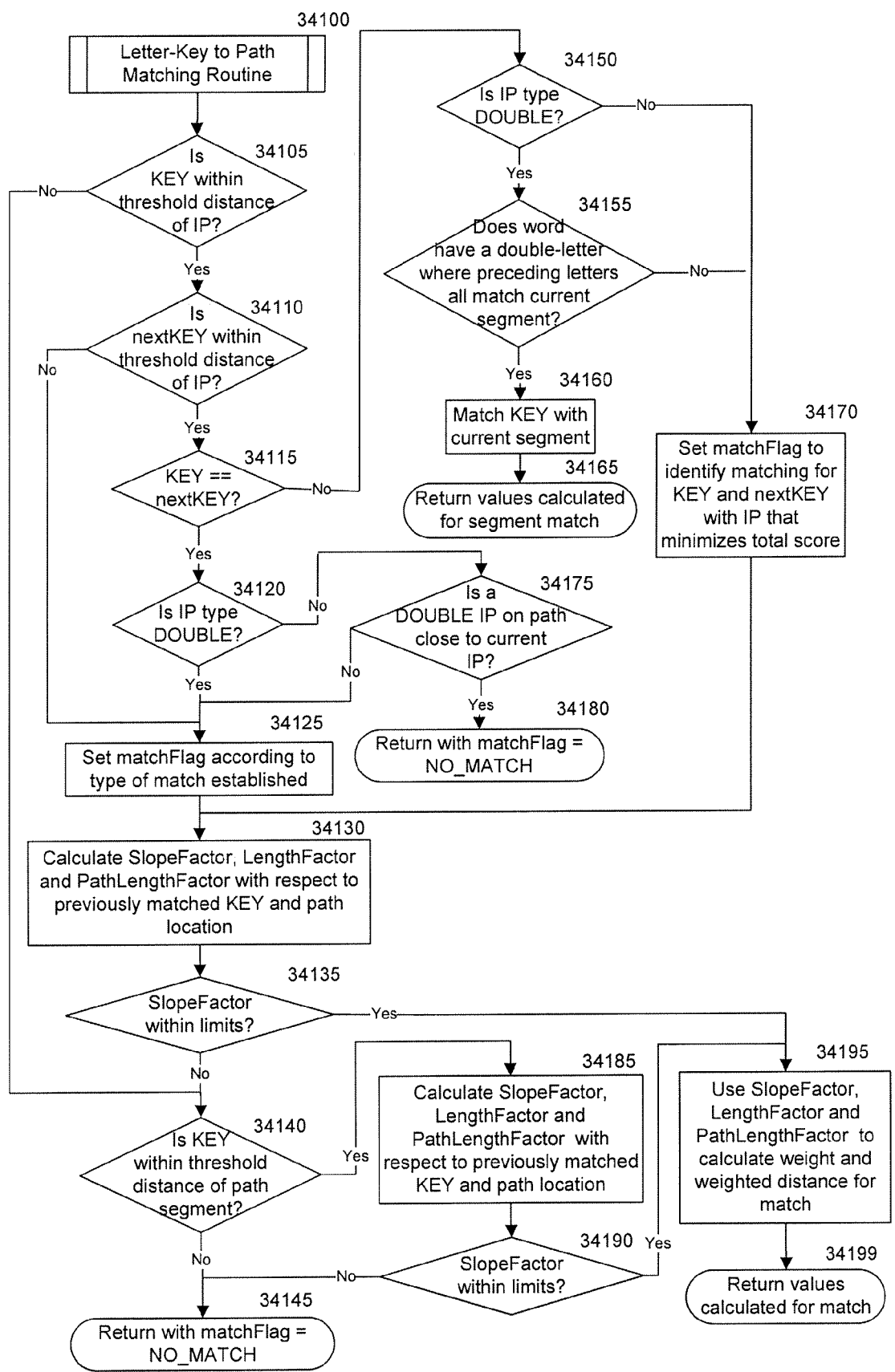
Figure 3E:
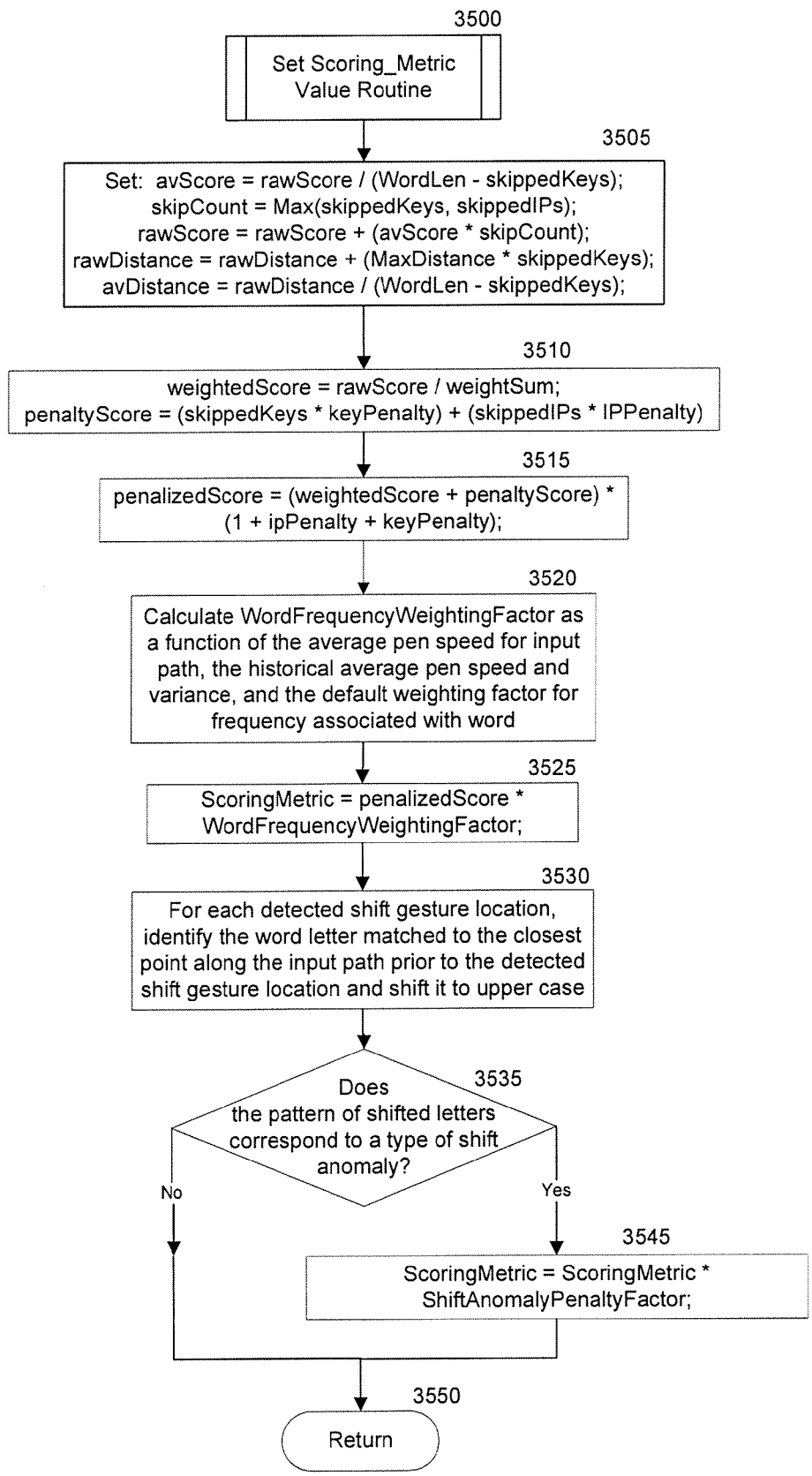
Figure 3F:
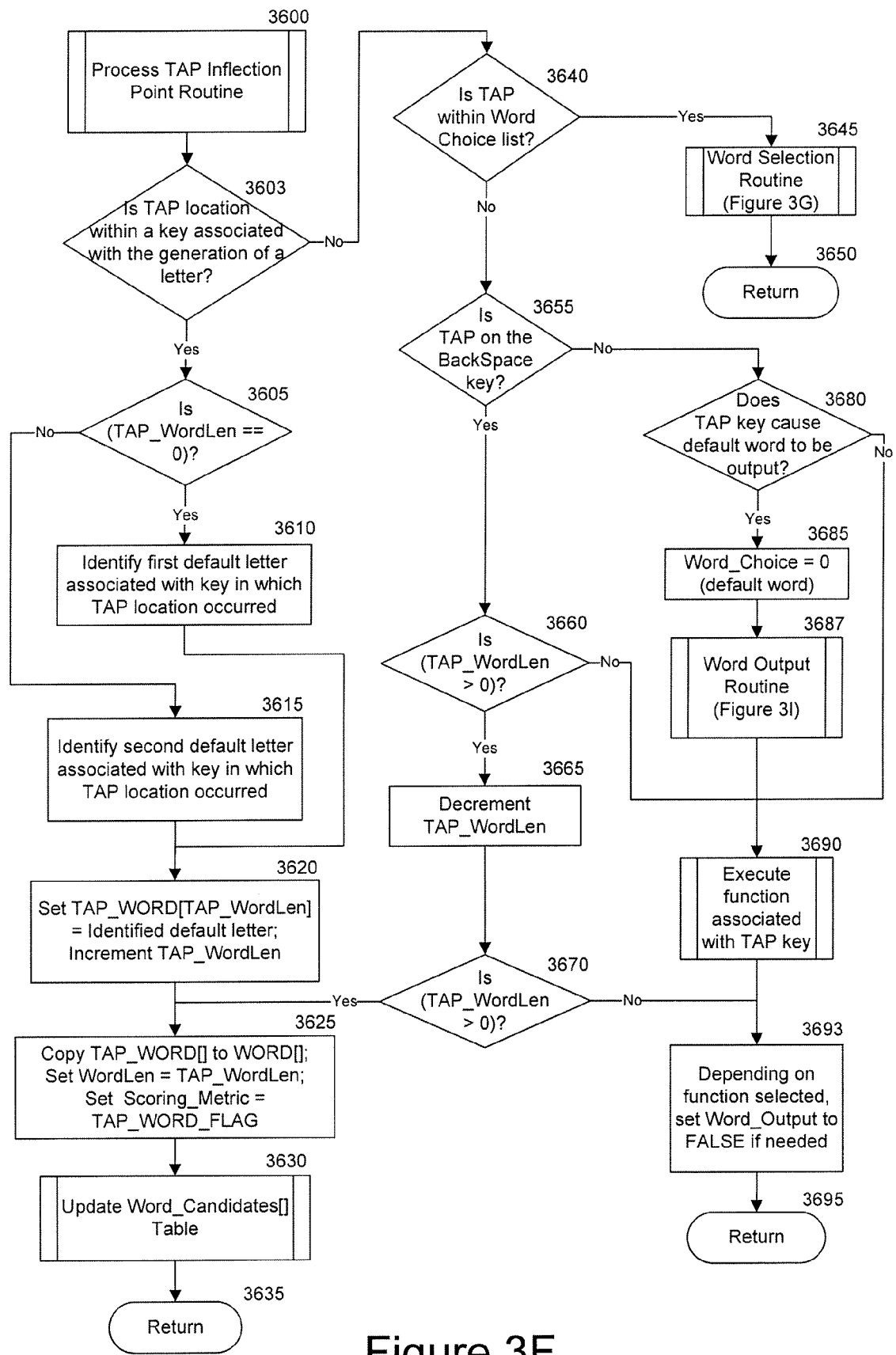
Figure 3G:
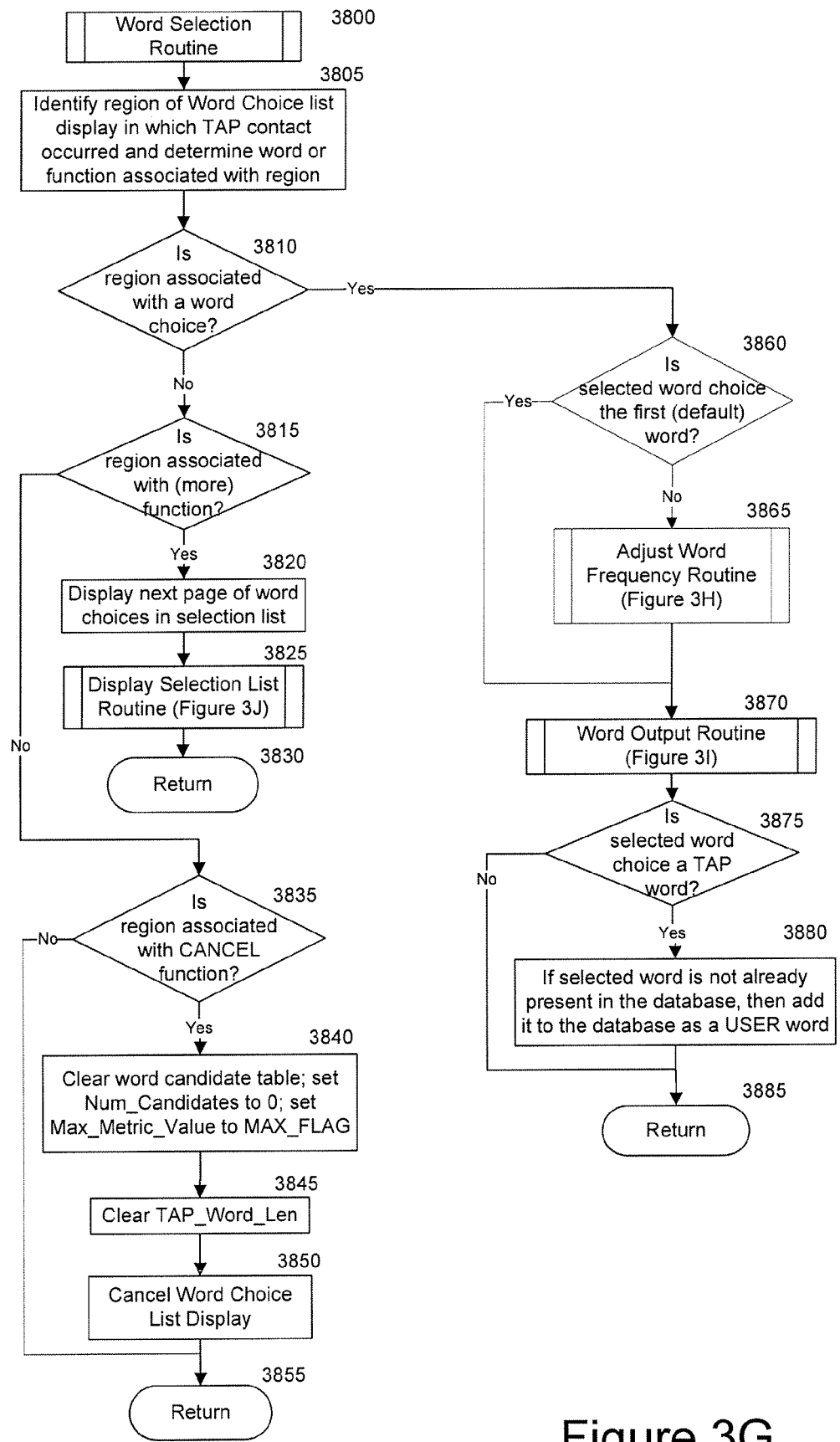
Figure 3H:
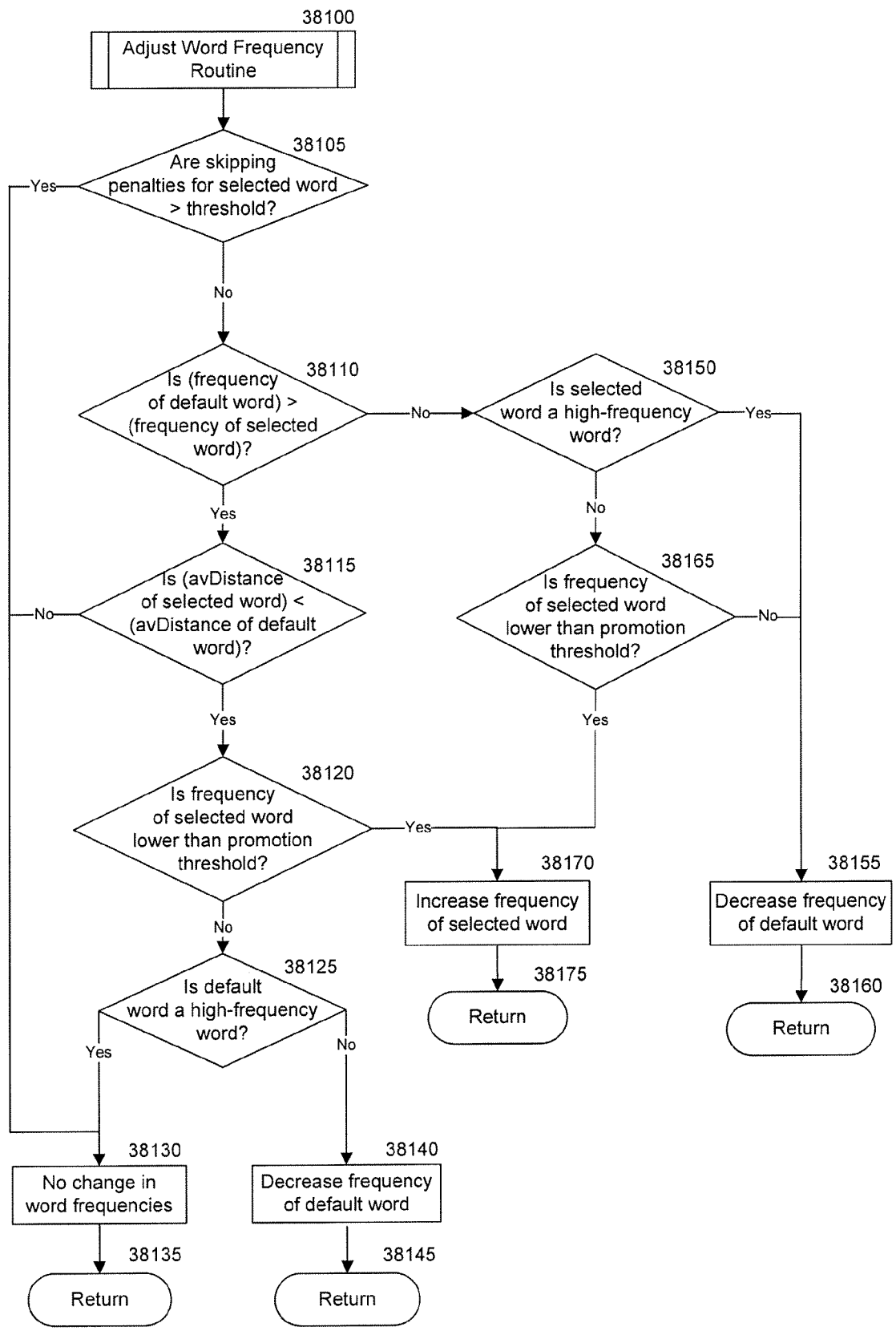
Figure 3I:
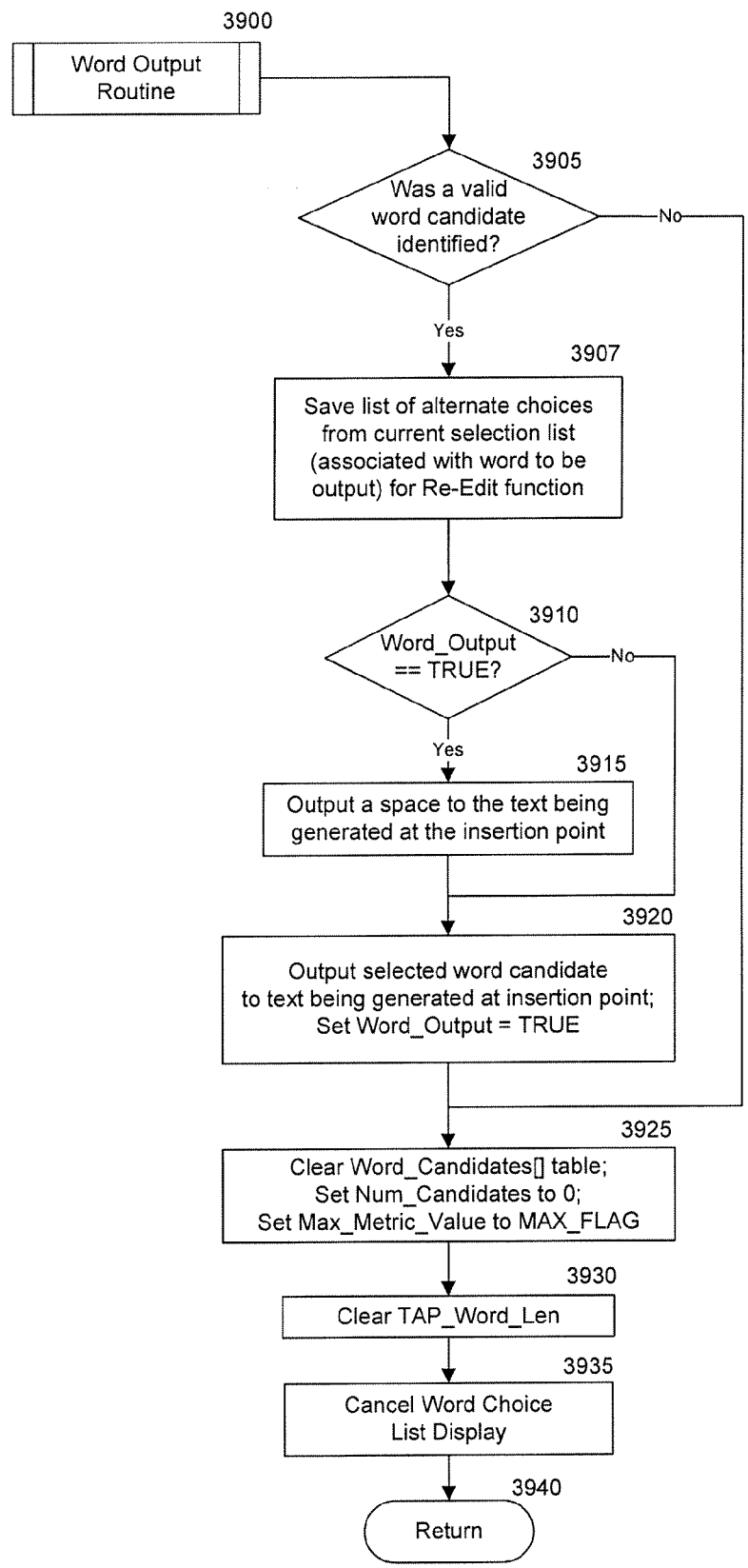
Figure 3J:
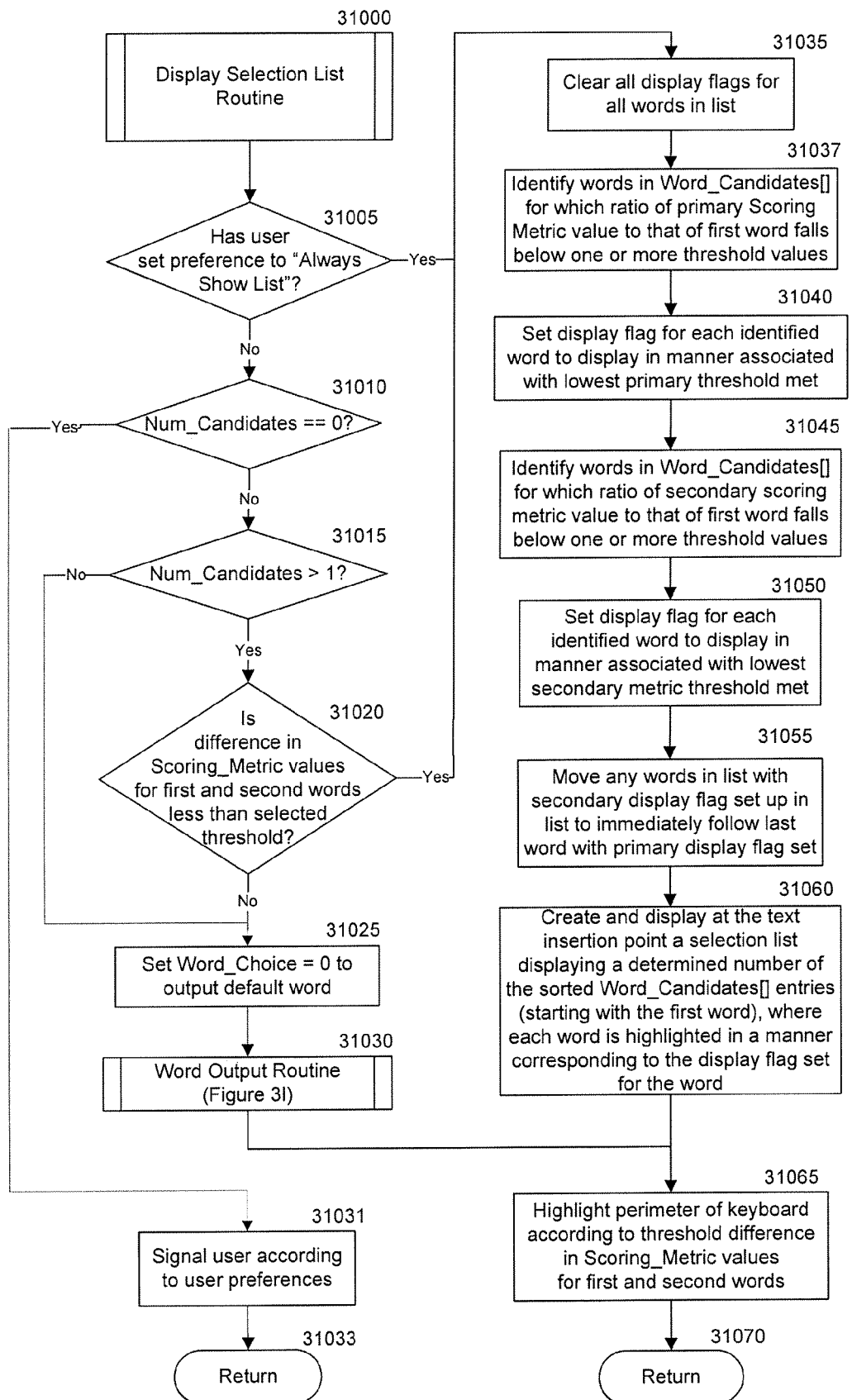

FIGS. 3A through 3J show a process flow chart of an embodiment of software 162 to implement the Method for Continuous Stroke Word-Based Text Input that generates and manages a word selection list in response to the user contacting the screen and entering a continuous stroke input path or a tap contact. FIG. 3A shows a flow chart of an embodiment of the Main Processing Routine 3100 of the Continuous Stroke Word-Based Text Input software 162. At block 3105, when the process is first started, various system variables are initialized. At block 3110, the process waits to be notified that a contact has occurred within the area of the keyboard 2104. When the operating system detects a contact in the keyboard area 2104, control returns to the Main Processing Routine 3100 at block 3115, where an Input path Analysis Routine 3200 of FIGS. 3B-1 and 3B-2 is invoked to analyze and classify the nature of the user's contact action. Once the contact action has been analyzed, a Pattern Matching Routine 3300 of FIG. 3C is invoked at block 3120 to determine what word candidates will be presented, what text is generated, or what function is invoked in response to the analyzed contact action. At block 3125, a Display Selection List Routine 31000 of FIG. 3J is called to generate a Word Choice list display to allow the user to select the intended word, if needed. Following the return from the Display Selection List Routine 31000, control returns to block 3110 where the process waits to be notified of the next contact action that occurs within the area of the keyboard 2104.

FIG. 3B shows a flow chart of an embodiment of the Input Path Analysis Routine 3200. At block 3205, required variables are initialized, and arrays and corresponding indices used to store an input path data are cleared, along with an Inflection Point Table (IPT) in which the determined information about each identified inflection point is stored, such as its type, location, and time of occurrence. In one embodiment, to reduce the number of calculations performed by the Path-matching Routine 3300, each inflection point entry in the IPT also includes an array IP_Distance[] that is filled in with the distance from the inflection point to each key of the keyboard that is associated with a letter. In another embodiment, when the distance from an inflection point to a key of the keyboard exceeds a predetermined maximum threshold, the corresponding entry in the IP_Distance[] array is set to a unique MAX_DISTANCE flag value. In another embodiment to further reduce the number of calculations performed by the Path-matching Routine 3300, each valid distance entry in the IP_Distance[] array for an inflection point is stored in the array as the distance multiplied by a weighting factor for the type of inflection point. Similarly, each inflection point entry in the IPT (except the first PenDown) includes an array Path_Distance[] that is filled in with the distance from each key of the keyboard that is associated with a letter to the closest point on the preceding input path segment (between the preceding inflection point and the current inflection point), here again multiplied by the weighting factor PathWeight determined for a distance measured from a path segment (or to the MAX_DISTANCE flag value if this distance is greater than a corresponding maximum matching threshold distance for path segments). In another embodiment, the weighting (PathWeight) given to the measured distance of a letter-key from a path segment point to which it is matched is a function of how much the path segment varies from a straight line between the detected inflection points that bound the segment. In one embodiment, this variance is measured as a function of the ratio of the length of the input path segment to the straight-line distance between its endpoints (the "LengthRatio"). In another aspect, the length ratio is used to adjust the measured distance of a letter-key from the path segment point to which it is matched (prior to applying any weighting factor). In another aspect, when a letter is matched to a point on a path segment, a determined neighborhood of the letter along the path is examined to identify a point where the value of the second difference of the path coordinates reaches a local maximum, and this point is used as the input path point to which the letter is matched. In another aspect, the value of this second difference is used in calculating the weighting applied to the letter matching in the scoring metric calculation. In another aspect, the value of this second difference is also used to adjust the measured distance of a letter-key from the path segment point to which it is matched (prior to applying any weighting factor).

Figure 4A:
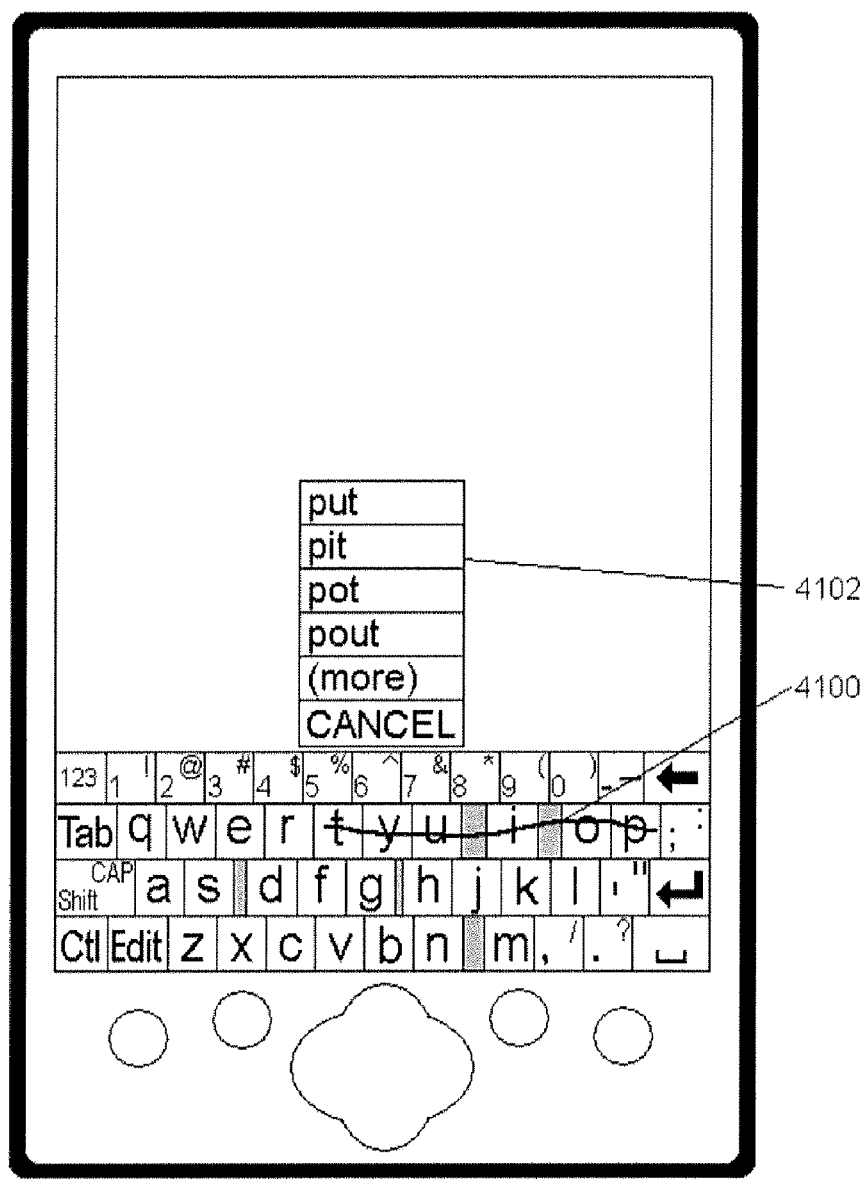
FIGS. 4A-C show a portable computer with a touch-screen display that depicts a possible input path for the same intended word ("pout")
Figure 4B:
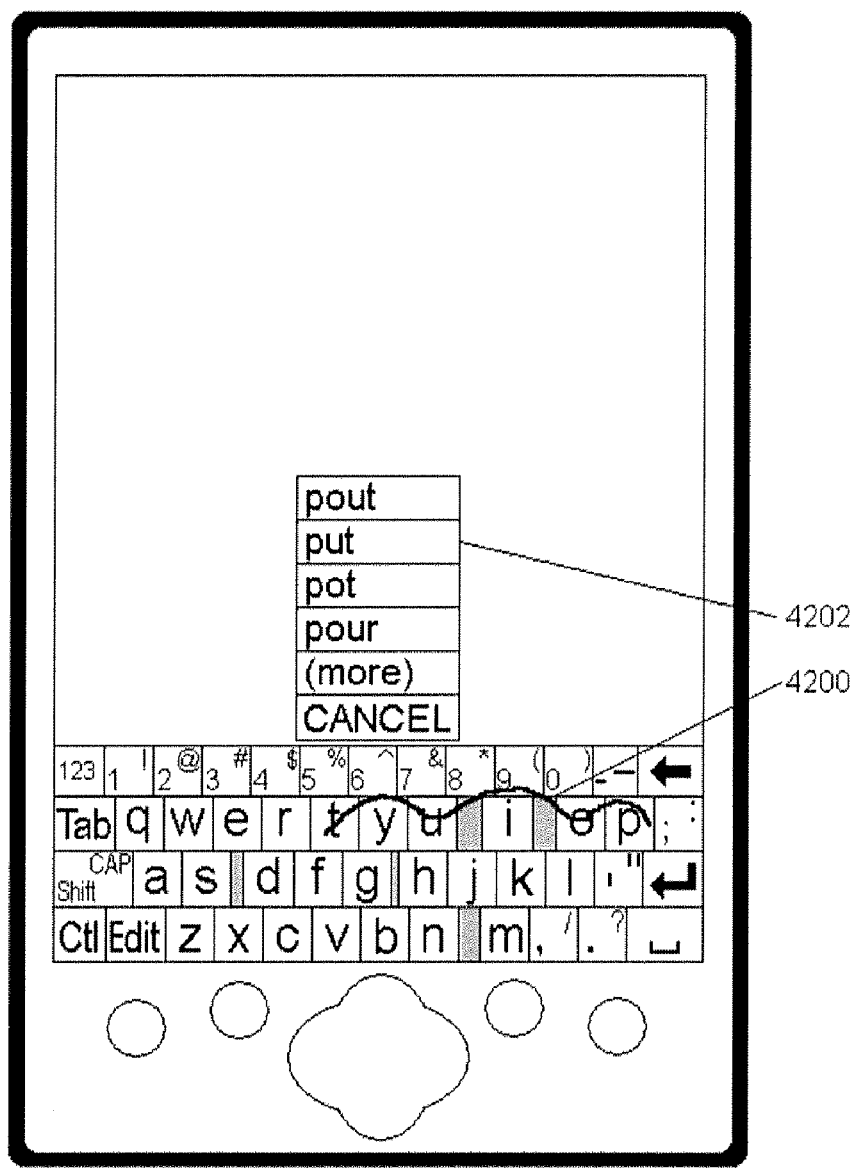
Figure 4C:
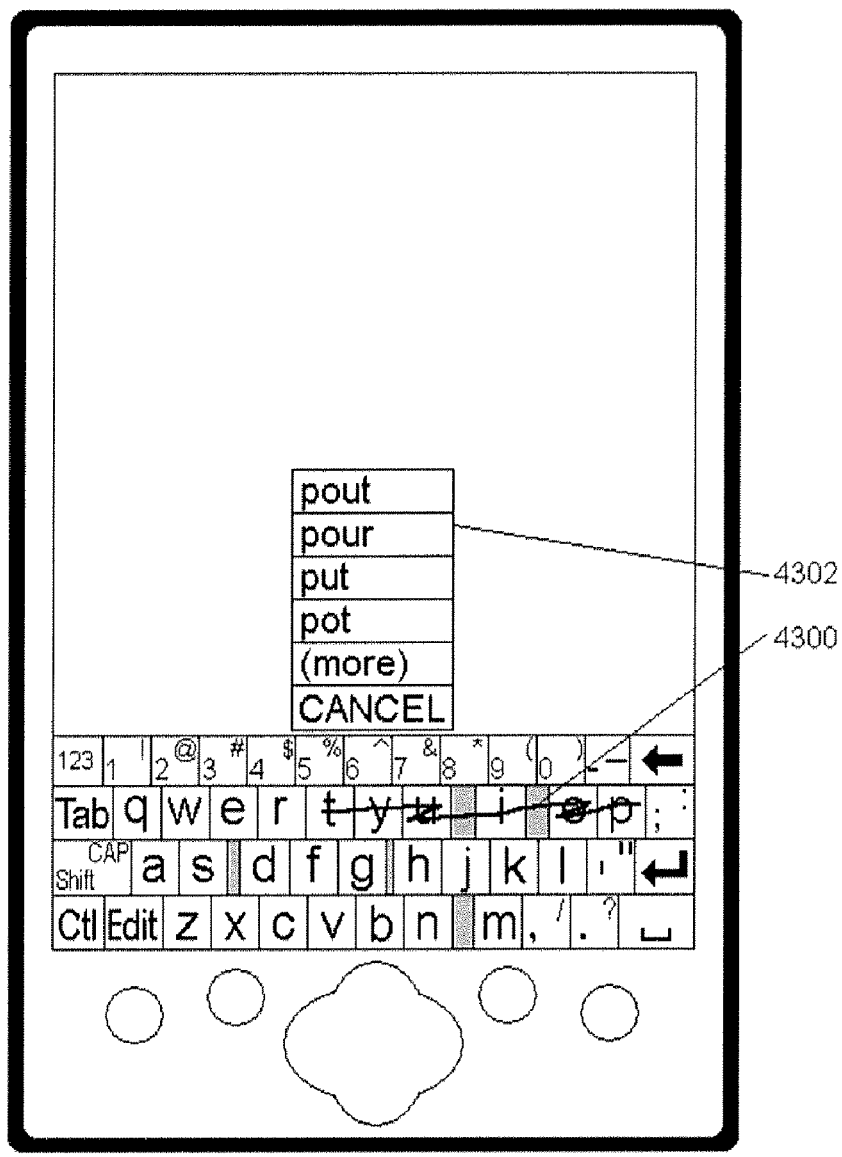

Separately or in combination, the aspects of identifying the point of matching according to the location of the second difference local maximum, and of adjusting the weighting applied to a match according to the length ratio and/or the value of the second difference local maximum allow the user to enter input paths in an intuitive and flexible manner. The aspects mentioned create a continuum of gestural variation that enable the user to indicate which letter-keys on the keyboard correspond to letters of the intended word without having to carefully enter an input path such that a distinct inflection point is created corresponding to each letter. This allows the user to, when needed, lightly "hop on" or "skip across" intended letters. FIG. 4A shows a possible input path 4100 for the word "pout" where the input path has been entered without any attempt to distinguish among the four words "pot," "pit," "put" and "pout" which all correspond to a straight-line path from "p" to "t." The result is in accordance with the relative frequencies of the four words ("pout" is the lowest frequency word and "put" is the highest frequency word of this group), and the particular path which happens to pass closer to the center of the letter-key associated with "i" than to the center of the letter-key associated with "o" (so that "pit" appears in the selection list 4102 before "pot"). The input path 4200 shown in FIG. 4B, which is correctly recognized (by an implementation of the present invention running in real-time on a variety of standard, off-the-shelf "PocketPC" devices, such as the Hewlett-Packard iPAQ 2215) as corresponding to the word "pout" which appears as the most likely (default) word in selection list 4202, is more "flowing," and exhibits less dramatic changes in path direction. Since each letter of the intended word "pout" lies in the same direction (i.e. a straight-line path from "p" to "t" passes directly through each letter in the proper sequence), the less an input path has to diverge from a straight line, the easier the path will generally be for the user to enter, and consequently, faster. This is in contrast to FIG. 4C, which shows an input path 4300 for the same word where distinct inflection points are created at both the "o" and the "u" by zig-zagging back at forth at each key location. While this type of input path is also correctly recognized by the present invention as most likely corresponding to the intended word "pout" (as seen in selection list 4302), entering the input path as shown in FIG. 4C requires four additional sharply angular changes in direction (two each within the regions of the letter-keys associated with "o" and "u," respectively). For an average user, such an input path will require more effort, and in general more time, to enter than a "hopping" input path such as that shown in FIG. 4B.

In a related aspect, the value calculated for the length ratio is reduced when the affected path segment lies entirely within the top two rows of the keyboard. This enables the user to draw an input path that "hops" along the top row of keys, arcing from one intended key to the next, and enabling the user to easily and unambiguously indicate which keys are intended from among a group of otherwise collinear keys in the top row of the QWERTY keyboard. This is quite useful as it allows the user to enter a path that distinguishes among groups of words such as "pot, pit, put, pout" (shown above), "our, or", "heat, heart", etc. This is a characteristic of the particular layout of the standard "QWERTY" keyboard, in part due to the fact that four of the vowels are located in the top alphabetic row, three of which (the "u", "i" and "o") are adjacent to each other.

In another related aspect, when an Angle, Pause, or Pause-Angle inflection point is detected within a threshold distance of the upper boundary of the virtual keyboard, the inflection point is discarded and is not used for matching with keys of potential word candidates (other than as a point on a path segment). One reason for this is that, following a Shift gesture (where the user draws a path that exits through the upper boundary of the keyboard to indicate that the letter associated with the last key matched to the path prior to its exit through the top of the keyboard should be shifted to an upper-case letter), a user will frequently re-enter the keyboard area prior to properly vectoring off toward the next target letter-key, creating an unintended Angle IP in the upper row of the keyboard. Once again, since letters associated with keys in the upper row are seldom included in words in the database, eliminating such inflection points tends to improve the overall accuracy of the algorithm, while cases in which a word includes one or more letters associated with keys in the upper row are still successfully matched by the algorithm to the appropriate path segment, such that the intended word is correctly recognized. In addition, unintended inflection points are also frequently created near the upper boundary of the keyboard during the entry of "hopping" input path as explained above, and this aspect prevents such unintended inflection points from interfering with the correct recognition of the intended word.

Returning to FIG. 3B-1, next, at block 3215, the process waits to determine whether the point of stylus contact exits from the region associated with the key in which the first contact location occurred, or whether the stylus is lifted and contact with the screen is terminated prior to exiting from the key (or whether the stylus is kept in contact with the screen within the bounds of the key region for longer than a determined Tap-Hold time threshold), in which case execution proceeds to block 3220 where a single inflection point of type TAP is entered in the IPT. Also, in another embodiment, when the process detects at block 3222 that the point of contact did not exit from the key in which contact first occurred, and the contacted key is associated with one or more alternate letter forms, and a predetermined threshold of time has elapsed since the contact was initiated, then at block 3225 a single inflection point of type TAP-HOLD is entered in the IPT, and control returns from the Input Path Analysis Routine without waiting for the contact to be lifted from the touch-screen. When the Path-matching Routine receives and processes a TAP-HOLD inflection point, a "pop-up list" of the alternate letter forms associated with the key is displayed, and the process waits until the user slides the point of contact to a desired alternate form of the letter in the list, lifting the stylus to select the alternate form as the tap location letter. A flag is then set so that this alternate letter form is then added to the tap location word (as shown in FIG. 3F), and if TAP_Word_Len is currently set to 0, the selected alternate letter form also becomes the default one-letter word in the word choice list. This enables the user to easily create any desired sequence of letters in spelling a new word, including alternate letter forms, without having to change the mode of the keyboard.

If at block 3215 the contact point exits from the initial key contacted (or a DoubleLetter gesture is detected), then, moving to FIG. 3B-2, at block 3230 a Word Output Routine 3900 (shown in FIG. 3I) is invoked to output the default word choice if there is a pending selection list currently displayed from a preceding input path. Then at block 3233, in one embodiment, the sequence of all raw unprocessed data points collected up to that time from the touch-screen are appended to the Input Path data buffer, and in another embodiment at block 3235, first and second order differences are calculated and stored, and in another embodiment, the sum of the absolute magnitudes of the x- and y-second order differences is calculated and appended to a separate Input Path data buffer. Then at block 3240, the process determines if a DoubleLetter gesture was detected in the sequence of data just processed. In one embodiment, this determination is made based on whether a sequence of path points is detected where either or both of the first-order x- and y-differences change in sign, and where each sign change location occurs within a threshold distance of a keyboard location that is approximately at the center of the set of detected path points, and wherein the sequential pattern of detected sign changes corresponds to a continuous clockwise or counter-clockwise loop. If so, at block 3245, the approximate center of the gesture is determined and added to the IPT as a DoubleLetter inflection point at block 3250 as described above. Also at block 3250, each time an inflection point is added to the IPT, the weighting factor for the type of the inflection point is also recorded in the IPT.

Then at block 3255, the process calculates the Length-Ratio for the preceding input path segment (as described previously), and uses this value in calculating the Path-Weight value to be used in weighting distances to letter-keys that are measured from points along the preceding path segment. At block 3260, the Path_Distance[] table for the segment is filled in with measured distances to which the calculated PathWeight has been applied.

At block 3265, the process determines whether all input path data has been processed up through the location where the stylus was lifted from the touch-screen, and if so, at block 3295 the LengthRatio is calculated for the final input path segment and stored in the IPT, and at block 3298 the final PenUp inflection point is added to the IPT in the manner previously described.

If no DoubleLetter gesture was detected in the sequence of data at block 3240, then at block 3270 the process determines whether at some point in the analyzed sequence of data, the sum of the absolute magnitudes of the x- and y-second differences exceeds a predetermined threshold. If so, then at block 3275, the process determines the point where the sum of the absolute magnitudes of the second differences attains its maximum value prior to falling back below the minimum threshold, and this point is then added to the IPT as an AngleThreshold inflection point in the manner previously described.

In another embodiment, each time an inflection point is detected, a test is performed prior to recording the newly detected inflection point in the IPT at blocks 3245 through 3260 (which results in the newly detected inflection point being subsequently used by the Path-matching Routine). When the newly detected inflection point follows by less than a determined threshold distance along the input path from an immediately preceding inflection point, the newly detected inflection point is discarded (not recorded in the IPT) and the Input Path Analysis Routine continues to process the remaining data points. In one aspect, the threshold distance between detected inflection points is determined with respect to the types of the following and preceding inflection points. In another aspect, a single inflection point is determined at a location midway between the following and preceding inflection points which replaces both inflection points in subsequent processing of the input path.

In another aspect, in order to reduce the influence of instances where the letter-key of a word being scored happens to be located very close to an inflection point or segment of an input path with which it is being matched, the distance calculated for a letter-key from an inflection point is compared to a determined minimum threshold distance. Thus, in another embodiment, at block 3250 (and at block 3298), when the calculated distance from a letter-key to the inflection point location falls below the determined minimum threshold, the calculated distance is replaced by the minimum threshold distance in the table, so that the minimum distance is used by the Path-matching Routine in determining a numerical scoring for a word. In another aspect, the calculated distance is replaced by the average of the actual distance and the minimum threshold distance in determining a numerical scoring for the word. This reduces the likelihood that an unintended word will be placed too highly in the relative ranking of words to one or more letter-keys that happen to be located very near to the input path. In another aspect, the minimum threshold distance used is determined with respect to the type of inflection point with which the letter-key is matched. In another aspect, at block 3260 (and at block 3298), a second distinct minimum threshold distance is determined and used in a corresponding fashion to adjust the calculated distance of a letter-key from a point on a path segment of an input path (as opposed to an inflection point of the input path).

In another aspect, the method used to determine the distance of a letter-key from certain types of inflection points is adjusted to accommodate the commonly observed tendency of many users to "overshoot" an intended letter in tracing out an input path. This is particularly common in the case of the final letter of a word, where the user may be more confident of the direction in which the path should be traced, and increases the speed with which the stylus is moved. Another factor is that the stylus needs to be pressed down enough to remain securely in contact with the touch-screen throughout the tracing of the input path, and there may be a slight delay in releasing this downward pressure such that the stylus remains in contact with the screen significantly beyond the point at which the final letter-key of the intended word has been traversed. The same phenomenon may occur at an AngleThreshold inflection point, where the path may travel well beyond the point at which an intermediate letter-key of the intended word is traversed before changing direction to proceed toward the next letter-key of the word. In one aspect, since the degree of "overshoot" tends to be more pronounced in the case of the final letter-key of a word, the amount of adjustment applied to the calculated distance is greater in that case. In another aspect, when the distance of a letter-key from an inflection point is greater than the distance from the point closest to the letter-key on the path segment immediately preceding the inflection point, then the distance to be used in the scoring procedure is determined as a weighted average of the two distances. In another aspect, the distance to be used in the scoring procedure is adjusted by decrementing the distance of the letter-key from the inflection point by a determined proportion. In another aspect, an adjustment to the distance determined for the letter-key is made only when the distance of the letter-key from the closest point on the path segment falls below a determined threshold. In another aspect, an adjustment to the distance determined for the letter-key is made only when the distance of the letter-key from the inflection point falls below a determined threshold. In another aspect, an adjustment to the distance determined for the letter-key is made only when the slope of the line from the input path point matched with the preceding letter-key to the path segment point matched with the letter-key differs by less than a determined threshold amount from the slope from the path segment point matched with the letter-key to the inflection point. This ensures that the adjusted distance is in fact an "overshoot" in that it occurs in a direction that is more or less a straight-line extension of the path from the preceding matched key.

In another aspect, the location determined as the final point of the input path (which represents the point at which the stylus is lifted from the touch-screen) is adjusted from the actual final data point received from the touch-screen digitizer. Certain touch-screen digitizers, particularly those commonly found in "TabletPC" devices, make use of "active pen" touch-screens, where the digitizer can sense the presence of the stylus tip even when it is hovering near the screen and not in actual contact with it. In such cases, the data reported when the stylus is removed from contact is unreliable, often exhibiting an erratic trace in a direction unrelated to the final intentional movement of the user. A similar result may be obtained due to the fact that the user's ability to intentionally control the movement of the stylus on the surface of the touch-screen may be reduced when the user lifts the stylus from the screen, at which time the stylus will often move erratically before actually breaking contact with the screen. In another aspect, when the input path changes direction by more than a determined threshold amount at a point of the input path that is less than a determined threshold distance along the remaining path length to the final data point of the input path, then the path point data following the point at which the change in direction is detected is ignored (discarded) and the direction-change location is regarded as the point at which the stylus was lifted.

Following return from the call to the Input Path Analysis Routine 3200, at block 3120 in the Main Processing Routine

3100, the Path-matching Routine 3300 is called to process the results of the analysis of the input path. As shown in FIG. 3C-1, at block 3305 the word candidate table is cleared by setting Num_Candidates to zero, and Max_Metric_Value is initialized to a flag value MAX_FLAG, indicating that the word candidate table is still empty. Then at block 3310 the process checks whether the inflection point table contains a single TAP or TAP-HOLD inflection point, and if so, at block 3315 the Process TAP Inflection Point Routine 3600 is called to handle the detected TAP input path.

Otherwise, in another embodiment, at block 3323, an adjustment is made to the maximum matching distance thresholds used to determine which letter-keys are greater than the maximum allowed distance from the detected inflection points (and the input path segments between them). With the computational speeds available with modern processors, much if not all of the analysis of the input path can be completed during the time that the user is actually entering the input path. This analysis that is performed before the path has been completed must be carried out with these thresholds set to their default values. Once the input path is complete, the results of the initial analysis can be adjusted based on characteristics of the completed input path that are determined through the initial analysis. For example, if the analysis determines that the maximum matching distance thresholds used were too small, letter-key to inflection point distances that were initially flagged as exceeding the maximum matching threshold distance are re-examined with respect to revised larger maximum matching distance thresholds, and reset in the IPT according to the comparison with the revised thresholds. Similarly, if the analysis determines that the maximum matching distance thresholds used were too large, then letter-key to inflection point distances that exceed to revised smaller thresholds are reset to being flagged as exceeding the maximum matching threshold distance.

In one embodiment, the average stylus speed along the entire current input path is determined and compared to the average stylus speed calculated for a determined number of the previously entered input paths. The result of the comparison (for example, the ratio of the two average speeds) is then used to adjust the values of various analysis parameters that apply to the entire input path. In one embodiment, the maximum matching distance thresholds used for one or more types of inflection points are adjusted in accordance with the comparison, wherein a relatively higher stylus speed for the current input path increases the size of the maximum matching distance thresholds relative to their default values. In another embodiment, as detailed below, a relatively higher stylus speed for the current input path increases the effect that the relative frequencies associated with words in the database has on the final scoring metric determined for potentially matching candidate words, such that words associated with higher relative frequencies are accorded a proportionally greater-than-average advantage in the calculated scoring metric. In another aspect, the local speed of the stylus as it passes through a determined neighborhood of a point on the input path is compared to the average stylus speed along the entire current input path, and the result of the comparison is then used to adjust the values of the maximum matching distance thresholds used for one or more types of inflection points that lie within the determined neighborhood. In another aspect, when the analysis detects that the movement of the stylus paused at one or more locations in the course of entering an input path, the duration of the detected pauses is omitted in calculating the average speed of the stylus for the entire input path so that the calculated average speed of the stylus reflects its average speed when actually in motion.

In a similar line of reasoning, to the extent that the entered input path is longer and/or has a higher than average number of inflection points detected, then the input path can be proportionately less precise, since the more letters there are in the intended word the less likely the input path will closely match any other word. Thus, in another aspect, the amount by which the maximum matching distance thresholds are increased is a function of the total length of the input path. In another aspect, the amount by which the maximum matching distance thresholds are increased is a function of the number of inflection points identified in the input path. In another aspect, when the Path-matching Routine 3300 finishes searching the database of words and scoring metric for the most-closely-matching word falls below a determined threshold, then the maximum matching distance thresholds are increased, and the database of potentially matching words is searched again using these larger maximum matching distance thresholds.

While other forms of organization are possible for the database of words searched by the Path-matching Routine 3300, in one aspect, the words in the database are organized in a fashion to facilitate efficient searching by the path-matching component. Every input path has two easily and reliably identified inflection points—the first (PenDown) and the last (PenUp)—which, in one embodiment, are always unambiguously matched with the first and last letters, respectively, of the word being input. In one embodiment, the words in the database are organized in a manner that takes advantage of this potential unambiguous matching to quickly and reliably eliminate a large number of potential candidate words from further consideration, thus shortening the time required to search the database. In one embodiment, words are stored in the database represented as strings of letters composed of an initial string component (hereinafter the "root" string) and a final string component (hereinafter the "suffix" string). Note that, although the term "suffix" is used to denote the final string component of a word, and while in many particular cases this component may in fact correspond to a suffix as it might be determined according to a linguistic analysis of a word according to the syntax of the natural language to which the word belongs, in the present invention the term "suffix" is used more generally to mean simply the final string component of a word representation in the database. Thus, for example, the suffix of a particular word representation may in fact be a "virtual" suffix in that all of the letters of the word are included in the root component, but wherein the representation of such a virtual suffix includes an indication of one or more of the final letters of the root portion so that the analysis described below can use the suffix in determining which words in the database are potentially matching candidate words with respect to an input path. Furthermore, the set of suffixes used within a given language database may be defined without regard to the identity of the set of suffixes syntactically determined by a linguistic analysis of the language. For example, the suffixes used may comprise the set of final letter-pairs that terminate one or more of the words in the database.

This approach of defining words in the database in terms of an initial root string and a final suffix string has two distinct advantages. One is that it economizes on storage, since each root and suffix string may be used to define a plurality of words in the database, but each root and suffix string need be stored only a single time in the database and referenced by means of an index each time it is used to define a word. A second advantage is that the PenDown inflection point and the initial portion of the input path can be analyzed to limit the number of possible matching roots to increase the efficiency with which possible word matches can be identified, since each root tends to be used in a plurality of words and the analysis of the root can be performed only once and need not be repeated for each word in which the root is referenced. Similarly, the PenUp inflection point and the final portion of the input path can be analyzed to limit the number of possible matching suffixes. To illustrate the great benefit of this approach, assume that each analysis of an input path, on average, eliminates all but 10% of the possible roots and 10% of the possible suffixes. Under the reasonable assumption that roots and suffixes are distributed more or less randomly among the words of the database, this means that, on average, only 1% of the database words needs to be analyzed in detail for each input path.

In another embodiment, each initial portion of a word is stored as an initial string (hereinafter referred to as a "prefix") followed by the remainder of the root portion (hereinafter the "root-core"). In another embodiment, all prefixes are defined to be of one fixed length so that each comprises the same number of letters. In another embodiment, each prefix is two letters in length, so that the initial letter pair of each word in the database is defined by a reference to the corresponding prefix. This approach has a number of benefits. One is that a table may be constructed with information regarding each letter-key pair that appears in a word of the database, either as an initial letter pair of a word or subsequently at a later position in a word. This table may be initialized with various data such as the distance between the centers of a letter-key pair and the slope of a directed line segment connecting the centers of the letter-key. Such information tends to be required repeatedly in the analysis of input paths, and a great deal of computation can be saved by looking such information up in a table rather than calculating it each time. Thus, in addition to storing such information, a letter-key pair table can indicate where a group of words is stored where each word of the group begins with the indicated letter pair. Another advantage of this approach is that the set of initial letter-key pairs that can possibly match a given input path can be determined quickly and reliably.

In another embodiment, words are stored in the database as a paired reference to a root-core index and a reference to a suffix index. In another embodiment, a root-core may comprise a Null string of length zero. In another embodiment, a suffix may comprise a Null string of length zero that is associated with a single letter-key. This approach adds additional flexibility in defining root-cores and suffixes in a way that tends to minimize the total amount of storage space required by the database, while still allowing the identification of a set of potentially matching suffixes for an input path that can be used to limit the number of words actually analyzed in searching the database. In another embodiment, an indication of the frequency of use associated with a word is associated with its definition as a paired reference to a root-core index and a reference to a suffix index. In another embodiment, an indication of the total length of a representative input path for a word is associated with its definition. When the path length associated with a word differs from the length determined for an entered input path by more than a determined threshold difference, the word can be eliminated as a potentially matching candidate word without further analysis.

There are a number of methods that can be used to determine the set of roots (and, in the aspect mentioned above, prefixes) and suffixes that are actually used in representing the words of a language for a database. In one embodiment, in addition to including all single-letter suffixes and all "virtual" suffixes (as defined previously) that indicate the identity of the final letter-key of the preceding root, an analysis is performed to identify the most commonly occurring terminal strings including more than one letter among the words to be represented in the database. A number (for example, six hundred) of the most commonly occurring suffixes is chosen to use as an initial suffix set in analyzing the words to be included in the database (the "word list"). A first pass through the word list is performed, wherein each word is assigned the longest suffix in the suffix set that matches the final letters of the word. Since the suffix set includes all possible single-letter suffixes, every word is guaranteed to match at least one suffix. This first pass determines a set of roots that must be defined to represent every word in the word list when constrained to the initial suffix set, since the suffix referenced by a word then determines where the word must be "divided" between its root and suffix portion. The number of times each defined root and suffix is actually referenced by a word is determined. Then repeated passes are made through the word list wherein the words are analyzed again to determine whether all of the words that reference a given suffix (or root) can be divided at different locations within the words such that the total number of roots and suffixes required to represent all of the words in the word list can be reduced. In one aspect, the process begins by analyzing words which reference the least-frequently referenced roots and suffixes. The process is repeated until the algorithm determines that the number of roots and suffixes identified and the total amount of memory required to represent them cannot be further reduced. For example, in one embodiment, a figure of merit is determined that is a weighted function of the number of suffixes, the number of roots, and the total memory storage required. The weighting applied to the number of suffixes may be increased since the number of suffixes in the database affects the speed with which an input path can be analyzed. Similarly, the overall weighting applied to the number of roots or suffixes may be a non-linear function, since the number of each determines how many bits are required to store the reference to a root or suffix in the representation of a word in the final database. For example, if the total number of suffixes is constrained to be less than 1,024, the reference to a particular suffix can be stored in a field of only 10 bits. In another aspect, the definition of one or more suffixes references one or more functions which determine the final spelling of a word. For example, a suffix may be defined to begin with a function which has the effect of deleting the final letter of the preceding root. Thus, a database containing the words "defined," "define," and "defining," a database might include the root "define" together with suffixes: "d", (virtual) "e" and "[DELETE PREVIOUS CHARACTER]ing". In combination, these yield: "define"+(virtual) "e"="define"; "define"+"d"="defined"; and "define"+"[DELETE PREVIOUS CHARACTER]ing"="defining". Another suffix function serves to repeat the immediately preceding character. Thus the word "preferred" could be defined in a database in terms of a root "prefer" and a suffix "[REPEAT PREVIOUS CHARACTER]ed". Such function-referencing suffixes reflect the morphological rules that determine how true linguistic suffixes commonly attach to word roots in a language. By incorporating such rules in the referenced suffixes of a database, the number of variant root forms required is significantly reduced, while the suffixes referencing such functions are no less useful in the processing and analysis of input paths.

In addition, by incorporating an appropriate set of suffixes that reflect the morphological rules of a language, further reductions in the overall size of the database are possible. Many words exhibit the same morphological variation in a language, and groups of suffixes that can be defined such that a single word-entry can be created in the database that references such a group of suffixes to define all of the corresponding words in a single entry rather than multiple entries. For example, for many English adjectives, a set of suffixes including "ly", "er" and "est" can be used to construct the adverbial, comparative and superlative forms, respectively. Thus, for example, a single entry referencing the root "great" and the above suffix group would generate "greatly", "greater" and "greatest." In another aspect, when words in the database include an indication of the frequency with which the word is expected to occur, such a suffix group includes a model of the relative frequencies generally expected for the various forms generated by the group with respect to the frequency of the most frequent form in the group. The frequency information stored in the database entry then indicates the frequency of the most frequent form, while the expected frequencies of the other forms are generated according to the frequency model associated with the group. In another aspect, when the expected frequency for a particular form of a particular word in such a word group differs from the frequency generated by the model by more than a threshold difference, a special entry (for example, consisting of a root combined with a single suffix) is created in the database which over-rides the group-generated form and its (incorrect) frequency information.

Returning to FIG. 3C-1, at block 3325 a Suffix Candidate Identification Routine 33100 (as shown in FIG. 3C-2) is called to determine which of the suffixes referenced in the database can be regarded as a potentially matching, and therefore valid, suffix with respect to the current input path. In accordance with another embodiment, at block 33110 the PenUp location is used to analyze and determine which of the set of possible suffixes referenced in the database can be considered as a possible match for the current input path by virtue of ending with a letter that is associated with a letter-key that is determined to be within the maximum matching threshold distance of the PenUp location. In other embodiments, the Suffix Candidate Identification Routine also allows for omissions, insertions and transpositions in the letters of a suffix candidate, so that the occurrence of a path entry error in the portion of an input path corresponding to the suffix component of the intended word does not prevent the system from correctly identifying the intended word through failing to recognize the suffix associated with the word as a valid candidate suffix.

This allows the system to identify word candidates when the user makes certain spelling errors (omissions, insertions, substitutions and transpositions) in the letters of the suffix of the intended word. In another aspect, the scores of the suffixes are adjusted (penalized) according to how well they match the final inflection points and segments of the input path. In further embodiments described below, the system correctly recognizes even entry paths corresponding to word spellings in which even the final letter-key of the suffix portion has been misspelled, so that the final letter of the correctly spelled suffix is not within the maximum matching threshold distance of the PenUp location. In one embodiment, at block 33120, the final letters of each suffix are examined to determine if they match a word-final letter substitution string where the final letter-key of the corresponding replacement string is within the maximum matching threshold distance of the PenUp location, and if so, the suffix is scored as a potentially matching candidate.

In a loop from block 33160 to block 33190, each potentially matching suffix is evaluated by a Suffix Scoring Metric Calculation Routine called at block 33180. For each suffix that is determined by the Suffix Scoring Metric Calculation Routine to conform closely enough to the input path, a numerical score is calculated that reflects how closely that suffix matches the input path. The Suffix Scoring Metric Calculation Routine is a modified version of the Scoring Metric Calculation Routine 3400, wherein in the modified version the letter-keys of a suffix are matched in reverse order starting from the end of the input path, and wherein no penalty is assessed when a suffix being scored is matched with only a final portion of the input path (as would be expected for any valid suffix), where no inflection point is skipped in the process of matching the letter-keys of the suffix to the input path. Since, as will be explained below, the exact score determined for the matching of a particular letter-key to a particular point on the input path is also a function of the matching of one or more adjacent letter-keys in a word, and since the same suffix can appear in different adjacent contexts in different words (depending on the final letter of the preceding root), for each scored suffix, the system preserves the specific (unadjusted) score for the first letter-key of each suffix (corresponding to the letter that immediately follows the root of a word) so that it can be adjusted in the context of each word in which it is used in order to determine a final score for that word. In another aspect (not shown in FIG. 3D), since the root context of the first letter of a suffix is unknown at the time of its processing by the Suffix Scoring Metric Calculation Routine, depending on the nature of the input and the preceding root, it may not be possible to determine whether the first letter of a suffix should be matched with a particular inflection point or with a path segment adjacent to the inflection point. Where the matching of the first letter of a suffix is thus indeterminate, two provisional scores are determined and recorded for the first letter of the suffix, and the Scoring Metric Calculation Routine 3400 determines which provisional matching to use in scoring each particular word that references the suffix. If at block 33185 the Suffix Scoring Metric Calculation Routine determines that a suffix is a potentially valid suffix for the current input path, then at block 33187 the suffix is temporarily marked in the database as valid. When all potentially matching suffixed have been examined by the Suffix Scoring Metric Calculation Routine, at block 33130 the Suffix Candidate Identification Routine terminates and returns to block 3330 in FIG. 3C-1.

At block 3330, in another embodiment, the process identifies each unique ordered pair of keys such that the first key of each pair is located within a predetermined maximum matching threshold distance from the PenDown inflection point, and the second key of each pair is located within a predetermined maximum matching threshold distance from the next detected inflection point location or is within a predetermined maximum matching threshold distance from the 1st or 2nd path segment (preceding or following the next detected inflection point location). This set of ordered pairs of letter-keys completely determines a set of two-letter prefixes wherein any potentially matching word in the database must reference one of the prefixes in the set, so that all other words in the database that reference prefixes not included in the set can be skipped in the database searching process.

In other embodiments, this set of ordered pairs of letter-keys is augmented by identifying additional ordered pairs of letter-keys. In one embodiment, the process also identifies each unique ordered pair of keys such that the second key of each pair is located within a predetermined maximum matching threshold distance from the PenDown inflection point, and the first key of each pair is located within a predetermined maximum matching threshold distance from the next detected inflection point location or is within a predetermined maximum matching threshold distance from the 1st or 2nd path segment (preceding or following the next detected inflection point location). This allows the process to identify matching words where the user has transposed the first two letters in his attempted spelling of the intended word. In another embodiment, the process identifies each unique ordered pair of keys such that the first key of each pair is located within a predetermined maximum matching threshold distance from the PenDown inflection point, and includes all possible second keys. This allows the process to identify matching words where the user has omitted the second letter in his attempted spelling of the intended word. In another embodiment, the process identifies each unique ordered pair of keys such that the first key of each pair is located within a predetermined maximum matching threshold distance from the PenDown inflection point, and the second key of each pair is located within a predetermined maximum matching threshold distance from the next two detected inflection point locations or is within a predetermined maximum matching threshold distance from the 1st, 2nd or 3rd path segment (i.e. anywhere along the path up to the third detected inflection point location). This allows the process to identify matching words where the user has inserted an additional letter in his attempted spelling of the intended word. These embodiments can be combined to allow for any type of spelling error (letter insertion, omission or transposition) at any point in the intended word. This applies equally to a simple error in tracing out the intended path, where the user attempted to enter a path that in fact corresponds to the correct spelling of the intended word, but inadvertently failed to trace the path within the predetermined maximum matching threshold distance from one or more letter-keys, or traced a path to an unrelated keyboard location prior to correcting the path to reach the vicinity of the next intended letter.

In another aspect, the process first calculates matching metric scores for the possible key prefixes according to how well they match the initial segment of the input path. In one aspect, this initial segment includes the Pen Down location and the following two segments and two detected inflection points to allow the system to identify word candidates when the user makes certain spelling errors (omissions, insertions, substitutions and transpositions) in the first two to three letters of the intended word. In another aspect, the scores of the initial letter prefixes are adjusted (penalized) according to how they match the initial inflection points and segments of the input path.

In another aspect, the possible key prefixes are sorted according to the matching metric scores determined for each. In another aspect, when the set of prefixes used each consist of exactly two letters, a Minimum Prefix Search Set is determined as the set of key prefixes where the first key is matched with the pen Down inflection point, and the second key is matched with the following segment or the first following inflection point. In another aspect, all words associated with one of the key prefixes in the set of the Minimum Prefix Search Set key prefixes are examined to see if they meet other criteria required to qualify for being scored as a possible candidate prefix. In another aspect, only the set of key prefixes comprised of those for which a matching score is calculated that is below a determined threshold value (the Maximum Prefix Search Set) is used to determine which words in the database will be examined as possible word candidates that match the current input path (i.e. only those words associated with a key prefix included in the determined set are considered to be potential candidates). In another aspect, the Maximum Prefix Search Set is expanded (if needed) to include at least the Minimum Prefix Search Set.

In another aspect, the possible key suffixes are sorted according to the scores determined for each. In another aspect, when the set of possible key suffixes identified include any that consist of exactly one letter, a Minimum Suffix Search Set is determined as the set of such one-letter key suffixes where the single key is matched with the Pen Up inflection point. In another aspect, only the set of key suffixes comprised of those for which a matching score is calculated that is below a determined threshold value (the Maximum Suffix Search Set) is used to establish which words in the database will be examined as possible word candidates that match the current input path (i.e. only those words associated with a suffix included in the determined set are considered to be potential candidates). In another aspect, the Maximum Suffix Search Set is expanded (if needed) to include at least the Minimum Suffix Search Set. In another aspect, all words associated with both one of the key prefixes in the Minimum Prefix Search Set and with one of the key suffixes in the Minimum Suffix Search Set are examined to see if they meet other criteria required to qualify for being scored as a possible candidate word. In another aspect, only those words associated with both one of the key prefixes in the Maximum Prefix Search Set and with one of the key suffixes in the Maximum Suffix Search Set are examined to see if they meet other criteria required to qualify for being scored as possible candidate words.

In another aspect, one of the criteria used to determine if a database word will be scored as a possible candidate word is whether the path length associated with the word in the database falls into one of a set of path length classes that fall within a predetermined threshold difference of the path length class into which the input path itself would be classified. In another aspect, one of the criteria used to determine if a database word will be scored as a possible candidate word is whether the frequency associated with the word in the database falls into one of a set of frequencies determined to be required for candidacy.

In another aspect, the identified and sorted sets of possible key prefixes and suffixes are analyzed to establish a hierarchical ranking such that words associated with the higher ranked key prefixes and suffixes are required to meet less-stringent frequency requirements (i.e. even words of relatively lower frequency will be considered as candidates when they are associated with the higher ranked key prefixes and suffixes). Similarly, words that are associated with the lower ranked key prefixes and suffixes are required to meet more-stringent frequency requirements (i.e. only words of relatively higher frequency will be considered as candidates when they are associated with the lower ranked key prefixes and suffixes). In this fashion, the algorithm can constrain the total number of candidate words examined to that which can be achieved and still complete the analysis within an acceptably short overall system response time, while maximizing the likelihood that the set of candidate words actually examined will include the intended word, since virtually all possibly matching high-frequency words are examined along with all of the most-likely matching low-frequency words. This enables the algorithm to make maximally efficient use of the available processing time in the searching and matching procedure.

In another aspect, the maximum matching threshold distances (beyond which a key is not considered to be a potential match for an inflection point or path segment) are adjusted with respect to the available processing power and according to whether the user assigns greater priority to receiving a prompt response from the system following the entry of an input path, or whether the user prioritizes the ability to enter each input path in a less-precise (and therefore, generally faster) manner. By reducing the maximum matching threshold distances, the number of possible candidates identified will be reduced, but input paths will have to be entered correspondingly more precisely. Conversely, by increasing the maximum matching threshold distances, the number of possible candidates identified will be increased, but input paths will be able to be entered correspondingly less precisely. In a similar manner, according to the same user preferences, the hierarchy of the candidate key prefixes and key suffixes can be adjusted to either increase or decrease the number of candidates examined, respectively increasing system response time (and decreasing the precision required in input paths) or decreasing system response time (and increasing the precision required in input paths). In another aspect, the parameters used to set both the hierarchy of the candidate key prefixes and key suffixes and the maximum matching threshold distances are all set in response to a single user setting. In one aspect, this single user setting is a slider control that is, for example, labeled at one end as "Faster Response" and at the other end with "Sloppier Input." This enables the user to control the operation of the algorithm at a very sophisticated level with one simple, easy-to-understand control.

In a system for continuous stroke word-based text input, in order to control the depth and breadth of the word candidate searching and evaluation process (and therefore the amount of execution time required to process an input path on a given input device), a variety of parameter thresholds can be adjusted, individually or in any combination (or in response to a single "master" search parameter that controls how a number of specific sub-ordinate thresholds and parameters are set), to determine how closely a given word candidate needs to match an input path (as measured by each of the adjusted thresholds) in order to qualify as a word candidate for which a matching metric score will be calculated, or for which a more detailed (and presumably more "precise") matching metric score will be calculated (which process of further evaluation and analysis consumes a more significant amount of computation time). As previously described, this "master search parameter" (or, equivalently, all of the subordinate parameters together) can be set with respect to a single user setting, controlled by the user with, for example, a single slider control. The following description includes various references to this "master search parameter," which is one previously disclosed aspect of the system and method for continuous stroke word-based text input. However, it will be obvious to one of ordinary skill in the art that the present invention of a method for automatic adjustment of search candidate criteria thresholds and parameters does not require the use of a "master search parameter," and can equally be applied to a single parameter or threshold or a specific set of individual parameters or thresholds.

The values of the matching metric score that are calculated with respect to the input path for the user's intended words (i.e. the word in each case that the user was trying to input when the input path was entered) tend to follow certain patterns. In general, the system is implemented such that there is an absolute threshold matching metric value that the matching metric score calculated for an intended word will tend not to exceed (note that a lower matching metric score indicates a better fit with the input path). The appropriate value of this absolute threshold matching metric value can vary based on the particular calculations performed in determining the matching metric score, the current settings of various search parameters, and the actual nature of a user's input paths and the general level of precision with which paths are entered. In one aspect, this absolute threshold matching metric value is calculated as a statistic of the matching metric scores of words that are accepted for output by the user. In another aspect, this absolute threshold matching metric value is calculated as a statistic of the matching metric scores of only those words that are accepted for output by the user and that are not edited later and changed to alternate word choices. In another aspect, this absolute threshold matching metric value is set as a static, fixed value based on the range of matching metric scores that tend in general to be produced by the matching metric calculation for words that are accepted for output by users in general.

In another aspect, a first search of the database of words is performed with the subordinate search thresholds and parameters set initially according to the "master search parameter" setting (or equivalently, according to their current default values). If no candidate words are found that qualify (according to the initial setting of the search parameters) as a word candidate for which further evaluation and analysis will be performed, then no matching words are identified by the system. In this case, the various search parameters (or equivalently, the "master search parameter") are then automatically adjusted to a level that allows for less-precise matching of a candidate word with the input path, and a second search process is performed for the current input path. In another aspect, if the first search identifies one or more candidate words that do qualify (according to the initial setting of the search parameters) as word candidates for which further evaluation and analysis will be performed, but none of the calculated matching metric scores is better than (less than, in the case of the calculation described previously) the determined absolute threshold matching metric value, a second search is performed with the various search parameters (or equivalently, the "master search parameter") automatically adjusted to a level that allows for less-precise matching of a candidate word with the input path. In another aspect, a second search is performed unless at least one candidate word is found that with a matching metric score that is better than the determined absolute threshold matching metric value, and for which every letter of the word was successfully matched to the input path in the correct order (such that no "spelling" penalties are assessed), and for which every inflection point detected in the input path was successfully matched with a letter of the candidate word. In another aspect, the search process is repeated one or more times with one or more of the various search parameters (or alternatively, the "master search parameter") automatically adjusted to higher and higher levels that allow for less and less precise matching of a candidate word with the input path until a word candidate is identified with a calculated matching metric score that is better than the fixed absolute threshold matching metric value, or until the various search parameters have been adjusted to their highest allowed levels. In another aspect, these adjusted search parameter levels are chosen so that the search process is never performed more than two or three times.

The above aspects allow for a system in which the search parameters have been set to values that are low enough that the system responds quickly to each input path (on average), even when the system is run on a device with a very slow processor. In the vast majority of cases where these low search parameter settings prevent the user's intended word from qualifying as a candidate word, no other word will be identified for which a matching metric score is calculated that is better than the determined absolute threshold matching metric value, so in such cases the search process will be repeated until the intended word does qualify as a candidate, and is then successfully identified as the intended word (the word with the best calculated matching metric score, which is presented as the default word). This is highly advantageous to the overall system performance since it allows the system to be configured such that the initial search performed is aggressively optimized to restrict the number of word candidates that are evaluated in the initial pass of the search process, so that in the majority of cases the intended word is quickly identified. At the same time, rather than simply failing to identify the intended word (because the search process did not search broadly enough in the database to retrieve and evaluate the intended word), the search process will occasionally spend more processing time on an input path, but will still identify and produce the intended word whenever a reasonable but less precise input path is entered.

Then, returning to FIG. 3C-1, in another embodiment, at block 3335, the process identifies the range of input path lengths that are associated with words in the database that are considered to be potential matches with the input path based on its actual length as measured by the Input Path Analysis Routine and stored in the IPT. Then the loop from block 3340 to block 3350 is executed for each ordered pair of keys identified at block 3330, where at block 3345 the group of words in the database is identified that references any prefix that corresponds to the current ordered pair of letter-keys. Then the loop from block 3360 to block 3390 is executed for each word in the group of words identified at block 3345. At blocks 3365 and 3370, the process checks whether the word qualifies as a candidate based on the frequency associated with the word, the prefix and suffix referenced by the word, and on the input path length (or path length class) associated with the word. In one embodiment, if any of these qualifications is not met, then the word is skipped over and the next word is considered. In another embodiment, the set of valid prefixes and suffixes is determined as a function of the frequency associated with the word.

If the word does meet all of the preliminary qualifications, then at block 3375 the sequence of letter-keys associated with the word is copied to an array KEYS[], the variable SUFFIX is set to the index value that identifies the suffix referenced by the current word, and WORD_Len is set to its length. At block 3380, a Scoring Metric Calculation Routine 3400 (shown in FIG. 3D) is called to calculate the Scoring Metric value for the current word. Then at block 3385, an Update Word_Candidates Table Routine 3700 is called to determine whether the calculated Scoring Metric value is good enough to qualify the current word to be provisionally added to the Word_Candidates[] table of the top matching word candidates identified in the database, and if so, to add it to the table. Once all of the identified qualifying candidate words have been evaluated, the routine returns at block 3355 to the Main Processing Routine 3100, where at block 3125 the Display Selection List Routine 31000 (shown in FIG. 3J) is called to determine whether to immediately generate the top-scoring Word Candidate for output as the textual interpretation of the input path, or to display the identified word candidates in a selection list on the text display 2106.

FIG. 3D-1 shows a flowchart of an embodiment of the Scoring Metric Calculation Routine 3400, called at block 3380 of the Path-matching Routine 3300. The process depicted in FIG. 3D-1 determines whether it is possible to identify a valid matching between the inflection points (and, if necessary, path segments) of an input path and the keys associated with the letters of a candidate word. If such a matching is possible, the routine of FIG. 3D-1 identifies an optimal or close to optimal matching so that a Set Scoring Metric Value Routine 3700 called at block 3490 can quickly and simply calculate the actual value of the Scoring Metric according to the identified matching arrangement. Note that the algorithm of FIG. 3D-1 does not require the use of recursion, and is extremely fast and efficient. An implementation of the present invention runs in real-time on a standard Hewlett-Packard iPAQ 2215 PocketPC device with an Intel XScale 400 MHz processor, completely processing each input path and completing a search of a 60,000 word database with an average response time of less than 150 milliseconds from the receipt of the PenUp data point.

The algorithm shown in FIG. 3D-1 matches the letter-keys corresponding to a candidate word of length WORD_Len (stored in an array KEYS[]) with the set of inflection points determined for an input path and stored in the IPT. In one embodiment (not shown in FIG. 3D), as the inflection points and path segments of the current input path are matched in sequence with the letter-keys of a candidate word, when the next letter-key of a candidate word is greater than the determined maximum matching threshold distance from both the current path segment and the next inflection point to be matched, the current word is rejected as a possible candidate to match the current input path and the system proceeds to evaluate the next possibly matching candidate word. In another embodiment (also not shown in FIG. 3D), for computational efficiency, the Scoring Metric Calculation Routine makes use of the result obtained from the original evaluation of the suffix associated with a word (performed by the Suffix Scoring Metric Calculation Routine to determine whether words referencing a particular suffix are to be considered as potentially matching candidates) and calculates a Scoring Metric result only for the root portion of each word, merging that result with that obtained for the suffix to determine a final Scoring Metric value for each complete word. For simplicity, the embodiment shown in FIG. 3D depicts a method wherein a Scoring Metric value is calculated based on analyzing all of the letter-keys corresponding to the entire candidate word.

In another aspect, when the distance from a determined inflection point of the input path to the next corresponding letter-key of a word is greater than the determined maximum matching threshold distance, the word is retained as a word candidate and a scoring penalty is applied to the word that is used in computing the scoring metric for the word (hereinafter, the "skipping penalty" since the inflection point is "skipped" in the matching process for the word). In one aspect, different skipping penalties are assessed for different types of inflection points, where higher penalties are assessed for skipping an inflection point of a type that is deemed more likely to correspond to a letter of the intended word. In another aspect, other skipping penalties are also assessed when an inflection point is only partially matched, such as a DoubleLetter inflection point that is matched with a letter-key corresponding to a letter in a word that is not repeated, or a DoubleLetter inflection point that is matched with two neighboring, but distinct letter-keys that correspond to two different successive letters of a word. Although not shown in block 3330 of FIG. 3C-1 (for simplicity), in another embodiment, additional prefix letter-key pairs are identified in which either or both of the first two detected inflection points are skipped, and wherein the corresponding skipping penalties are determined and assessed by the Scoring Metric Calculation Routine of FIG. 3D against every word referencing such additional identified prefix letter-key pairs. Similarly, in another embodiment, additional prefix letter-key pairs are identified in which the letter-keys of the pair are matched with the first two detected inflection points in reverse order (corresponding to a spelling transposition error as described below), and wherein the corresponding letter-transposition penalties are determined and assessed by the Scoring Metric Calculation Routine against every word referencing such additional identified prefix letter-key pairs.

In another aspect, an additive skipping penalty is assessed against the word being scored by adding a determined weighted penalty amount to the sum of the weighted distances of the letter-keys of the word from the path points with which they are matched in calculating the scoring metric for the word. In another aspect, the additive skipping penalty is determined to be the maximum matching threshold distance determined for the type of inflection point that is skipped, wherein the standard weighting applied for the type of inflection point that is skipped is used to weight this additive penalty amount in calculating the scoring metric for the word. In another aspect, the additive skipping penalty is determined to be the average distance determined for each letter-key of the word that is matched to a corresponding point of the input path, wherein the standard weighting applied for the type of inflection point that is skipped is used to weight this additive penalty amount in calculating the scoring metric for the word.

In another aspect, the system calculates a running average of the scoring penalties assessed against the words selected for output by the user (either actively selected or by default). In another aspect, separate running averages are calculated for words in each of a plurality of classes. In one aspect, the different classes are defined in terms of the number of inflection points identified for the input path from which the word was generated. In another aspect, the different classes are defined in terms of the length of the input path from which the word was generated. In one aspect, the system uses the one or more calculated running averages of scoring penalties for output words to adjust the impact of penalties assessed on scored words in a manner that is inversely proportional to the average penalty level. The result is that when a user tends to have consistently higher penalties assessed against their selected words, the negative impact of the scoring penalties on the final score of a word is lessened, and vice-versa, when a user tends to have consistently lower penalties assessed against their selected words, the negative impact of the scoring penalties on the final score of a word is increased.

This allows good spellers to be sloppier (since penalties will be higher against words with spelling mismatches, so that an input path without spelling inaccuracies can be in general be less precise, as long as it passes near enough to the letters of the word in the proper order). At the same time, this approach enables poor spellers to find their intended words at or near the top of the word choice selection list (when the user is more careful, and performs somewhat "more-precise" misspellings so that an input path is relatively closer to the intended letters, even though some of the intended letters are incorrect or out of order).

Another aspect relates to the embodiment in which a small circular gesture is performed to create a DoubleLetter inflection point. Depending on the relationship between the direction from which the double-letter key is entered and the direction in which the input path continues when leaving the key, it may be difficult for a user to determine how many repetitions of a "small circular gesture" have actually been performed. In yet another aspect, additional repetitions of the movement are processed by the system in the same fashion as a single performance of the movement. In this aspect, one or more repetitions of the movement are matched with any sequence comprising two or more consecutive occurrences of the same letter in a word, or two or more consecutive occurrences of alternative forms of the same letter. In yet another aspect, when a small loop is detected in the input path that does not complete a full 360° change in the slope of the input path, an alternate class of DoubleLetter2 inflection point is identified that is matched by the system both as an AngleThreshold inflection point and as a true DoubleLetter inflection point, choosing the appropriate interpretation for each evaluated candidate word that best matches the word. An example of such an inflection point can be found in entering the input paths for the words "fed" and "feed," where there may be ambiguity in whether the traced path was intended to contain a double letter gesture. The path may begin within the "f" key, proceed up and over to the "e" key, and depending on the user's habits in tracing an input path, the path may inadvertently loop over to the right and back down across itself in proceeding down to the "d" key. Assuming the path traverses the center of the "f" and "d" keys and loops around the center of the "e" key (an ideal path for correct recognition), the slope of the path changes by only about 220° between the entry into and exit from the "e" key. At the same time, this path may seem like a perfectly correct execution of a DoubleLetter gesture to a user who intends to enter the word "feed", since a small closed loop has been traced on the "e" key. In another aspect, a separate additive penalty factor is calculated for use with a DoubleLetter2 inflection point when matched with a single vs. a double letter. Two flags determine whether an adjustment factor is added to the scoring metric calculated for a candidate word when a DoubleLetter2 inflection point is matched with a single letter, or when it is matched with a double letter. When a small loop is traced by the user that does not complete a full 360° change in slope, and the word choice list contains words which match for both a single letter and a double letter, the system determines which of the two alternate words was selected for output by the user. When the user's selection appears lower in the selection list than the corresponding alternate word, an incremental change is made in the adjustment factors (and when necessary, the associated flag values) used for a DoubleLetter2 inflection point. This enables the system to better accommodate a user who habitually creates small loops at inflection points where the path "reverses" direction in both the x- and y-components, as in the current example. In another aspect, separate values of the flag and adjustment factors are calculated for different ranges in the number of degrees by which the slope changes in completing the loop gesture.

In another aspect, a multiplicative skipping penalty is assessed against a word being scored by increasing a determined multiplicative penalty factor by which the sum of the weighted distances of the letter-keys of the word from the path points with which they are matched is multiplied when calculating the scoring metric for the word. In one aspect, the amount by which this multiplicative skipping penalty factor is increased is determined with respect to the type of inflection point that is skipped. In another aspect, when the multiplicative penalty factor determined for a word exceeds a determined threshold, then the word is eliminated as a potentially matching candidate for the input path. In another aspect, in calculating the scoring metric for a word, a separate multiplicative factor is applied to the sum of the weighted distances of the letter-keys of the word from the path points with which they are matched, where this separate multiplicative factor is determined with respect to the frequency associated with the word being scored, and wherein this multiplicative factor is larger for words associated with lower frequencies.

The skipping penalty approach described above provides a computationally simple approach that achieves a surprising and useful result. This method of determining the scoring metric for words enables the system in a significant number of cases to correctly identify the intended word despite significant errors on the part of the user in entering the input path. One type of error that is frequently accommodated is the deliberate insertion of an additional letter in the course of entering an input path corresponding to the misspelling of the intended word. In this case, the system produces the correctly spelled version of the intended word (assuming that the misspelled version of the word has not been deliberately added to the database). Another type of error that is frequently accommodated is where the user has become lost, distracted, or confused and begins to trace out the input path in a direction that does not lead toward the next letter of the word, and in realizing and correcting the mistake, a distinct AngleThreshold inflection point is generally created. Since an average user will frequently pause at such a time, a PauseAngle inflection point (as described above) is often detected. Since the situation just described is often the reason why such a PauseAngle inflection point is created, inflection points of this type are associated with both a much lower-than-average weighting and a very low skipping penalty.

As was just described, the skipping penalty approach for inflection points detected in the input path that are skipped in the process of matching the letter-keys of a word allows for the generation of a correctly spelled version of an intended word despite the presence of spelling letter-insertion errors on the part of the user. With a large database of words for a language (for example, over 60,000 words for United States English), there tends to be a high "density" of ideal input paths corresponding to words in the database that are relatively short. In such cases, errors of this type often produce input paths that are determined to more closely match one or more words other than the intended word. However, even in such cases, the intended word frequently appears in the list of alternate word choices presented to the user. When the intended word is a longer word, the intended word is frequently determined to be the most closely-matching word. This approach is consequently very successful in accommodating spelling insertion errors and unintended path entry errors.

In a similar but distinct aspect, skipping penalties are assessed when a letter-key of a word is greater than the determined maximum matching threshold distance from any potentially corresponding point of the input path (hereinafter, a "letter-skipping penalty"). This corresponds to a letter-omission spelling error in tracing out the input path for an intended word. It is less likely to correspond to a simple path-entry error, since the present invention allows for the use of very liberal maximum distance thresholds, such that even quite sloppy attempts to enter a given letter will usually be able to be matched to the intended letter. In another aspect, a letter-transposition penalty is also determined and assessed when two letter-keys of a word are matched to corresponding points of the input path that occur in reverse order on the input path as compared to order of the letters in the correct spelling of the word. This corresponds to a letter-transposition spelling error in tracing out the input path for an intended word. In another aspect, when it is determined that both an inflection point skipping penalty and a letter-skipping penalty should be assessed against a word being scored, and both penalties are detected in the analysis between the matching with the input path of the letter preceding the skipped letter and of the letter following the skipped letter (or when the skipped letter and the skipped inflection point both occur at the beginning of the word and input path, respectively, or both occur at the end of the word and input path), then a single letter-substitution penalty is assessed against the word being scored. This is reasonable since a letter-omission error and a letter-insertion error that both occur at the same point within a word is equivalent to substituting one letter for another in the spelling of a word.

In an aspect analogous to that for inflection point skipping penalties, an additive letter-skipping penalty (or, in the case of a letter substitution, an additive letter-substitution penalty) is assessed against the word being scored by adding a determined weighted penalty amount to the sum of the weighted distances of the letter-keys of the word from the path points with which they are matched in calculating the scoring metric for the word. In another aspect, the additive letter-skipping penalty (or letter-substitution penalty) is determined to be the average distance determined for each letter-key of the word that is matched to a corresponding point of the input path, wherein a standard determined weighting for skipped letters is used to weight this additive penalty amount in calculating the scoring metric for the word. In assessing a letter-transposition penalty, no additive penalty is assessed since each letter-key of the word is still matched with a corresponding point of the input path from which an appropriately weighted distance is measured.

In another aspect, a multiplicative letter-skipping penalty (or, in the case of a letter substitution, a multiplicative letter-substitution penalty) is assessed against the word being scored by increasing a determined multiplicative penalty factor by which the sum of the weighted distances of the letter-keys of the word from the path points with which they are matched is multiplied when calculating the scoring metric for the word. In another aspect, a multiplicative letter-transposition penalty is assessed against the word being scored by increasing a determined multiplicative penalty factor by which the sum of the weighted distances of the letter-keys of the word from the path points with which they are matched is multiplied when calculating the scoring metric for the word.

Turning to FIG. 3D-1, at block 3405, separate variables keyIndex and ipIndex are initialized to 0 so that they can independently step through the letter-keys of the word, and the inflection points and path segments of the input path, respectively, in order to determine an appropriate matching. Loop limits keyLimit and ipLimit are set to the number of the letter-keys in the current word and the number of inflection points in the IPT, respectively, and the variables used to accumulate the various coring components are initialized to zero. Then at blocks 3410 and 3415, the main loop limits are tested, and the process exits from the main loop to block 3470 as soon as either limit is reached.

At block 3420, for each letter-key of the word to be matched to the input path, the process identifies the preceding, current and following letter-keys as lastKEY, KEY and nextKEY, respectively, where lastKEY and nextKEY are set to recognized invalid values at blocks 3405 and 3430 to address the boundary conditions where there is no preceding or following letter-key. The next inflection point in the IPT to be matched is accessed through the variable IP, and matchFlag is initialized to an invalid value. Then at block 3435 the Letter-Key to Path-matching Routine shown in FIG. 3D-2 is called to identify whether and where the current letter-key KEY should be matched to the input path.

Then in FIG. 3D-2 at block 34105, the process determines whether KEY is within a maximum matching threshold distance from the inflection point IP. If so, at block 34110, the process then determines whether nextKEY is also within a maximum matching threshold distance from the inflection point IP. If so, the process begins at block 34115 to determine which letter-key should be matched with IP by first checking whether they are actually the same letter-key repeated twice in sequence (reflecting a repeated letter in the candidate word). If they are the same key, then at block 34120 the process checks whether the current IP is a type DoubleLetter inflection point, and if so, at block 34125 matchFlag is set to reflect the matching of a double-letter with a DoubleLetter inflection point. If the current IP is not a DoubleLetter inflection point, then at block 34175 the process determines whether there is a DoubleLetter inflection point that is coming up soon enough on the input path that the matching of KEY and nextKEY should be delayed until the upcoming DoubleLetter inflection point is reached, and if so, at block 34180 the process returns with matchFlag still set to an invalid value so that the match is delayed until the appropriate time. If not, at block 34125 matchFlag is set to reflect the matching of a double-letter with an inflection point that is not of type DoubleLetter. If on the other hand, at block 34115 KEY and nextKEY are found to be different, and at block 34150 the current IP is in fact a DoubleLetter inflection point, then at block 34155 the process determines whether there is a double-letter that is coming up in the candidate word and that all preceding letter-keys can be successfully matched with the current path segment, and if so, at block 34165 the process returns with matchFlag set at block 34160 so that that KEY will be matched with the current path segment. If at block 34150 the current IP is not a DoubleLetter inflection point, then at block 34170 the process determines which matching of KEY and nextKEY (with respect to the current IP, the current and following path segments, and following inflection point) minimizes the total score assessed for the word and sets matchFlag accordingly before proceeding.

At block 34130, the process has determined the location on the path with which KEY is to be matched, and, since the letter-keys of a word are matched in sequence, the process has also determined the location on the path with which the preceding letter-key is to be matched. In another related aspect, in calculating the scoring metric for a word, for each successive letter of the word, the distance of the letter-key from the path point with which it is matched is adjusted by a factor that is a function of the ratio (or, in an alternate embodiment, the difference) between the actual path length and the straight line distance between the matched path point and the path point matched with the preceding letter. This approach provides a useful result because the more the input path deviates significantly from a straight path between two successively matched points, the more likely it is that the path diverts to pass near a letter-key that is part of the user's intended word, but that is not part of the word being scored. This approach thus tends to penalize the scores of words other than the user's intended word. In another aspect, the amount of influence of this factor is scaled depending on the separation between the two successive matched points, increasing the effect of the factor for keys that are more widely separated, and reducing it for keys that are in closer proximity (and, in one embodiment, eliminating it as a factor when keys are closer than a determined minimum threshold). This avoids attributing an inappropriately large effect on the scoring metric to a path deviation that is not really significant, since it is common for an input path to deviate noticeably from a straight-line path between keys, and even a slight deviation over a relatively short distance can result in a path-length to straight-line ratio that would have a significant effect on scoring. Thus, at block 34130, a PathLengthFactor is calculated in accordance with the above embodiment.

In a related but distinct aspect, in calculating the scoring metric for a word, for each successive letter of the word that is matched with a detected inflection point, the distance of the letter-key from the inflection point with which it is matched is adjusted by a factor that is a function of the ratio between the straight line distance between the matched inflection point and the preceding inflection point, and the straight line distance between the letter keys of the word being scored that are matched with these inflection points. The amount by which the letter-key-to-inflection-point distance is adjusted is a function how much the ratio of the two straight-line distances varies from a 1-to-1 ratio. This approach provides a useful result because, on average over the course of scoring a word, this ratio should tend to closely approximate a 1-to-1 ratio for each letter of the user's actual intended word, while it will generally tend to diverge from a 1-to-1 ratio for other words. This approach thus also tends to penalize the scores of words other than the user's intended word. Thus, at block 34130, a LengthFactor is also calculated in accordance with this embodiment.

In another related aspect, in calculating the scoring metric for a word, for each successive letter of the word, the distance of the letter-key from the path point with which it is matched is adjusted by a factor that is a function of the difference between the slope of a line between the matched path point and the path point matched with the preceding letter, and the slope of a line between the two corresponding matched letter-keys. This approach provides a useful result because, on average, as the user traces out an input path for a word, the slope of each path segment between successive letters should approximate the slope between the letters themselves. In contrast, for words other than the intended word, there will generally be greater deviations between these slopes. This approach thus also tends to penalize the scores of words other than the user's intended word. In another aspect, the amount of influence of this factor is scaled depending on the separation between the two successive matched points, increasing the effect of the factor for keys that are more widely separated, and reducing it for keys that are in closer proximity (and eliminating it as a factor when keys are closer than a determined minimum threshold). This avoids attributing an inappropriately large effect on the scoring metric to a slope deviation that is not really significant, since, when two keys are relatively close, it is possible for an input path to pass close by both keys without having to significantly change direction in moving from one to the next. In another aspect, when the difference between the two slopes exceeds a determined threshold, then it is determined that the letter-key cannot validly match the path at the originally matched point. In another aspect, when a letter-key has been matched with an inflection point and the two slopes exceed the determined threshold, then an alternative matching path point is determined as the closest path point to the letter-key, and the slope difference is re-calculated based on the alternative matching path point. If the slope difference calculated for the alternative matching path point location is less than the determined threshold, then the calculated slope difference is used to adjust the distance of the letter-key from the originally matched inflection point. This alternative matching procedure accommodates cases where, for example, the user "overshoots" a letter-key in a direction that is essentially perpendicular to the line between the two matched letter keys. In such cases, the input path will still tend to pass close enough to the letter-key of the intended word (before "overshooting") that the closest point on the input path will still pass the slope-difference test. This adaptation ensures that the word actually intended by the user does not fail the test. In contrast there is no serious detriment to the performance of the system when an unintended word passes this test when it should actually fail, since the combined effect of the other aspects of the present invention make it highly unlikely that such an unintended will result in the best numerical scoring. Such pass/fail tests must in general be quite conservative to avoid the serious error of disqualifying the intended word. Thus, at block 34130, a SlopeFactor is also calculated in accordance with this embodiment, and at block 34135 the calculated SlopeFactor is compared to a maximum threshold that is determined with respect to the separation between the two matched path points.

In another aspect, the average value of the Slope Difference for each successive pair of keys in a candidate word is calculated and used to determine a multiplicative factor that is applied in calculating the matching metric score for a candidate word.

In another aspect, two path locations are determined for a key that is matched to an input path segment (a "segment" match). One is the point on the path segment that is actually closest to the matched key (the Match Position), and is used as the path location from which the distance to matched key is calculated. The second is the point within a predetermined maximum distance of the Match Position where the second difference value attains a local maximum value (the Match Location). The Match Position and the Match Location may turn out to be the same point, or they may differ slightly. In another aspect, when the current key (the key for which the matching algorithm is identifying a path location to which the key is matched) is matched to a path segment and the following key is provisionally matched to a point later on the same path segment or to the following inflection point at the end of the path segment, the magnitude of the difference between the change in slope from a vector connecting the previous key of the scored word to the current key to a vector connecting the current key to the following key of the scored word, as compared to the change in slope from a vector connecting the path location to which the previous key of the scored word is matched to the path location (the Match Location) to which the current key is matched to a vector connecting the path location to which the current key is matched (the Match Location) to the path location to which the following key of the scored word is provisionally matched (the "Vector Difference"). When the magnitude of the Vector Difference exceeds the magnitude of the Slope Difference, the adjustment factor is calculated with respect to the magnitude of the Vector Difference. This allows the algorithm to make finer discriminations between paths that may or may not include a key matched to a path segment. For example, an input path may be entered for the word "is" as a relatively straight line that passes near the key for the letter "t," while the start and end points are somewhat further away from the "i" and the "s." The use of the Vector Difference helps to avoid allocating the word "its" a better score than the word "is" when the path entered does not reflect the slight deviation between the vectors from key "i" to key "t" and from key "t" to key "s." The Vector Difference is calculated based on the Match Location (rather than the Match Position) because, if in fact the current candidate word being scored is the word intended by the user, then the Match Location is more likely to correspond to the point in the input path where the user began to "change course" to move on to the key following the current key. The use of the Match Position as the location from which the distance to the matched key is measured minimizes the score for the intended word, since, just as in the case with the position of inflection points (which often tend to "overshoot" their intended target key), the "course correction" that may occur in the vicinity of a "segment match" location tends to occur after the path has gone past the intended key. This use of the Match Position is thus analogous to the calculation of the distance from a key to an inflection point that allows for "overshoot" by calculating the distance as a function of both the actual distance to the IP and the shortest distance to the key from the nearest preceding path segment location.

In another aspect, the distance from a key that is matched to an input path segment (a "segment" match) to the matched path location is further adjusted by a factor that is a function of two ratios that are determined by the locations of the keys that precede and follow the current key, and the input path locations to which these keys are matched. The first ratio is the sum of the distance from the preceding key location to the current key location plus the distance from the current key location to the following key location, divided by the distance from the preceding key location to the following key location. When all three key locations are perfectly co-linear, this ratio is equal to 1, otherwise it is greater than 1. The second ratio is the distance along the input path from the location to which the preceding key is matched to the location to which the following key is matched, divided by the straight-line distance between these same two input path locations. When the input path between these two locations is perfectly straight, this ratio is equal to 1, otherwise it is greater than 1. In one aspect, the distance from the key to the path segment location is adjusted (increased) by a factor that is calculated as the ratio of the larger of these two ratios to the smaller of the two ratios. The result is that the score accumulated for the key matching is increased (indicating that the word is a less likely match for the input path) when the "curvature" or "straightness" of the path does not conform to that of an ideal path through the centers of the corresponding key locations. In another aspect, the distance from the key to the path segment location is adjusted (increased) by this factor only when the first ratio is greater than the second.

This adjustment is achieved at a very low computational cost, but significantly improves the ability of the scoring algorithm to discriminate between two very similar word candidates. For example, the words "pat", "past" and "part" have very similar "ideal" paths since both the "s" and the "r" keys are very close to lying on the direct path from the "a" to the "t" key (on a standard "Qwerty" keyboard layout). When an input path is quickly traced out for a word, it is very difficult to precisely control the placement of each inflection point in creating a path. However, it is relatively easy to quickly trace out a path segment that is relatively straight between its two end points, even though the two end points (as just observed) may not be placed with precision. Thus, in the present example, the word "pat" may be easily and quickly entered by tracing a path that starts near the "p", moves along a relatively straight path to the vicinity of the "a" key, then changes direction sharply to move along a relatively straight path to the vicinity of the "t" key before ending. Likewise, it is a simple matter to move to the vicinity of the "r" before "leveling off" to move to the vicinity of the "t" (to enter "part") or to straight to the right to the vicinity of the "s" before angling upward to the vicinity of the "t" (to enter "past"). In each case, the path entered is natural (given the relative placement of the various keys) and easily performed since there is no need to precisely control the location of the path at any point. In each case, the three inflection points (near the "p", "a" and "t") are matched with the same letter, so that the distances to the respective keys are the same in scoring word (prior to any other adjustments that are made to the scoring). The current aspect allows the intended word to be easily entered by controlling the general shape of the path segment between the "a" and the "t" (straight, curved up toward the "r", or curved down toward the "s"), without having to carefully control how close the path lies to either the "r" or the "t."

In another aspect, the weighting applied to a distance measured from a key to a point on a path segment is determined as a variable weight that is scaled between a predetermined minimum and maximum value. In another aspect, the weighting is scaled by a factor calculated as the difference in length along the input path from the point to which the preceding word key was matched to the point to which the current key is matched from the length between the two matched points measured in a straight line (the Length Factor). This weighting approach increases (worsens) the score for a key that is not matched to a point on the path where the path to the matched point from the path point to which the preceding key is matched is a relatively straight line. This is logical, since if there is significant curvature to the path, it would tend to indicate that the path diverged in order to go to the vicinity of a word key. If no key in the current candidate word matched the path segment near its point of maximum curvature, then it is that much less likely that the current candidate word is in fact the intended word. In another aspect, the weighting is scaled by a factor calculated as the difference between the magnitude of the second difference value calculated at the point to which the key is matched from the minimum magnitude of the second difference that is required to establish a point on the path as an Angle inflection point. In another aspect, the weighting applied to a distance measured from a key to an Angle Inflection point is determined as a variable weight that is scaled between a predetermined minimum and maximum value. In another aspect, the maximum weight value up to which is scaled the weighting for the distance measured from a key to a point on a path segment is the minimum weighting determined for a distance measured from an Angle inflection point. In another aspect, the weighting for a distance measured from an Angle inflection point is scaled by a factor calculated as a function of the second difference calculated at the Angle Inflection point, the minimum magnitude of the second difference that is required to establish a point on the path as an Angle inflection point, and the maximum possible value of the second difference at an Angle inflection point (which occurs when the path stops at a point and immediately back-tracks 180 degrees in the opposite direction). The appropriate combination of these aspects results in a continuum of weights established for distances from keys to path points that is essentially a reflection of the amount of curvature at and surrounding the matched path point. The above aspects also have the advantage that they are computationally simple to obtain from the input path data that is typically received as a sequence of screen locations from a touch-screen, mouse or other input device appropriate for entering an input path.

Returning to FIG. 3D-2, if at block 34135 the calculated SlopeFactor exceeds the determined threshold, then the provisional matching determined between KEY and the current inflection point is invalidated and, at block 34140, the process determines if KEY is within a determined maximum matching threshold distance of a determined matching location on the current path segment. If so, then in accordance with the above disclosed embodiments, at block 34185 new values of SlopeFactor, LengthFactor and PathLengthFactor are calculated with respect to the new provisional matching location, and at block 34190 the new value of SlopeFactor is compared to a determined maximum threshold. If at block 34140, the process determines that KEY is not within the determined maximum matching threshold distance, or if at block 34190 the process determines that SlopeFactor exceeds the determined maximum threshold, then at block 34145 the process returns with matchFlag still set to an invalid value so that the attempt to match KEY to the input path fails in this path region. If at block 34135 or block 34190 the calculated value of SlopeFactor falls below the determined maximum threshold, then, in one embodiment, at block 34195 the calculated values of SlopeFactor, LengthFactor and PathLengthFactor are used in calculating an adjustment to the weighting that is applied to the calculated distance, where this weighting is summed with all other determined weightings (in the variable weightSum at block 3430 of FIG. 3D-1). In another embodiment, at block 34195 the calculated values of SlopeFactor, LengthFactor and PathLengthFactor are used in calculating an adjustment to the calculated distance itself, prior to applying any weighting. Note that these factors are used in such a way that lower values of SlopeFactor, LengthFactor and PathLengthFactor (that tend to indicate that the key is appropriately matched at the determined location) result in lower calculated distances and higher weightings. At block 34199, the process returns all of the calculated values to the calling routine at block 3425 of FIG. 3D-1.

At block 3425, if matchFlag is set to indicate that that a valid match was established for KEY, then at block 3430 the calculated values are summed into rawDistance, rawScore and weightSum, and the type and location of the match is recorded. Then, in another embodiment, at block 3433, if the preceding key was flagged as skipped, the Letter-Key to Path-matching Routine is called to determine if the it can now be matched to the input path (at a location following, rather than preceding, the letter-key just matched), corresponding to a letter-transposition spelling error in tracing out the input path for the intended word. If so, and if the following letter is also successfully matched, then a letter-transposition is assessed for the current matching. In another embodiment, if at block 3425, matchFlag is set to indicate that that no valid match was established for KEY, then at block 3435 the process determines whether KEY can subsequently be successfully matched with the input path at a location prior to a location where the following letter-key can also be matched. If not, then the process determines that KEY cannot be matched to the input path and must be skipped, so that at block 3440, skippedKeys is incremented and a determined penalty is added to keyPenalty. If at block 3435 the process determines that KEY can still be successfully matched at a later point in the input path, then at block 3445 keyIndex is decremented so that the same key is processed in the next loop iteration at block 3420. Then, since it can be inferred from this result that the current inflection point (IP) must be skipped, the process proceeds to block 3460, where skippedIPs is incremented and a determined penalty is added to ipPenalty. Alternatively, if at block 3440 the current IP has been flagged as skipped as a result of the manner in which KEY was matched to the input path, the process also continues at block 3460. Then at block 3465, ipIndex is incremented to skip over the current inflection point in the next loop iteration at block 3420. If however, at block 3440 the current IP has not been flagged as skipped, then at block 3455 and 3465, ipIndex is incremented only if the current IP has been matched to a letter-key.

When, at block 3410 or 3415, either of the main loop limits are reached, the process exits from the main loop to block 3470 and determines whether any letter-keys or inflection points remain yet unmatched, and if so, at block 3475 corresponding additional skipping penalties are assessed. Then, in another embodiment, at block 3480 the process determines whether the assessed penalties exceed a determined maximum threshold, and if so, at block 3485 the process returns a flag value that the current candidate word is not a valid match for the input path. Otherwise, at block 3490 a Set Scoring Metric Value routine (shown in FIG. 3E) is called to calculate the actual Scoring Metric value for the current candidate word, based on the determined values for rawScore, weightSum, assessed penalties, and other data associated with the candidate word such as frequency information. Then at block 3495 the process returns a flag value that the current candidate word is a valid match for the input path, along with the determined Scoring Metric value.

In another embodiment, the algorithm of FIG. 3D is modified so that it alternates between matching the next inflection point moving forward from the first PenDown inflection point, and moving backward from the last PenUp inflection point. In yet another embodiment, any identified DoubleLetter inflection point (or points) is first matched to any occurrence (or multiple occurrences) of a double letter in the candidate word, and the algorithm of FIG. 3D alternately moves forward and backward from each of the a priori matched PenDown, PenUp, and DoubleLetter inflection points.

Once the Scoring Metric Calculation Routine 3400 has identified a valid pairing between the identified inflection points and the letters of a candidate word, the actual numeric value of the Scoring Metric is determined in the Set Scoring Metric Value Routine 3500 shown in FIG. 3E (called from block 3490 in the Scoring Metric Calculation Routine 3400). At block 3505, avScore is set to the average weighted score per letter-key, omitting any skipped keys. Similarly, avDistance is set to the average unweighted distance as measured to each letter-key matched to an input path point. In one embodiment, an additive scoring penalty is assessed by setting skipCount to either skippedKeys or skippedIPs, whichever is greater. In another embodiment, an additive scoring penalty is assessed by setting skipCount to the sum of skippedKeys and skippedIPs. Then rawScore is increased by the quantity (skipCount*avScore). In another embodiment, rawScore is incremented by a fixed penalty amount at blocks 3440 and 3460 of FIG. 3D-1 each time a key or inflection point is skipped, where the fixed penalty amount is determined with respect to the type of inflection point (or path point) that is skipped.

Similarly, an additive distance penalty is assessed by adding to rawDistance a fixed MaxDistance penalty amount for each skipped letter-key. In another embodiment, rawDistance is incremented by a fixed penalty amount at block 3440 of FIG. 3D-1 each time a key is skipped, where the fixed penalty amount is determined with respect to the type of inflection point (or path point) that is skipped. In one embodiment, the average unweighted distance to each letter-key (avDistance) is then calculated as the incremented value of rawDistance divided by the number of letters in the word.

In another embodiment, the additive distance penalty is assessed by adding a fixed penalty amount to rawDistance for each skipped inflection point, where the penalty amount is determined with respect to the type of inflection point that is skipped. In another embodiment, the average distance avDistance is then calculated by dividing rawDistance by a quantity that is determined as the number of letters in the word minus the number of skipped keys plus the number of skipped inflection points. As will be seen in the Display Selection List Routine of FIG. 3J, in another embodiment, the value of avDistance for each candidate word is used as a secondary scoring metric in determining how to present the list of possible candidate words.

Then at block 3510, a weighted score (weightedScore) is calculated by dividing the value of rawScore (including any additive penalties) by weightSum, the cumulative total of the weightings assigned to the matching of each letter-key by the Scoring Metric Calculation Routine at block 34195, where each weighting is a function of the characteristics of the path point with which the letter-key is matched and, in another embodiment, the relationship with a preceding (or following) letter-key and the path point with which it is matched. Also, an additive penaltyScore is calculated, for example, as a determined penalty times the number of un-matched keys plus a second determined penalty times the number of unmatched IPs. In other embodiments, a separate penalty (corresponding to a letter substitution in the spelling of the intended word) when a skipped letter-key and a skipped IP are both detected between an immediately preceding matched key and an immediately following matched key. Then at block 3515, in another embodiment, any multiplicative penalty that has been assessed is applied in calculating the value penalizedScore by multiplying the value (weightedScore+penaltyScore) by the sum of 1 plus any multiplicative penalties summed in ipPenalty and keyPenalty. Then at block 3520, in another embodiment, a value WordFrequencyWeightingFactor is calculated as a function of the average pen speed measured for the current input path and the historical average and variance of the pen speed, wherein the default value of a weighting factor (determined with respect to the frequency associated with the word) is adjusted with respect to the relationship between the pen speed measured for the current input path and the historical average and variance of pen speeds measured for previously entered paths. In one embodiment, the calculated WordFrequencyWeightingFactor is adjusted to a minimum value when the pen speed for the current input path is less than or equal to a value three standard deviations below the historical average, and is adjusted to a maximum value when the pen speed for the current input path is greater than or equal to a value three standard deviations above the historical average, and is adjusted proportionally in between these extremes. In another embodiment, the default frequency weighting factor (prior to any adjustment) is calculated as:

$$(1+\log(\text{MAX\_FREQ}/\text{WORD\_Frequency}))$$

where MAX_FREQ is the maximum possible frequency of use value that can be associated with a word in the database (for example, for the English language the frequency of the word "the") and where WORD_Frequency is the frequency value associated with the current word. Then at block 3525, a Scoring Metric value is calculated by multiplying the penalizedScore by the calculated WordFrequencyWeightingFactor.

In another aspect, the method allows the user to indicate the desired case for any letter of a word being input. In one embodiment, the displayed keyboard includes a Shift function key, and the Shift key is tapped prior to entering an input path to shift the first letter of the word to upper case in the text word that is output or that is offered to the user for selection. Since an input path for a word must be entered as a continuous stroke, it is not possible to lift the stylus to tap the Shift key for a letter other than the first letter of a word (such as the upper-case 'D' in the word "McDonald"). In another aspect, when the system detects an inflection point within a determined threshold distance from the Shift key, and the detected inflection point is not otherwise matched with a letter-key of a candidate word, then the next letter of the candidate word that is matched with a subsequent point of the input path is shifted to upper case in the text word that is output or that is offered to the user for selection. In yet another aspect, the user may indicate that a letter of the intended word is to be shifted to upper case by moving the stylus in a distinct gesture immediately before, during, or immediately after moving the stylus to the vicinity of the letter-key corresponding to the letter to be shifted. In one embodiment, after moving to the vicinity of the letter-key corresponding to the letter to be shifted, the stylus is moved upward above the upper border of the virtual keyboard and returned to the keyboard. In another aspect, when the stylus makes such a "shift-gesture excursion" above the top of the virtual keyboard and returned, and a letter-key can be matched with either the segment immediately preceding the excursion or the segment immediately following the excursion, then the letter-key is matched with the segment immediately following the excursion. This approach has been found to enable the user to naturally and reliably shift any intended letter of a word. In another aspect, when a candidate word is determined which has a letter other than the first letter shifted to upper case, and where the first letter itself is not shifted to upper case (hereinafter a "shift anomaly," since in general usage words are not entered in such a fashion), then one or more additive and/or multiplicative penalty amounts are included in the calculation of the matching metric score for the candidate word, virtually always resulting in the word being demoted in any word selection list below all other words that do not exhibit a shift anomaly. In a case where the intended word is intentionally entered with an unusual shift pattern, it is possible, but highly unlikely, that another word would receive a higher matching metric score by virtue of happening not to have any shift anomaly penalty assessed against it.

Figure 5:
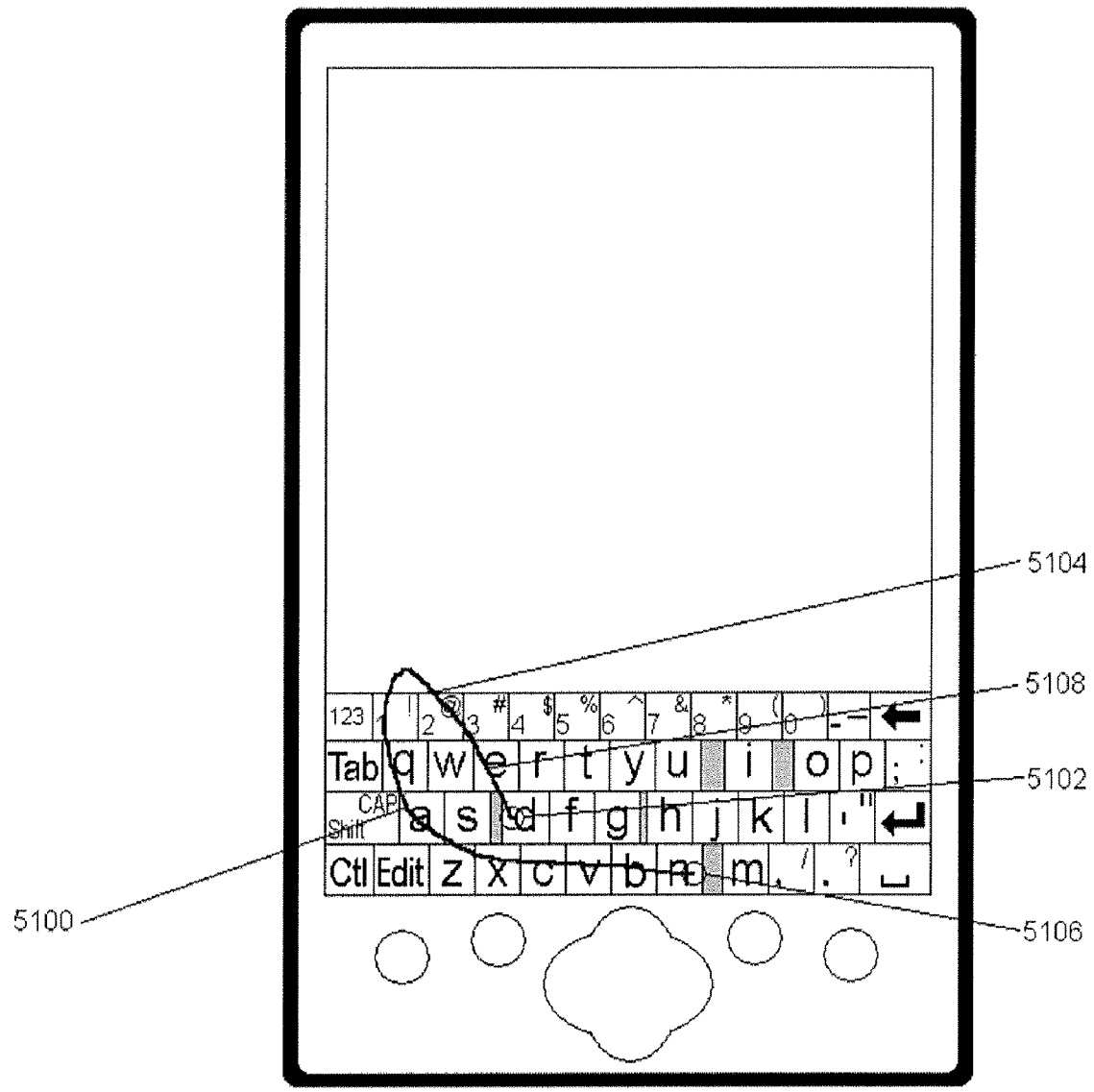
FIG. 5 shows a portable computer with a touch-screen display that depicts an input path corresponding to an embodiment of a shift gesture.

For example, FIG. 5 shows an input path 5100 in which a shift-gesture is used to capitalize the first letter of the word "Dan." To enter an input path corresponding to the capitalized word "Dan", the stylus would first make contact at a PenDown location 5102 near the letter-key for 'd', then move upward above the top of the keyboard (exiting from the defined keyboard region at a point 5104) in performing the shift-gesture before re-entering the virtual keyboard to move to the vicinity of the letter-key for 'a' and then turning to move to the vicinity of the letter-key for 'n' before lifting the stylus at the end of the input path at a point 5106. In performing the shift-gesture, it is likely that the stylus would pass extremely close to the center of the letter-key for 'e' (as shown, at a point 5108), so that it is not unlikely that the word "dean" could actually receive a better scoring metric result than the intended word "Dan" so that "dean" might otherwise be calculated to be the most likely matching word. However, due to the relation of the shift-gesture to the locations of the letter-keys for the word "dean," the actual text determined would be "dEan" so that, the shift anomaly would result in its being demoted below the intended word "Dan." In a like manner, if in fact the user's intention were to enter the capitalized word "Dean" then on re-entering the virtual keyboard, the input path would again pass near the letter-key for 'e' since this would be the next target letter for the user following the initial capitalized 'D' and, in accordance with the aspect disclosed above, the 'e' in "Dean" would be associated with the segment following the shift-gesture excursion.

In another aspect (not shown in FIG. 3E or FIG. 5), the method recognizes a gesture indicating that each letter of the word determined for the input path currently being entered should be generated for output in an upper case form. At anytime after the initial contact of the stylus with the keyboard near the first letter-key of the intended word, the user moves the stylus off of the defined virtual keyboard area without breaking contact between the stylus and the touchscreen and performs a determined gesture before moving the stylus back onto the defined virtual keyboard area (or simply lifting the stylus if the path was already traced up to the last letter-key of the intended word). In one preferred embodiment, the determined gesture comprises moving the stylus in a closed loop such that the direction of movement turns through at least 360 degrees before re-entering the defined virtual keyboard area (or lifting the stylus). This embodiment is very useful, since in many cases where a "Caps-Lock" type function is used, it is used only for a single word (commonly an acronym) rather than for a number of words. This embodiment enables the user to conveniently shift all of the letters of a single word to upper case with a single gesture that can be performed at any point in entering the word rather than having to explicitly activate a Caps-Lock function and then de-activate it after entering the word.

In another aspect, four different classes of Shift Anomalies are defined, and progressively higher penalties are associated with each class: 1) where the first letter of a word along with a single other letter is shifted, or where all letters are individually shifted, e.g. McDonald or MCDONALD (using eight individual Shift gestures, as opposed to a single instance of the "Caps-Lock" gesture, for which no penalty is assessed); 2) where the first letter of a word is not shifted, and a single other letter is shifted, or all remaining letters are individually shifted, e.g. iTunes or iPAQ; 3) where the first letter of a word along with all other letters but one are shifted, e.g. McDONALD; and 4) where the first letter of a word is not shifted, and more than one other letter but fewer than all remaining letters are individually shifted, e.g. iWHat. This allows unusual shift patterns to be intentionally created and allows the intended word to appear as the default choice, but still tends to penalize unintended words with unusual shift patterns sufficiently so that they do not become the default word.

In another aspect, in a manner analogous to the "shift gesture", the system recognizes a "control gesture" wherein the system identifies a target character and sends it out to the target application as a control character (simulating what a standard keyboard sends to an application when a key is depressed while the "control" modifier key is depressed). In one aspect, the control gesture comprises first contacting the screen within the boundaries of the intended key, then tracing a path down past the lower boundary of the virtual keyboard and lifting the stylus from the screen while it is still below the lower boundary of the virtual keyboard. This specific type of gesture is one preferred embodiment, and other types of gestures are considered to be within the scope of the invention. Since the "control" modifier key is, in general, applied to only a single character at a time, the "control" gesture is only recognized with respect to input paths that create a single PenDown inflection point (and no other inflection points) within the area of the displayed keyboard. In another aspect, the control gesture is only recognized and processed if the point where the stylus is lifted from the screen falls below an additional boundary margin threshold. In one aspect, the width of the additional boundary margin is equivalent to the height of one row of keys on the virtual keyboard. In another aspect, the control gesture is only recognized and processed if the slope of a straight line connecting the point where the stylus first contacts the screen and point where the stylus is lifted from the screen differs from a vertical slope by less than a predefined threshold. The additional constraints on the recognition of the control gesture enable the system to distinguish between intended control gestures and various two-letter words that end with a letter in the bottom route of the screen, even when the user tends to "overshoot" the final letter of a word in such cases and frequently lifts the stylus below the bottom boundary of the virtual keyboard when entering the input path for such a two-letter word. For example, the words "an", "am" and "in" could otherwise appear to be "control-a" or "control-i" when the path extends below the bottom keyboard boundary. This approach is advantageous in that it replaces the need for two precise keyboard taps (one on the "Control" key, and a second on the intended control-character key) with a single precise contact (on the intended control-character key) followed by a quick and simple gesture.

In another aspect, the system recognizes an "Alt gesture" wherein the system identifies a target character and sends it out to the target application as an "Alt" character (simulating what a standard keyboard sends to an application when a key is depressed while the "Alt" modifier key is depressed). In one aspect, the Alt gesture comprises first contacting the screen within the boundaries of the intended key, then tracing a path down past the lower boundary of the virtual keyboard, moving the stylus a short distance back and forth at least one time (creating at least one "Angle" inflection point below the lower boundary of the keyboard, within a determined threshold distance from where the path exits the lower boundary of the keyboard), and lifting the stylus from the screen while it is still below the lower boundary of the virtual keyboard. This specific type of gesture is one preferred embodiment, and other types of gestures are considered to be within the scope of the invention. In another aspect, the various gestures ("Shift", "Control" and "Alt") can be combined to generate a single key character with a plurality of active modifier keys. For example, the "Control" and "Alt" gestures described above can be combined as a single "Control-Alt" gesture that comprises first contacting the screen within the boundaries of the intended key, then tracing a path down past the lower boundary of the virtual keyboard, moving the stylus left or right more than a determined threshold distance from where the path exits the lower boundary of the keyboard, then moving the stylus a short distance back and forth at least one time (creating at least one "Angle" inflection point below the lower boundary of the keyboard, but greater than a determined threshold distance from where the path exits the lower boundary of the keyboard), and lifting the stylus from the screen while it is still below the lower boundary of the virtual keyboard. Similarly, the "Control", "Alt" and "Control-Alt" gestures can each be combined with the "Shift" gesture by performing the respective "Control", "Alt" or "Control-Alt" gesture, but then moving the stylus up past the upper boundary of the keyboard (the "Shift" gesture) prior to lifting the stylus. Alternatively, the "Shift" gesture can be performed first, followed by the "Control", "Alt" or "Control-Alt" gesture.

As described above, a "shift gesture," where a portion of the input path rises above the upper boundary of the keyboard, causes the preceding matched letter in a candidate word to be shifted to upper case. In contrast to a "shift gesture" above the upper boundary of the keyboard, when the input path for a word dips below the lower boundary of the keyboard, there is no effect on the text generated by the system (note that the "control" gesture is detected only for single characters, not for paths corresponding to multi-character words). This kind of overshoot would only tend to worsen the score of candidate words with a letter in the bottom row of the keyboard that was matched to the inflection point created below the lower boundary of the keyboard. The effect would be to reduce the scoring advantage such words (in general, including the user's intended word) ought to have over other candidate words in which no letter matched the inflection point. In another aspect, when inflection points that are created below the lower boundary of the keyboard are matched to keys that are in the bottom row of the keyboard, the inflection point is processed as if its actual location were the first path point detected below the lower boundary of the keyboard. This tends to improve the score of the intended word, since the path generally exits from the keyboard in a close neighborhood to the key at which the user was actually aiming. This is also very helpful in allowing users to be less precise with respect to keys in the bottom row of the keyboard.

Returning to FIG. 3E, in accordance with this embodiment, at block 3530, for each identified shift gesture location (corresponding to location 5104 in FIG. 5), the process identifies the word letter for which the matched input path point is closest to the detected shift gesture location along the preceding portion of the input path. Each such corresponding letter is then shifted to upper case before presenting the text of the word to the user for selection or outputting the word as generated text corresponding to the input path. In another embodiment, at block 3535 the process determines if the pattern of shifted letters in the word corresponds to one of the types of shift anomalies described above, and if so, then at block 3545 the ScoringMetric value for the word is multiplied by the corresponding penalty factor for the type of shift anomaly detected. Otherwise, at block 3540 the shiftAnomaly flag is cleared before returning the calculated values at block 3550.

FIG. 3F shows an embodiment of the Process TAP Inflection Point Routine 3600, called from the Path-matching Routine 3300 at block 3315. At block 3603, the process determines whether the TAP location occurred within the boundaries of a key that is associated with the generation of a letter. If so, then at block 3605 the process checks whether a tapped word has already been started, or whether this is the first tap of a new sequence of one or more taps (i.e. TAP_Word_Len is currently set to 0).

Many commonly used languages make extensive use of characters with diacritic markings. In one previously disclosed embodiment, words are stored in the database with their correct diacritic spellings, so that various input paths may be entered for different words making use of a single virtual key to refer to more than one diacritic form of a letter, where each of the diacritic forms of a letter are associated with a single virtual key. In another previously disclosed embodiment (shown at block 3225 of FIG. 3B-1) the present invention facilitates the explicit entry of alternate diacritic forms of a character by associating the various alternate forms of a character with a single virtual key and displaying a selection menu enabling the user to select a desired alternate form upon detecting that the stylus has been held in contact with the virtual key for longer than a determined threshold period of time. These two embodiments eliminate the need to change to alternate keyboard layouts in order to access alternate diacritic forms of characters. A further observation is that in many cases, the average frequency of occurrence of various diacritic forms of a given letter in a given language differ based upon the length of a word in which the character appears, or alternatively, upon the relative position of the character within the word. For example, in the French language, various diacritic forms of the letter "a" are used, including frequent use of both "a" (with no diacritic marks) and "à" (with an accent grave). However, although the form "a" is used not infrequently as a one-letter word, the one-letter word "à" has a much higher frequency of occurrence. However, the form "a" is used far more frequently than the form "à" as an internal letter within a multi-character word. Therefore, when tapping a sequence of one or more keys to generate one letter per key-tap, with respect to a key with which more than one diacritic form of a letter is associated, it would be advantageous to define more than one default letter-form associated with the key, such that the context in which a particular key-tap occurs determines which default form is generated. For example, in the previously mentioned case of the letter "a" in the French language, when a tap is detected on the letter-key associated with "a" that does not follow a preceding tap on a letter-key, the first default letter-form "à" is generated, and when a tap is detected on the letter-key associated with "a" that does follow a preceding tap on a letter-key, the second default letter-form "a" is generated. In another embodiment, when a first default letter-form is generated in response to a tap on a letter-key that does not follow a preceding tap on a letter-key, and a next letter-key is tapped immediately following the tap in which a first default letter-form was generated in response, then the previously generated first default letter-form is converted to a second default letter-form in the string of text characters to be generated in response to the sequence of tapped letter-keys. In another embodiment, the default letter-form associated with a key-tap is determined with respect to the preceding letter in the sequence of tapped letters.

Thus, in accordance with one embodiment, at block 3610 if TAP_Word_Len is 0, then the process identifies a first default letter associated with the key in which the TAP location occurred. If at block 3610 TAP_Word_Len is greater than 0, then at block 3615 the process identifies a second default letter associated with the key in which the TAP location occurred.

Then at block 3620 the identified default letter is appended to the current TAP_WORD[] being formed, which at blocks 3625 and 3630 is appended to the current Word_Candidates[] list as a designated TAP word before returning at block 3635.

If at block 3603 the TAP location is not within a key associated with the generation of a letter, then at block 3640, the process determines if the TAP location occurred within the boundaries of a displayed Word Choice list, and if so, at block 3645 a Word Selection Routine 3800 is invoked to process the selection of a word or a word choice list function, and the process returns at block 3650. If at block 3640 the TAP location is not within the Word Choice list, then at block 3655 the process determines whether the TAP location occurred within the boundaries of the BackSpace key, and if so, and if also at block 3660 TAP_Word_Len is found to be greater than 0, then at block 3665, TAP_Word_Len is decremented. If at block 3670 TAP_Word_Len is found to be still greater than 0, then processing continues as before at block 3625 to append the current TAP_WORD[] to the Word_Candidates[] list. If at block 3670 TAP_Word_Len is found to be set to 0 (indicating that any previously tapped entry has been completely deleted), then at block 3693 Word_Output is set to FALSE. If at block 3660 TAP_Word_Len is found not to be already set to 0, then at block 3690 the BackSpace function is invoked to perform its normal word processing function (i.e. delete the character to the left of the text cursor or delete the highlighted chunk of text if one exists, and so on). Following that, at block 3693, Word_Output is set to FALSE since it is no longer appropriate to assume that the user would want a space automatically output prior to a next selected word.

If at block 3655 the TAP location is not on the BackSpace key, then at block 3680 the process determines whether the TAP location occurred within the boundaries of a key associated with a function that causes the default word of a selection list to be output, and if so, at block 3685 Word_Choice is set to its default value of 0 and at block 3687 the Word Output Routine 3900 is invoked to output the default word choice to the insertion point in the text output area. If the function found at block 3680 does not cause the default word to be output, then at block 3690 the function associated with the tapped key is invoked to perform its normal word processing function. Depending on the nature of the function invoked, at block 3693 the flag Word_Output is set to FALSE if it would not be appropriate to automatically output a space prior to a next selected word (for example, following a tap on a TAB key).

In another embodiment, a special interpretation is assigned to an input path consisting of a single isolated occurrence of a DoubleLetter inflection point, where no other inflection points are detected except for the PenDown and PenUp location (which by definition will be detected in every input path) where both are detected within a maximum threshold distance along the input path from the detected center of the isolated DoubleLetter inflection point. To facilitate the rapid (and therefore, potentially inaccurate) entry of single-letter words (which would otherwise be entered by tapping the associated key and would therefore be strictly interpreted as a tap upon the letter-key within which the tap action actually occurred), an isolated DoubleLetter inflection point is also processed by the system as defining a keyboard location potentially near one or more single-letter words, such that, in contrast to the processing of an input path wherein when a DoubleLetter inflection point is matched to a single letter of a multi-letter word, no skipping penalty is applied when a DoubleLetter inflection point is matched to a single letter of a single-letter word. This is particularly helpful in languages such as French, wherein a single letter-key may be associated with two different one-letter words (as in the "a" key, which is associated with both the single-letter words "a" and "à". This approach allows both to be immediately presented in a selection list, where otherwise the only alternative for at least one of the two words is to perform a "tap-hold" on the letter-key and wait for the required time-out threshold to pass so that the diacritic letter-form menu is presented.

FIG. 3G shows an embodiment of the Word Selection Routine 3800, called at block 3645 of the Process TAP Inflection Point Routine 3600. At block 3805, the region of the Word Choice list display in which the TAP contact occurred is identified and the candidate word or list function associated with the region is determined. If at block 3810 the selected list region is not associated with a word choice, then if at block 3815 it is determined that the region is associated with the "(more)" function, then at block 3820, the process determines a next set of word candidates to display (either additional identified candidates associated with higher Scoring Metric values, or the initial set of displayed words including the default word) and at block 3825 the Display Selection List Routine 31000 is called to refresh the selection list display with the determined set of word candidates in an updated Word Choice list display. The routine then terminates at block 3830.

If at block 3815 the selected list region is not associated with the "(more)" function, then if at block 3835 it is determined that the region is associated with the "CANCEL" function, then at block 3840 the Word_Candidates[ ] table is cleared, Num_Candidates is set to 0, and Max_Metric_Value is set to the MAX_FLAG value, so that the Word_Candidates[ ] table is ready to have a new set of determined candidates added to it. Similarly, at block 3845 TAP_Word_Len is set to 0 so that a new TAP word can start to be constructed, and at block 3850, the Word Choice list display is canceled, and the display screen is refreshed to remove the previous Word Choice list display from the screen. The routine then terminates at block 3855.

If at block 3810 the selected list region is associated with a word choice, then at block 3860 the process determines whether the selected word (which is thus established as corresponding to the user's intended word) is the first word in the selection list, corresponding to the default word with a determined Scoring Metric value indicating that it is the most closely-matching word in the database. If not, then at block 3865 an Adjust Word Frequency Routine 38100 is called to determine what if any word frequency adjustments should be made in the database. If at block 3860 the selected word is the first (default) word in the selection list, then at block 3870 the Word Output Routine 3900 is called to output the selected word to the text display area 2106 at the insertion point 2108. At block 3875, the process determines if the selected word was a constructed TAP-location word, and if so, at block 3880, if the selected word is not already in the database, then it is added to the database as a User-Defined word. The routine then terminates at block 3885.

The frequency information stored with a word in the database provides an indication of how frequently the word tends to be encountered in general usage. In another aspect, the frequency information associated with a word in a particular user's database is modified in accordance with the specific usage of that word by that user. The algorithms used to analyze the input path and determine which words in the database are most likely to correspond to the user's intent make use of the stored frequency information (as shown of block 3525 of FIG. 3E) to optimize this determination of the most likely matching words to maximize the probability that the word determined to be the most likely match does in fact correspond to the user's intended word. Due to the fact that the system thus prioritizes words of higher frequency, there are occasions when a higher frequency word is determined to be the most likely match even when a lower frequency word actually matches the input path more closely. This maximizes the performance of the system, as it allows the user to enter input paths more quickly (and consequently less precisely) while still correctly recognizing input paths entered for frequent words when the entered input path happens to more closely match a lower frequency word. Since the higher frequency words are in general entered more frequently, this improves the system's performance, but also means that there will be occasions when the user's intended word is associated with a much lower frequency and as a result is determined not to be the most likely match. Furthermore, while the frequency information stored with each word in the initial database reflects the frequency of use of the word in general usage, this does not mean that the frequency with which a particular user enters a word will always correspond to its frequency in general usage. In addition, the actual performance of the system will always be a function of the particular idiosyncrasies of how a user traces out input paths. In addition, in order for the user's experience of the system to be relatively consistent, it is preferable to keep the database relatively stable, and avoid having pairs of words frequently "trade places" in the system's determination of which is the more likely word.

In another aspect, when the user selects as the word to be output a word other than the default word (the word determined by the system to be the most likely matching word), then the frequency associated in the database with the lower frequency word is increased. In another aspect, the frequency associated with the higher frequency word is increased. In another aspect, the frequency associated with a word in the database is increased only when the system has determined that a higher frequency word is a more likely word than a lower frequency word, and where the user selects the lower frequency word as the word to be output, then. In another aspect, when the system determines that a higher frequency word is a more likely word than a lower frequency word, and where the user selects the lower frequency word as the word to be output, then the frequency associated in the database with the lower frequency word is increased only when the lower frequency word actually matches the input path more closely.

In another aspect, in order to preserve the efficient operation of the system, special treatment is accorded to "high-frequency words" that are associated in the database with a frequency higher than a determined threshold. In one aspect, when the system determines that a lower frequency word is a more likely word than a high-frequency word, and where the user selects the high-frequency word as the word to be output, then the frequency associated in the database with the lower frequency word is further decreased. In another aspect, when the system determines that a high-frequency word is a more likely word than a lower frequency word, and where the user selects the lower frequency word as the word to be output, then the frequency associated in the database with the lower frequency word is increased only when the frequency associated with the lower frequency word is less than a determined threshold frequency. The usage of high-frequency words tends to be relatively consistent across users, such that it would tend to be detrimental to system performance to allow a lower frequency word that has an ideal input path that is similar to that of a high-frequency word to also be assigned a frequency that is close to that of the high-frequency word. In another aspect, when there are scoring penalties assessed against the selected word and these penalties exceed a determined maximum threshold, then no adjustments are made to word frequencies.

In another aspect, the system automatically adjusts one or more system parameters that regulate the amount of influence exerted on the final value of the matching metric score by relative differences in the frequencies of use associated with words in the database. In one aspect, in a first scenario where a word other than the default word is selected from the word choice list, and the analysis of the word with respect to the input path results in assessing the word with no more than a threshold level of scoring penalties, and a secondary matching metric value of the selected word based solely on unadjusted key-to-matched-path-location distances (i.e. a metric that has not been further adjusted by factors such as word frequency or penalties sometimes assessed in the matching process, hereinafter referred to as the "NoPenalty" score) is better than that of the default word (i.e. the selected word is objectively closer to the input path than the default word), and the frequency associated with the selected word is less than that of the default word, then the system determines whether any changes are made in the frequency parameters and data stored in and used by the system. In another aspect, this determination is also made when the "NoPenalty" score of the selected word is no worse than the "NoPenalty" score of the default word multiplied by a determined threshold factor. In another aspect, in a second scenario where a word other than the default word is selected from the word choice list, and the analysis of the word with respect to the input path results in assessing the word with no more than a threshold level of scoring penalties, and the "NoPenalty" score of the default word is no better than a determined threshold in comparison to that of the selected word (i.e. the default word is objectively no closer than by a determined threshold margin to the input path than the selected word), and the frequency associated with the selected word is greater than that of the default word, then the system determines whether any changes are made in the frequency parameters and data stored in and used by the system. As disclosed above, the frequencies associated with the selected word and/or the default word are adjusted depending upon their relative values and other thresholds defined within the system. In another aspect, the threshold level of scoring penalties is set to the level of scoring penalties assessed to the default word in the scoring process.

In another aspect, the system adjusts one or more parameters that determine how relative differences in word frequency affect the final value of one or more weighted matching metric values. In the first scenario, the user's intended word failed to appear as the default word largely or entirely due to the influence of word frequency which resulted in a better matching metric score for the higher frequency word that was determined to be the default word. When the system detects an occurrence of the first scenario, an adjustment is made to one or more system parameters to incrementally reduce the effect of word frequency on matching metric scores. In the second scenario, the user's intended word would have been more likely to appear as the default word if the influence of word frequency on matching metric scores was greater. When the system detects an occurrence of the second scenario, an adjustment is made to one or more system parameters to incrementally increase the effect of word frequency on matching metric scores.

In another aspect, the system maintains one or more parameters that specify a multiplicative factor that is applied to the value of the matching metric score for words based on the frequency associated with the word. In one aspect, the one or more multiplicative factors are increased or decreased by a fixed incremental adjustment value. In another aspect, the values of the one or more multiplicative factors are constrained to stay within limits defined by one or more corresponding sets of minimum and maximum values. In another aspect, the one or more multiplicative factors are increased or decreased by a predetermined percentage of the interval between the current value of the parameter and the maximum or minimum values, respectively, by which the parameter is constrained.

In accordance with certain of the above-mentioned aspects, FIG. 3H shows an embodiment of an Adjust Word Frequency Routine 38100. In accordance with one aspect, at block 38105 the process determines whether any inflection point- or letter-skipping penalties have been assessed against the selected word exceed a determined threshold, and if so, proceeds to block 38130 and flags that no change will be made in word frequencies in the database as a result of the current selection, and the process then returns at 38135. In one embodiment, the determined threshold is set to the level of inflection point- and letter-skipping penalties assessed against the default word. If at block 38105 the skipping penalties do not exceed the threshold, then in another aspect, at block 38110, the process determines if the frequency associated with the default word in the selection list is greater than the frequency associated with the selected word. If so, then in another aspect, at block 38115, the process determines if the average distance of the letter-keys of the selected word from the corresponding input path points with which they are matched (as determined at block 3505 of FIG. 3E) is less than the corresponding average distance determined for the default word in the selection list. If not, then the process again proceeds to block 38130 and returns without changing any word frequencies in the database, but if so, then in another aspect, at block 38120, the process determines if the frequency associated with the selected word is less than a determined frequency promotion threshold level. If not, then in another aspect at block 38125, the process determines if the frequency associated with the default word is greater than a determined high-frequency word threshold level. If not, then at block 38140 the frequency associated with the default word is decreased before returning at block 38145, but if so, the process again proceeds to block 38130 and returns without changing any word frequencies in the database. If at block 38120 the process determines that the frequency associated with the selected word is less than a determined frequency promotion threshold level, then at block 38170 the frequency associated with the selected word is increased before returning at block 38175.

In another aspect (not shown in Figure), if at block 38110, the process determines if the frequency associated with the default word in the selection list is not greater than the frequency associated with the selected word, then the process returns without changing any word frequencies in the database. In the aspect shown in FIG. 3H, the process proceeds to block 38150 and determines if the frequency associated with the selected word is greater than a determined high-frequency word threshold level. If so, then at block 38155 the frequency associated with the default word is decreased before returning at block 38160. If the selected word is a high-frequency word, then at block 38165, the process determines if the frequency associated with the selected word is less than a determined frequency promotion threshold level. If not, then again at block 38155 the frequency associated with the default word is decreased before returning at block 38160. If at block 38165, the process determines that the frequency associated with the selected word is greater than a determined frequency promotion threshold level, then at block 38170 the frequency associated with the selected word is increased before returning at block 38175.

In another aspect, when there are one or more words in addition to the default word that are also assessed a lower Scoring Metric value than the selected word, then the analysis shown in FIG. 3H is performed for all such words that are determined to be a more likely match with the input path by virtue of receiving a lower Scoring Metric value than the selected word.

In another aspect, the system calculates two separate matching metric scores for each candidate word, one for which various types of additive and/or multiplicative scoring penalties may be assessed and applied which result in a worse matching metric "Penalty" score, and a second matching metric "NoPenalty" score in which no penalties are assessed or applied due to unmatched letters in the candidate word, unmatched inflection points, or other failures detected in the algorithm that matches the letters of a candidate word to the input path, and which is not adjusted based on the frequency of use associated with the candidate word. In general, this second type of matching metric "NoPenalty" score provides an indication of how well the candidate word matches the input path regardless of any "spelling" errors that may be reflected in the path (i.e. when the user traces out a path intended to match a particular sequence of letters, but where in fact the sequence of letters for the correct spelling of the intended word (as recorded in the database) is different. Especially in the case of relatively longer words, which are generally words that are more likely to be misspelled, the "NoPenalty" matching metric score is often significantly lower for the intended word even when the user has entered a path based on an incorrect notion of the sequence of letters for the word. Perhaps even more significantly, this holds equally true when the user knows the correct spelling of the word, but simply makes one or more errors in trying to enter the input path ("stylus" errors, where for some reason the stylus is moved to a keyboard location unrelated to the upcoming letter in the intended word, or where the stylus fails to move within a threshold distance of an intended letter). This happens more and more frequently as the user starts to enter input paths more and more rapidly. When the entered input path contains either spelling or stylus errors, it is extremely unlikely that it will by chance match some word (other than the intended word) with no errors or penalties assessed. Consequently, all candidate words will have some level of penalties assessed in the calculation of the word's "Penalty" score. However, the majority of the entered path will naturally correspond closely to the letters of the intended word, so that its "NoPenalty" score will tend to be significantly higher than other candidate words, and as a result, in a large number of cases the "Combined" score for the intended word will also tend to be among the best scores of any candidate words. As a result, the intended word will generally be found in the word choice list offered to the user in response to the error-containing input path.

In another aspect, the system calculates a final matching metric score as a function of the values of the "Penalty" and the "NoPenalty" scores. In one aspect, the final matching metric score is calculated as the product of the values of the "Penalty" and the "NoPenalty" scores, the "Combined" score. In another aspect, the word choice list is populated by those candidate words with the best "Combined" scores, ranked according to the values of the "Combined" scores. In another aspect, when the first and second ranked words in the word choice list differ by less than a threshold amount in the value of any of the three scores ("Penalty", "NoPenalty" or "Combined") the words are treated as "ambiguous" words and the system optionally displays the word choice list in a distinctive fashion to draw the user's attention to the fact that there is a higher than average likelihood that the default word does not correspond to the user's intended word.

In another aspect, a determined number of available slots in the word choice list are reserved for candidate words with the best "NoPenalty" scores, which are merged into the word choice list in pre-determined positions. The low "NoPenalty" score words are added to the word choice list regardless of their "Combined" scores (which may in fact be worse than the "Combined" scores of words that are displaced from the list (or moved into lower positions on the list) so that the low "NoPenalty" score words can be inserted. This strategy often enables the system to offer the intended word somewhere on the word choice list even when it is a shorter word and the input path contains one or more "spelling" or "stylus" errors.

In another aspect, the system makes use of an additional database in detecting and processing possible errors where the user's input path corresponds to a word in the database where the sequence of letters has been altered by a spelling omission, insertion, substitution (combined omission and insertion) or transposition. In one aspect, the additional database includes one or more of the following types of data: word-initial letter sequences that are commonly confused (e.g. "si"<=>"sy" as in the misspelled word "syphon"; "ph"<=>"f"; etc.); word-final letter sequences that are commonly confused (e.g. "able"<=>"ible" as in the misspelled word "impassable"; "el"<=>"le" as in the misspelled word "candel"; etc.); and word-internal letter sequences that are commonly confused (e.g. "ei"<=>"ie" as in the misspelled word "freind"). In one aspect, when the matching algorithm detects a matching failure in a candidate word, the letters of the word in a neighborhood containing the matching failure are compared to the database of commonly confused letter sequences, and if a match is identified the matching algorithm attempts to match the candidate word letter sequence with the identified commonly confused letter sequence substituted for the matched letter sub-sequence. In another aspect, the scoring penalties normally assessed for a detected spelling error (omission, insertion, substitution or transposition) are reduced when the error corresponds to one contained in the commonly confused letter sub-sequence database. In another aspect, one or more of the associated misspelled letter sequences in the commonly confused letter sub-sequence database is associated with a penalty amount that is assessed when scoring the word with the substituted letter sequence.

In another aspect, when the PenUp location is within a maximum threshold matching distance from a letter-key that ends one or more of the misspelled word-final letter sequences in the database (e.g. a PenUp location near the key associated with the letter "l", ending the misspelled letter sequence "el"), suffix candidates whose final letter-keys correspond to the correctly spelled counterparts of the identified misspelled word-final letter sequences (e.g. the letter sequence "le") are also considered as possible candidates in the search process. In this way, the correctly spelled intended word ("candle" in the current example) is included in the search process, and will be successfully matched against the input path when the commonly confused letter sequence is substituted for the for the actual letter sub-sequence in the search process (so that, in the current example, the spelling "candel" is matched against the input path, and the resulting matching metric score is attributed to the correctly spelled "candle" which appears in the word choice list). In another aspect, according to a user preference, the misspelled version of the word is added to the word choice list along with (or in place of) the correctly spelled word.

FIG. 3I shows an embodiment of the Word Output Routine 3900, called from block 3230 of the Input Path Analysis Routine 3200, and at block 3687 of the Process TAP Inflection Point Routine 3600, and at block 3820 of the Word Selection Routine 3800. At block 3905, if no valid word candidate was identified as potentially matching the current input path, then execution proceeds to block 3925 to clear the Word_Candidates[] table as described below. Otherwise, in one embodiment, if more than one valid candidate was identified in the current selection list as a potential match for the current input path, then at block 3907 the process records the identity of the word to be output, associated with the identities of one or more the most-closely-matching candidates. This information is used to support an embodiment of a "Re-Edit" function, whereby when the user observes that a previously output word does not correspond to the user's intended word, the output word is selected and a Re-Edit function is invoked which causes the process to search its record of recently output words, and if the selected word is found, then a selection list is re-constructed consisting of the words whose identities were recorded as associated with the output word. Since the user's intended word tends to occur somewhere in the selection list of alternate word choices in the overwhelming majority of cases in which there have not been gross errors in entering the input path, this embodiment greatly simplifies the task of correcting such mistakes where the default word is unwittingly accepted for output. This Re-Edit function makes it easy to correct such words, since selecting the intended word from the displayed Re-Edit selection list automatically replaces the previously output word in the generated text.

Returning to FIG. 3I, at block 3910, if the automatic spacing flag Word_Output is set to TRUE, then a space is output to the text insertion point at block 3915 prior to outputting the selected word candidate at block 3920. Also, Word_Output is set to TRUE so that if a next word is subsequently output, a space will be automatically generated prior to the next word. Then at block 3925, where execution also resumes if the current Word_Candidates[] table is found to be empty at block 3905, the Word_Candidates[] table is cleared, Num_Candidates is set to 0, and Max_Metric_Flag is set to the MAX_FLAG value, so that the Word_Candidates[] table is ready to have a new set of determined candidates added to it. Then, at block 3930 TAP_Word_Len is set to 0 so that a new TAP word can start to be constructed, and at block 3935, the Word Choice list display is canceled, and the display screen is refreshed to remove the previous Word Choice list display from the screen (if one was displayed). The routine 3900 then terminates at block 3940.

FIG. 3J shows an embodiment of the Display Selection List Routine 31000, called from block 3125 of the Main Processing Routine 3100, and from block 3825 of the Word Selection Routine 3800.

At block 31005, if a user preference has been set to always display a word choice selection list, then the process immediately continues from block 31035 to display the selection list as described below. Otherwise, at block 31010 the process determines if no valid matching candidates have been identified, and if so, at block 31031 if the user has set a preference for any visual or auditory signal to be generated when no valid match is identified for an input path, then the corresponding signal is generated before returning at block 31033. If at block 31010 at least one valid matching candidate has been identified, then at block 31015 the process determines if more than one valid matching candidate has been identified, and if not, at block 31025 Word_Choice is set to 0 so that the following call at block 31030 to the Word Output Routine of FIG. 3I causes the default most-closely matching word to be generated as text output. If more than one valid matching candidate has been identified at block 31015, the process proceeds to block 31020.

In another aspect, when the system determines that the likelihood that the default choice is in fact the user's intended word is sufficiently greater than the likelihood of the second-most-likely word, then the default word is output without displaying a list of alternate word choices. In another embodiment, at block 31020, when the difference between the Scoring Metric values for the first and second words is greater than a user-selected threshold, the process proceeds to block 31025 as described above to output the default word. In another aspect, the ratio between the Scoring Metric values for the first and second words is compared to a user-selected threshold. In another aspect, one or more secondary Scoring Metric values for the first and second words are compared to determine whether they differ by less than a threshold amount and if so, the word choice list is displayed.

In another aspect, when a list of possible word choices is presented to the user for selection of the intended word, the list is sorted according to a primary scoring metric, with the words sorted from the most-closely matching word to the least-closely matching word. In another aspect, the most-closely matching word is presented in a distinctive visual fashion as a function of the magnitude of the difference between it and the second-most-closely matching word.

In another aspect, when the difference in likelihood of the two most likely word choices falls below one or more determined thresholds, the user is informed through an auditory and/or visual display so that the user can choose to divert their attention to attend to the word that has just been output (or that will be output if the user performs any action other than selecting an alternate word choice from the list) by the system only when there is some reasonable likelihood that the user may in fact need to select a word other than the default choice. This is a significant benefit as it allows the user to more effectively direct their attention while inputting text. For example, in one embodiment, at block 31065, the outline of the keyboard (on which the user's attention is generally focused) is displayed in a color which varies according to the threshold range into which the difference in likelihood falls. In another embodiment, a distinctive tone is generated which varies according to the threshold range into which the difference in likelihood falls.

Figure 6:
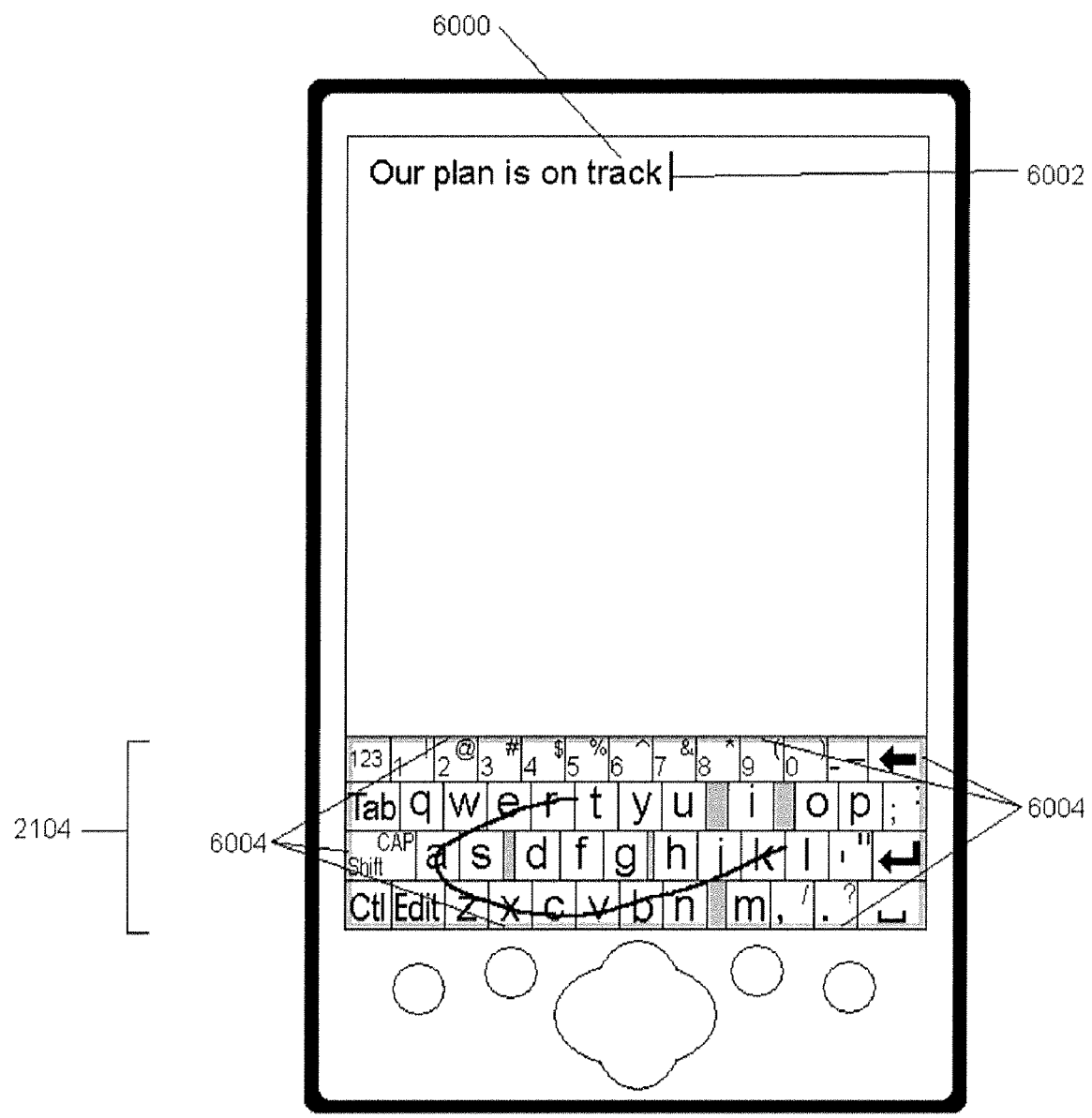
FIG. 6 shows a portable computer with a touch-screen display that depicts an input path which has caused the system to display an embodiment of a visual feedback feature.

FIG. 6 shows an example of a virtual keyboard 2104 that is displayed in accordance with certain of the above embodiments. The default word choice "track" 6000 has already been output at the text insertion point 6002 without displaying a list of alternate word choices, in accordance with the embodiment wherein the system has determined that the likelihood that the default choice is in fact the user's intended word is sufficiently greater than the likelihood of the second-most-likely word. However, in the example shown in FIG. 6, while large enough to exceed the threshold determining that a selection list will not be displayed, the difference in likelihood of the two most likely word choices falls below one or more determined thresholds wherein a visual display is created to notify the user that the difference in likelihood falls below a determined threshold. In accordance with one embodiment, a visual highlight 6004 has been added to the outline of the keyboard 2104, where the color of the outline corresponds to threshold range encompassing the difference in likelihood between the default word "track" 6000 and the second-most-likely word ("real" in the example depicted in FIG. 6).

In another embodiment, more than one threshold is used to determine how close the scoring metric scores of one or more of the next-most-closely-matching words are to the most-closely-matching (first) word, and an auditory and/or visual signal is generated to give some indication to the user how close a match each word is to the first. In another aspect, each word following the most-closely matching word is presented in a distinctive visual fashion as a function of into which difference threshold the difference between it and the most-closely matching word falls, such that words whose scoring metric differences (or, in another embodiment, ratios) fall between the same thresholds form a threshold difference group. At block 31035, the display flags used to indicate any distinctive visual highlighting to be applied to each word in the list are cleared. Then, at block 31037, the process identifies any candidate words for which the ratio of the primary Scoring Metric value for the word (shown in FIG. 3E at block 3525 as adjustedScore) to that of the first word falls below one or more determined threshold values. Then at block 31040, a display flag is set for each word identified at block 31935 corresponding to the lowest threshold criterion met by the ratio of the word's Scoring Metric value to that of the first word.

In another embodiment, more than one type of scoring metric calculation is used to determine how closely each analyzed word matches the input path, and the two most-closely-matching words are compared with respect to two or more distinct scoring metric calculations to determine whether the difference between the two words fails to exceed one or more thresholds. For example, one embodiment of a secondary scoring metric is shown in FIG. 3E at block 3505 where the value avDistance is calculated for each candidate word. In another embodiment, when more than one type of scoring metric calculation is used to determine how closely each analyzed word matches the input path, corresponding thresholds are used for each scoring metric to define threshold difference groups for each scoring metric used, and the list of possible word choices is presented to the user such that all words that fall into the same threshold difference group (as defined by one or more of the scoring metrics used) are presented in a contiguous group in the list, and wherein all words of a given difference threshold group are presented in the same distinctive visual fashion (for example, with a specific color background on the display). In accordance with these embodiments, at block 31045 the process identifies any candidate words for which the ratio of the secondary Scoring Metric value for the word to that of the first word falls below one or more determined threshold values. Then at block 31050, a display flag is set for each word identified at block 31945 corresponding to the lowest threshold criterion met by the ratio of the word's secondary Scoring Metric value to that of the first word. Then at block 31055, the list of candidate words is re-sorted in order to move any words in the list for which the secondary display flag has been set up to a position in the list immediately following the last word in the same threshold group (which therefore has the corresponding primary display flag set). If no word has been identified as belonging in the same threshold group according to the primary scoring metric, then the words in a given secondary threshold group are moved to follow words in any higher precedence threshold group, or if none exist, then to immediately follow the first word. Finally, at block 31060 a Word Choice list is created and displayed at the text insertion point showing the Num_Display Word_Candidates[] entries starting with the first word, where any words identified as belonging to the same threshold group are visually indicated in a distinctive manner.

Figure 7A:
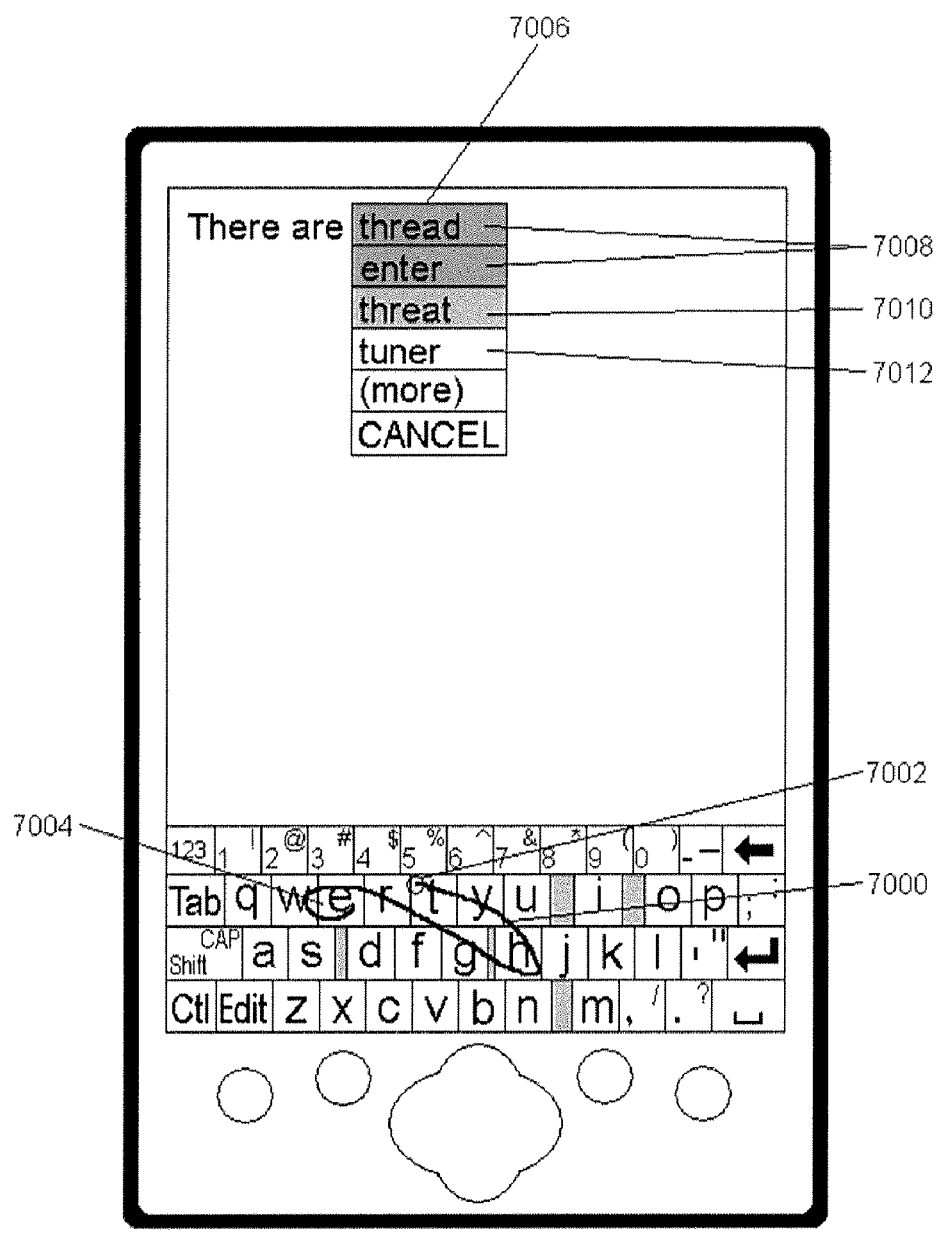
FIGS. 7A and 7B show a portable computer with a touch-screen display that depicts an input path which has caused the system to display an embodiment of another visual feedback feature and an embodiment of a selection list sorting algorithm.
Figure 7B:
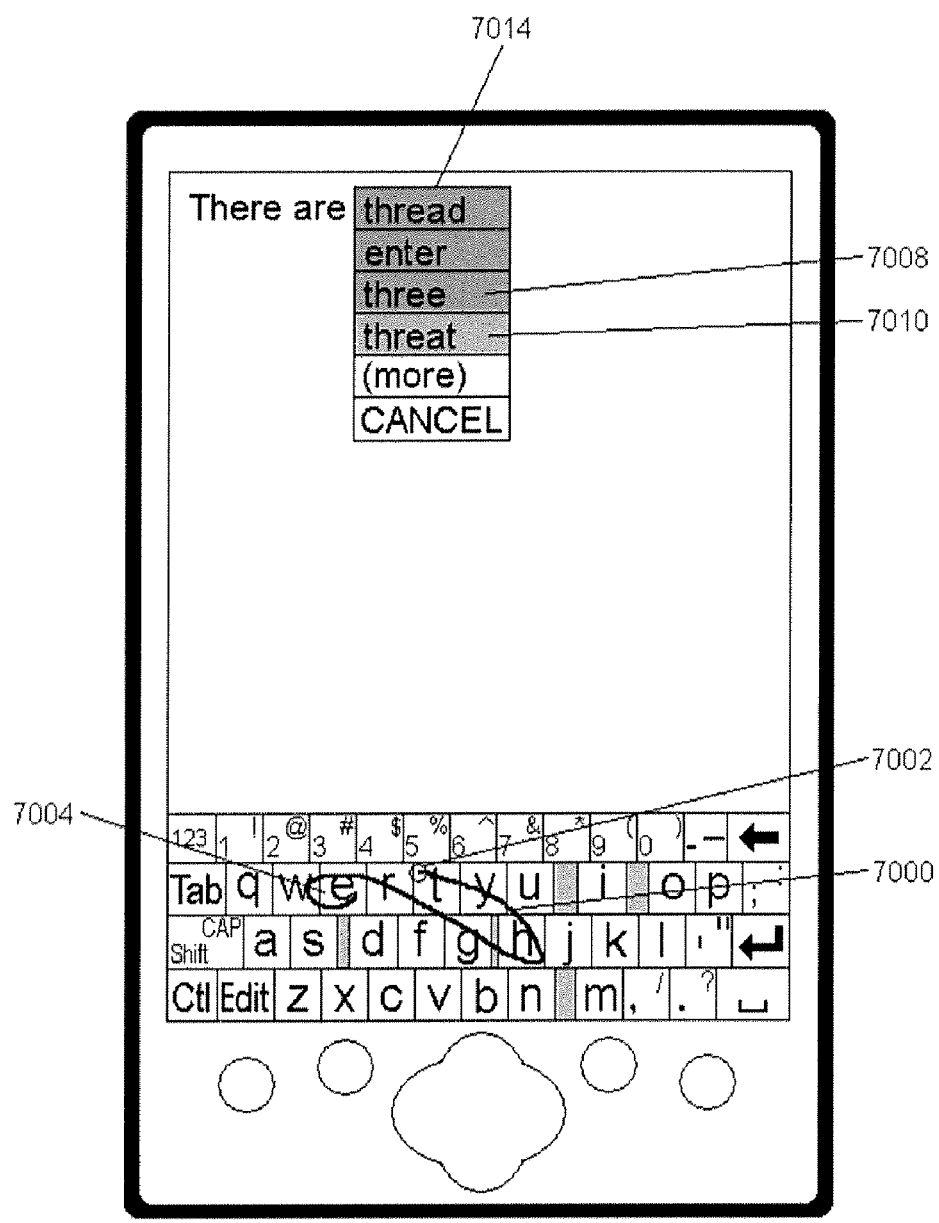

FIGS. 7A and 7B shows an example of a word selection list that is modified and displayed in accordance with certain of the above embodiments. FIG. 7A shows an input path 7000 entered by a user where the intended word was the word "three" (for the purposes of this illustrative example, we will assume that the alternate DoubleLetter gesture has been disabled by the user, since otherwise the word "three" would appear as the top-ranked default word). The user enters an input path that begins at a PenDown location 7002, proceeds in sequence to the vicinities of the letter-keys associated with "h" and "r", and then attempts to enter a DoubleLetter "circle" gesture 7004 in the vicinity of the letter-key associated with "e" but fails to complete a recognizable gesture. The selection list 7006 shown in FIG. 7A shows the list that would result in accordance with the various aspects of the present invention but without implementing the above-described embodiment in which all words that fall into the same threshold difference group (as defined by one or more of the scoring metrics used) are presented in a contiguous group in the list. Due to the unrecognized attempted DoubleLetter gesture at 7004, the primary Scoring Metric associated with the intended word "three" is not good enough for the word to appear on the displayed selection list 7006 of the top four candidates, since Scoring Metric "three" ranks seventh among the matched candidate words with respect to the primary Scoring Metric. As shown in FIG. 7A, "thread" and "enter" are the two top-ranked candidate words, both of which appear in the same highlighted fashion 7008 associated with the lowest threshold difference group, including those word candidates whose Scoring Metric most closely matches that of the top candidate (and thus, in the example shown, including the top candidate itself). The third-ranked candidate "threat" is shown is a second distinct highlighted fashion 7010 associated with the next lowest threshold difference group, and the fourth-ranked candidate "tuner" fails to meet any difference threshold and appears without distinctive visual highlighting 7012.

FIG. 7B shows the same input path 7000 with the selection list 7014 that results in accordance with the various aspects of the present invention and also including the above-described embodiment in which all words that fall into the same threshold difference group (as defined by one or more of the scoring metrics used) are presented in a contiguous group in the list. Since the intended word "three" is also included in the lowest threshold difference group with respect to the secondary Scoring Metric (avDistance, as shown in FIG. 3E at block 3505), in FIG. 7B the intended word "three" appears third in the displayed selection list 7014, immediately following the two top-ranked candidate words "thread" and "enter," and appearing in the same highlighted fashion 7008 associated with the lowest threshold difference group. This aspect thus makes it possible for the user to immediately find and select the intended word from the first displayed selection list.

In another aspect, the system detects when the stylus is lifted for less than a pre-defined threshold time interval prior to contacting the touch-screen again. In one aspect the system conducts a first analysis by processing the input path entered prior to the lifting of the stylus to generate a list of the highest scoring word candidates identified. In another aspect the system first presents a word choice selection list from the results of this first analysis of the input path entered prior to the lifting of the stylus. In another aspect, the system waits until the pre-defined threshold time interval has elapsed prior to displaying a word choice list, even if the analysis of the preceding input path has completed. The system then joins the input path entered prior to the lifting of the stylus with the input path entered following the lifting of the stylus, and processes the joined input path as a single input path with an initial contact location corresponding to that of the input path entered prior to the lifting of the stylus, and with a final contact location corresponding to that of the input path entered following the lifting of the stylus. The system then performs a second analysis of the joined input path and generates a list of the highest scoring word candidates identified. In another aspect, the system waits until this second analysis (that of the joined input path) is completed prior to displaying any word choice selection list. In another aspect, the system creates a single word choice list by merging the results of the first and second analysis according to the matching metric scores determined for the various candidates, and maintaining a record of which analysis generated each of the candidate words. If the user selects a word candidate generated by the second analysis, the input paths are discarded and the system continues in its normal fashion. If the user selects a word candidate generated by the first analysis, the system then performs a third analysis of the second input path that was recorded following the momentary lifting of the stylus. The results of the third analysis are then presented in a word choice selection list, and the system continues in its normal fashion. In another aspect, the pre-defined threshold time interval is defined automatically with respect to the minimum time interval measured by the system between lifting the stylus at the end of an input path and touching it down to start the next input path when a word is accepted for output from the analysis of the input path preceding the stylus lift, and a word is also accepted for output from the analysis of the input path following the stylus lift. This provides the system with a measure of the shortest time interval during which the user is able to perform an intentional stylus lift. The pre-defined time interval used in the current aspect is then defined as a pre-determined fraction of the measured minimum time interval.

Unintentional lifts of the stylus happen commonly in two situations. One is a novice user who may tend to use a very light touch with the stylus, and momentarily lifts the stylus unintentionally in the middle of entering an input path for a word. The second is when the device is used in an unstable environment such as a moving vehicle, where the vibration of the vehicle's motion can easily cause the stylus to be lifted momentarily from the touch-screen. In either case, when an input path that is intended for a single word is entered as two separate path sections, it is virtually assured that the intended word would not be recognized, and that instead two unrelated words would be output. The current aspect of the system is highly advantageous in that the effect of such a momentary stylus lift on the user is negligible, since in most cases the intended word appears as the default word and the user is often unaware that an unintentional stylus lift has even occurred.

In another aspect, one feature that is inherent in the use of a system of this nature is that users will tend to trace out input paths faster and faster (and consequently with less and less precision) until a point is reached at which a certain number of "errors" occur in which the word candidate identified as the most likely candidate (the default word in the word choice list, if one is displayed) does not correspond to the user's intended word. Furthermore, an observed tendency of many users is to continuously input a stream of words, focusing on the input task of tracing input paths and in general not attending to which words have been correctly recognized and output in the target text application. At some point the user pauses, and looks at the text recently produced, and observes if any words have been output that do not correspond to the user's intention. In one aspect, the system allows the user to select a word in the output text for re-editing by highlighting the word to be edited or by positioning the text cursor within the boundaries of the word and activating a designated "Re-Edit" editing function key. In another aspect, to make the process of correcting such recognition errors as efficient as possible, the system recognizes when a pre-determined stylus action or gesture is performed in the output text region, and identifies the word in the output text region closest to where the pre-determined stylus action or gesture was performed as the target word for re-editing. In one embodiment, the predetermined stylus action is a "double-tap" of the stylus on a word. In another embodiment (for example, where the system is operated using a cursor movement control device such as a mouse), the predetermined editing action is (for example) to briefly hover the mouse over the word to be edited, then quickly move the mouse back and forth one time (this is simply an exemplary gesture, as many such gestures can be defined).

FIG. 2D shows how the Re-Edit function can be activated by the Re-Edit function key 2224, or by performing the predetermined stylus action or gesture on a previously output word ("great" 2400 in FIG. 2D) to correct it when the user has unknowingly accepted the default word for output to the text area 2106 in an instance where the default word did not correspond to the intended word. In another embodiment, when the Re-Edit function key 2224 is tapped and no word is currently highlighted, the system identifies the word containing or adjacent to the current text cursor location and automatically selects it as the target of the Re-Edit function. In one aspect, the system stores a list of the highest scoring alternate candidate words identified for at least some of the most recently output words. When the Re-Edit function is activated, the system then displays a word choice list containing the list of words originally identified as the most likely matching words in the order determined by the scoring metric values calculated with respect to the original input path entered by the user for the target word. In another preferred embodiment, the originally output word is omitted from the displayed word choice list since the Re-Edit function is only activated in order to replace it. FIG. 2D shows the resulting selection list 2402. In this example, the originally intended word "heat" appears as the first word 2404 in the selection list 2402 because it was determined to be the second-most-closely matching word with respect to the original input path (following the word "great" which was originally output as the default word). Selecting the word 2404 in the selection list 2402 automatically replaces the highlighted target word "great" with the originally intended word "heat" in the output text area 2106.

In another embodiment, the system tracks the location of the text insertion location in the text output region, and immediately following the selection of a word from the generated word choice selection list and the replacement of the previously output word, the text insertion location is automatically restored to its former location in the output text prior to the performance of the pre-determined stylus action or gesture. In another aspect, when the generated word choice selection list is cancelled without selecting a replacement word, the identified word remains highlighted and the text insertion location is not restored to its former location in the output text so that other actions may be taken with respect to the still-highlighted identified word. In another aspect, when an input path is traced on the keyboard (or when a key is tapped) without selecting a replacement word from the generated word choice selection list, the word choice selection list is automatically cancelled, the text insertion location is not restored to its former location in the output text, and the text generated in response to the traced input path is sent to the text output region and, in accordance with the standard behavior of word processing programs, consequently replaces the previously output word by virtue of the fact that the previously output word is the currently highlighted text region. In another aspect, an input path is traced that corresponds to a "control-tap" gesture (as described below) and a control character is sent to the target text application. For example, a "control-tap" gesture corresponding to a control-B is performed and the target application receives the control-B and applies bold formatting to the highlighted previously output word. In another aspect, when the system detects that the user has scrolled the displayed text region such that the text insertion location is no longer visible on the display screen when the pre-determined stylus action or gesture is performed, the text insertion location is not restored to its former location in the output text when a replacement word is selected from the automatically generated word choice selection list. In another aspect, the various possible responses of the system to the pre-determined stylus action or gesture and subsequent actions (including, for example, the action of restoring the text insertion location to its former location in the output text) are determined by the user by selecting from among a set of system preferences.

These aspects of the system greatly increase the efficiency of its use for text input. The system inherently results in a relatively small number of incorrectly generated words that are more or less randomly scattered throughout the previously generated text. In most cases, the user simply needs to correct the incorrectly generated words, and continue entering text at the point where they paused to review the previously output text. The ability of the system to track and automatically restore the text insertion location provides a significant benefit to the user who would otherwise have to tediously move the text insertion location back to its original position. By making the error-recovery procedure extremely efficient, the system's overall efficiency is greatly enhanced in two ways. First, obviously, the occasional error becomes simple to correct and little time is consumed in the process, so the overall effective input speed is increased. Secondly, because the error-recovery process is so simple and easy, most users will tend to be less concerned about the possibility of recognition errors, and will consequently trace input paths more rapidly and with less concern for precision. This generally leads to faster overall input speeds.

In another aspect, the system detects when the user has tapped the screen within the text window or otherwise repositioned the text insertion cursor, and modifies automatic system behaviors (Context Change Detection). In one aspect, when the system detects that the cursor has been moved to a new context and auto-spacing is enabled, the system automatically disables the automatic output of a space prior to the first word output in the new context. In another aspect, when the system detects that the cursor has been moved to a new context and auto-spacing is enabled, the system examines the character to the left of the new cursor position, and when the character to the left of the cursor is a "whitespace" character, and/or when the cursor is positioned at the first character position of a text field, and/or when the text field is a password-entry field, the system automatically disables the automatic output of a space prior to the first word output in the new context. Similarly, when the system detects that the cursor has been moved to a new context, and automatic capitalization is enabled, when the first character other than white space to the left of the cursor is a sentence terminating character (for example, period and optionally question mark and/or exclamation point), then the system automatically capitalizes the first letter of the first word output in the new context.

In another aspect, the system detects and adapts to changes in one or more characteristics of the text output area in which generated text is inserted. The text output area in which generated text is inserted and displayed comprises the editing environment in which the text input system operates. The text input system may be used in a variety of editing environments, each of which has different characteristics to which the text input system adapts in order to improve performance or to satisfy other requirements. For example, in one aspect, the system detects that the current editing environment is a password field, and automatically suppresses the display of a word choice selection list so that the user's password is not inadvertently displayed in a public place. Again, in a password entry field, for security purposes, the user may choose to have the system automatically adjust certain thresholds and parameters so that the input path for a password must be entered with a greater level of precision. Conversely, the user may choose to allow password entry with a lower level of precision so that the password can be entered so quickly that it is more difficult for an observer to follow visually.

In another aspect, based on one or more characteristics of the editing environment, the system modifies which of one or more databases are searched, or which subset of words within a given database are regarded as valid potential matches for an input path. For example, the system detects that the editing environment is a field for entering a name from a list of contacts, and restricts the active database to one comprised of (or derived from) the names present in the list of contacts. In another example, a doctor may be filling out an automated form for a patient that includes a field for prescribing medication, and a special database of names of medications is searched to identify the word that best matches an input path entered when the current editing environment corresponds to such a field. Alternatively, additional characteristics are stored with words in database (such as the characteristic of whether or not a word present in the database may be used as a name, whether it is the name of a medication, what language the word is from, and so forth), and the system restricts the set of possible candidates to those with characteristics that are flagged as required according to the characteristics of the editing environment. In another aspect, two or more databases are active simultaneously, and characteristics of the editing environment are used to prioritize words matched from the various databases according to their associated characteristics. In another aspect, the numerical score calculated for a word is adjusted by a determined factor based on whether the word is associated with characteristics that are associated with the active editing environment. In another aspect, the system determines characteristics of the text in the neighborhood of the position of the text insertion location. For example, the system examines one or more of the previously output words immediately preceding the text insertion location and determines which natural language the word(s) belongs to, what part of speech is associated with the word(s), and so on. These characteristics allow the system to prioritize identified candidate words to those that are most likely in the current editing context, and allow the user to maintain a number of simultaneously active databases without the need to explicitly enable and disable specific databases.

While the embodiment of the invention has been illustrated and described, as noted above, many changes can be made without departing from the spirit and scope of the invention. For example, the input path can be analyzed with other methods, the database of words can be organized in other ways, and the path-matching component can use other algorithms to identify the most likely candidate words. The various important insights embodied in the invention enable text to be input using a touch-screen keyboard rapidly and efficiently using a familiar and constant keyboard arrangement, without having to lift the stylus from the touch-screen between entering each letter, and without having to pause or perform any other action than trace out a path that passes through or near each letter in sequence. The embodiments of the present invention enable the method disclosed to detect and appropriately respond to characteristics of the user's input actions that naturally result of the way that users will tend to interact with the input system. For example, users in general will tend to enter input paths more rapidly for words that they have entered more often or with which they are more familiar. This corresponds to words that tend to be used with higher frequency. The embodiments of the method also not only allow for the fact that input paths that are entered with greater speed tend to be entered less accurately, but also take advantage of the contra positive, that input paths that are entered with lesser speed tend to be entered more accurately. Any type of touch-screen may be used by the system, and the input device may be a stylus, a finger, or any tool that works as an input device on the touch-sensitive screen. Thus the scope of the method should be determined by the appended claims and their legal equivalents, rather than by the specific aspects described above.

The invention claimed is:

1. A method of inputting alphabetic text to an electronic device having a displayed keyboard, said displayed keyboard includes a set of keys wherein each letter of the alphabet is associated with at least one key, the method comprising:
    recording input path data corresponding to a trace of an input path on said displayed keyboard, wherein said input path data include an initial path location, a sequence of one or more locations along which said input path continues, and a final path location at which said input path terminates,
    identifying one or more words of a set of words stored in a database, one or more of said set of words associated with an indication of frequency of use, wherein one or more letters of each identified word are each associated with keys that are within a determined threshold distance of one or more determined points on said input path;
    comparing said input path with one or more of said identified words, wherein comparing includes comparing a sequence of locations of the keys associated with the letters comprising the spelling of a word with said input path;
    determining a first numerical score for one or more of the compared one or more words, wherein determining said numerical score for a word includes:
        determining two or more points along said input path, including at least one point at or near said initial path location and one point at or near said final path location, that are designated as points of inflection;
    for each of one or more of said keys associated with the letters comprising the spelling of said word, determining a corresponding matching point on said input path;
    calculating said numerical score from a function of one or more of the distances from each determined matching point on said input path to the location of the corresponding matched key associated with a letter of the compared word;
    determining one or more penalty amounts that are included in the calculation of said function when one or more of said designated points of inflection is not determined as a matching point for any key associated with a letter of the compared word;
    determining one or more penalty amounts that are included in the calculation of said function for each instance in which no corresponding matching point is determined for one or more keys associated with letters of the compared word;
    determining one or more penalty amounts that are included in the calculation of said function for each instance in which the order of the sequence along the input path of matching points does not correspond with the sequence of said associated letters in the spelling of the compared word;
    and establishing a relative ranking of the words according to the numerical score and the frequency associated with the word.

2. The method of claim 1, further comprising generating one of the identified one or more words as text to be input.

3. The method of claim 2, further comprising offering one or more of the highest ranked words of said determined relative ranking to the user for selection of the word to be generated as text to be input.

4. The method of claim 1, wherein the location of each said determined point of inflection along the path is described by a first set of coordinates including a horizontal and a vertical coordinate, and wherein each said key is at a location described by a second set of said coordinates, and wherein said each said distance is calculated as a function of the difference between said first and second horizontal coordinates and of the difference between said first and second vertical coordinates, and wherein said difference between said first and second vertical coordinates is modified by multiplying said vertical coordinate difference by a determined factor in calculating said distance.

5. The method of claim 4, wherein when a distance is calculated between a key in the top row of alphabetic keys in said displayed keyboard and a point of inflection that is at a location with a vertical coordinate that places it above a threshold vertical coordinate height on said keyboard, said difference between said first and second vertical coordinates is not modified in calculating said distance.

6. The method of claim 4, wherein when a distance is calculated between a key in the bottom row of alphabetic keys in said displayed keyboard and a point of inflection that is at a location with a vertical coordinate that places it below a threshold vertical coordinate height on said keyboard, said difference between said first and second vertical coordinates is not modified in calculating said distance.

7. The method of claim 1, further comprising:
    identifying a key associated with a letter in the spelling of the compared word and that is no more than a maximum threshold distance from a determined point along a segment of said input path that lies between two successive determined points of inflection along said input path;

matching said key with said determined point along said segment of said input path; and including the distance from said matched key to said matched determined point in said function of said distances in calculating said numerical score of said word.

8. The method of claim 7, wherein the distance from said matched key to said matched determined point is weighted according to one or more characteristics determined for said matched determined point before being included in said function of said distances.

9. The method of claim 8, wherein each point of inflection is of one of two or more types of points of inflection, and wherein recording the input path data as a sequence of locations further comprises:

recording each location as a point on a two-dimensional coordinate plane;

detecting when the sum of the absolute values of the rates of change of the rates of change of the two-dimensional coordinates in the recorded sequence of locations exceeds a determined threshold;

determining a path location point where said rate of change of the rate of change reaches a local maximum; and identifying a point of inflection of said first type at or near said determined path location point.

10. The method of claim 9, further comprising not identifying said point of inflection of said first type when said determined path location point is located no more than a determined threshold distance from the upper boundary of said displayed keyboard.

11. The method of claim 9, further comprising:

detecting when said determined path location point is located more than a determined threshold distance below the lower boundary of the lowest row of keys in said displayed keyboard that includes one or more alphabetic keys;

determining the preceding input path location point where the input path crosses below the lower boundary of the lowest row of keys in said displayed keyboard that includes one or more alphabetic keys; and identifying said point of inflection of said first type at or near said determined preceding input path location point.

12. The method of claim 9, further comprising:

identifying a point of inflection of a second type of said two or more types of points of inflection when at least two points of inflection of said first type are identified within a determined threshold distance of each other, and when the location determined as the weighted average of the locations of said identified at least two points of inflection of said first type is within a threshold distance of a repeated key, wherein said repeated key is a key that is associated with a letter of said candidate word that is repeated two or more times in succession in the spelling of said candidate word;

identifying said point of inflection of said second type as comprising said at least two points of inflection of said first type; and matching each said repeated key with said identified point of inflection of said second type.

13. The method of claim 12, wherein the location associated with said inflection point of said second type is determined as the weighted average of the locations of said identified at least two points of inflection of said first type comprising said point of inflection of said second type.

14. The method of claim 12, wherein when one of said at least two points of inflection of said first type comprises the location corresponding to said initial path location of said input path, a determined penalty amount is included in determining said first numerical score of said candidate word.

15. The method of claim 12, wherein when one of said at least two points of inflection of said first type comprises the location corresponding to said final path location of said input path, a determined penalty amount is included in determining said first numerical score of said candidate word.

16. The method of claim 12, wherein when said point of inflection of said second type comprises exactly two of said points of inflection of said first type, a determined penalty amount is included in determining said first numerical score of said candidate word.

17. The method of claim 12, wherein when one or more of said points of inflection of said second type are identified in an input path in which are identified no more than a determined threshold number of said points of inflection of said first type, a determined penalty amount is included in determining said first numerical score of said candidate word.

18. The method of claim 8, wherein the magnitude of the distance from a first key associated with a letter in a possible candidate word to a first matched point in the input path with which said first key is matched is adjusted according to a parameter determined with respect to a preceding key associated with the letter in the candidate word immediately preceding said letter and a preceding matched point in the input path with which said preceding key is matched, and with respect to a following key associated with the letter in the candidate word immediately following said letter and a following matched point in the input path with which said following key is matched.

19. The method of claim 18, wherein said parameter is determined as a function of the magnitude of the difference between:

the change in slope between a vector connecting said preceding key to said first key to a vector connecting said first key to said following key, and the change in slope between a vector connecting said preceding matched point to said first matched point to a vector connecting said first matched point to said following matched point.

20. The method of claim 18, wherein when said first matched point in the input path is a point on an input path segment that lies between two successive points of inflection, said first matched point is determined as the point that is within a predetermined maximum distance of the point on said input path segment that is closest to said first key, where a local maximum value is attained in the sum of the absolute values of the rates of change of the rates of change of the two-dimensional coordinates in the recorded sequence of locations.

21. The method of claim 18, wherein said parameter is determined as a function of a comparison between:

the ratio of the sum of the distance from said preceding key to said first key plus the distance from said first key to said following key, divided by the distance from said preceding key to said following key, and the ratio of the length of the trajectory along the input path from said preceding matched point to said following matched point, divided by the straight-line distance from said preceding matched point to said followed matching point.

22. The method of claim 8, wherein, in calculating said function of said distances, an adjustment is made to the magnitude of the distance from a first key associated with a letter in a candidate word to a first matched point in the input path with which said first key is matched, wherein said adjustment is calculated based on one or more parameters determined with respect to a second key associated with an adjacent letter in the candidate word and a second matched point in the input path with which said second key is matched.

23. The method of claim 22, wherein one of said parameters is determined as a function of a comparison of the slope of a line between said first key and said second key to the slope of a line between said first matched input path point and said second matched input path point.

24. The method of claim 22, further comprising:
calculating the value of one or more of said parameters for each pair of said first and second keys wherein said first and second keys are associated with adjacent letters in said candidate word;
determining one or more parameter values as a function of the calculated values; and
adjusting said numerical score of said candidate word as a function of one or more of said determined parameter values.

25. The method of claim 22, wherein one of said parameters is determined as a function of a comparison of the distance along a straight line between said first matched input path point and said second matched input path point to the distance along the actual input path between said first matched input path point and said second matched input path point.

26. The method of claim 25, further comprising reducing the magnitude of the adjustment made with respect to said determined parameter when said segment of said input path between said first matched input path point and said second matched input path point lies within a determined maximum threshold distance of the upper boundary of said displayed keyboard.

27. The method of claim 7, further comprising:
determining one or more penalty amounts that are included in the calculation of said function when one or more of said designated points of inflection is not determined as a matching point for any key associated with a letter of the compared word; and
determining one or more penalty amounts that are included in the calculation of said function for each instance in which no corresponding matching point is determined for one or more keys associated with letters of the compared word.

28. The method of claim 27, further comprising:
calculating and recording the average total penalty amount assessed against words generated as text to be input;
adjusting the magnitude of the effect of assessed penalty amounts on the calculation of said first numerical score by one or more calculations based on the value of said average total penalty amount.

29. The method of claim 28, further comprising:
classifying each input path as belonging to one of two or more classes of input paths;
calculating said average total penalty amounts separately for each class of input path;
adjusting the magnitude of the effect of assessed penalty amounts on the calculation of said first numerical score for words matched to an input path by one or more calculations based on the value of said average total penalty amount for the class to which said input path belongs.

30. The method of claim 27, wherein:
said database includes a set of one or more reference sequences of one or more letters;
each said reference sequence of one or more letters is associated with one or more mapped sequences of one or more letters;
each said associated mapped sequence of one or more letters comprises a sequence of letters that may appear in place of the sequence of letters of its associated reference sequence to form a misspelled version of a word in the database which includes said reference sequence of letters in its correct spelling;
when said first or second penalty amount is determined to be included in calculating the numerical score of said candidate word, and wherein said candidate word includes one or more of said reference sequences in its correct spelling, each of the one or more associated mapped sequences of letters is substituted for said included reference sequence of letters to form one or more alternate candidate words which are compared to said input path, and wherein when said first numerical score determined for one of said one or more alternate candidate words results in a higher ranking than said first numerical score determined for said original candidate word, the first numerical score determined for the original candidate word is replaced with the improved first numerical score determined for said higher ranked alternate candidate word.

31. The method of claim 30, wherein a determined penalty amount is associated with one or more of said mapped sequences of one or more letters, and wherein when one of said one or more of said mapped sequences is used to create said alternate candidate word, said determined penalty amount is included in the calculation of said first numerical score determined for said alternate candidate word.

32. The method of claim 30, wherein said set of one or more reference sequences of one or more letters includes one or more reference sequences that are designated as being of one or more of three types of reference sequences, said three types comprising:
word-initial reference sequences wherein the first letter of the reference sequence must correspond with the first letter of any word in which it appears;
word-final reference sequences wherein the last letter of the reference sequence must correspond with the last letter of any word in which it appears; and
word-internal reference sequences wherein both the first and last letters of the reference sequence must correspond with letters other than the first or last letter of any word in which it appears.

33. The method of claim 27, wherein a secondary numerical score is calculated for one or more of said identified one or more words, and wherein the calculation of said secondary numerical score of said identified one or more words does not include one or more of said determined penalty amounts that are included in the calculation of said first numerical score, and wherein the indication of frequency of use associated with said identified one or more words is not included in the calculation of said secondary numerical score.

34. The method of claim 33, wherein the initial indication of frequency associated with one or more words of the set of words stored in said database is proportional to the relative frequency with which the word is generally used in the language from which said words are taken.

35. The method of claim 34, wherein the magnitude of the effect that the indications of frequency of use associated with words in the database have on the determination of the numerical scoring for said words is modified when a word other than the highest ranked word is selected as text to be generated for input by the user.

36. The method of claim 35, wherein the magnitude of the effect that the indications of frequency of use associated with words in the database have on the determination of the numerical score for said words is not modified when said secondary numerical score determined for the word selected to be input as text by the user is no better than a determined threshold factor times said secondary numerical score determined for the highest ranked word.

37. The method of claim 35, wherein the magnitude of the effect that the indications of frequency of use associated with words in the database have on the determination of the numerical score for said words is not modified when the sum of the determined penalty amounts included in the calculation of the numerical score determined for said selected word is greater than a determined maximum threshold.

38. The method of claim 2, further comprising an editing environment wherein one or more words that are generated as text to be input are displayed in an output text area.

39. The method of claim 38, further comprising:
detecting one or more characteristics of said editing environment;
one or more of said words in said database are associated with an indication of one or more of said characteristics;
identifying one or more words stored in the database further comprises identifying whether each identified word is associated with an indication of one or more of said characteristics detected of said editing environment.

40. The method of claim 38, further comprising:
detecting one or more characteristics of said editing environment;
comparing said input path with one or more words of a set of words stored in a database further comprises comparing said input path with one or more words stored in two or more databases, wherein one or more of said two or more databases is associated with one or more of said characteristics;
identifying one or more words stored in the database further comprises identifying whether each identified word is stored in a database associated with an indication of one or more of said characteristics detected of said editing environment.

41. The method of claim 38, further comprising:
creating and maintaining a database comprising a list of one or more words previously generated as text to be input, wherein each of said words in said list is associated with one or more of the highest ranking alternate candidate words identified during the processing of the input path to which said stored word was compared;
detecting a distinctive control action performed on a displayed word in said output text area;
identifying said displayed word one of said stored words in said database list; and
offering one or more of said highest ranking alternate candidate words associated with said displayed word in said database for selection of the word to be generated as text to replace said displayed word in said output text area.

42. The method of claim 41, further comprising:
detecting and recording the position of the text insertion location in said editing environment;
restoring the text insertion location in said editing environment to its position immediately preceding a detection of said distinctive control action following the selection of one of said highest ranking alternate candidate words offered for selection.

43. The method of claim 2, wherein said comparing said input path includes detecting a determined pattern of movement in said input path, wherein:
said determined pattern of movement in said input path comprises an initial path location that is located within the boundaries of a key of said displayed keyboard that is associated with a letter, and
said determined pattern of movement in said input path further comprises a distinctive pattern of movement in said input path wherein the final path location of said input path is located outside the outer boundary of said displayed keyboard, and
said associated letter is generated as text to be input as the Control-character that is generated by an activation of said key simultaneously with the activation of the Control modifier key.

44. The method of claim 43, wherein said distinctive pattern of movement in said input path comprises tracing a path from said initial path location down to a point below the lower boundary of said displayed keyboard.

45. The method of claim 2, wherein said comparing said input path includes detecting a determined pattern of movement in said input path, wherein:
said determined pattern of movement in said input path comprises an initial path location that is located within the boundaries of a key of said displayed keyboard that is associated with a letter, and
said determined pattern of movement in said input path further comprises a distinctive pattern of movement in said input path wherein the final path location of said input path is outside the outer boundary of said displayed keyboard, and
said associated letter is generated as text to be input as the Alt-character that is generated by an activation of said key simultaneously with the activation of the Alt modifier key.

46. The method of claim 45, wherein said distinctive pattern of movement in said input path comprises tracing a path from said initial path location down to a point below the lower boundary of said displayed keyboard followed by at least one horizontal back and forth movement in said input path.

47. The method of claim 2, wherein said comparing said input path includes detecting a determined pattern of movement in said input path, wherein:
said determined pattern of movement comprises an initial path location that is located within the boundaries of a key of said displayed keyboard that is associated with a letter, and
said determined pattern of movement further comprises a distinctive pattern of movement in said input path wherein the final path location of said input path is outside the outer boundary of said displayed keyboard, and
said associated letter is generated as text to be input as the Control-Alt-character that is generated by an activation of said key simultaneously with the activation of the Control modifier key and the Alt modifier key.

48. The method of claim 1, further comprising:

detecting when the initial path location of a following input path is recorded within a determined threshold time interval after the time when the final path location of the immediately preceding input path was recorded;

forming a preceding input path according to said preceding recorded input path;

forming a combined input path according to said following input path and said preceding input path by concatenating said preceding input path and said following input path, wherein the final path location of said preceding input path is immediately followed by the initial path location of said following input path;

comparing each of said preceding input path and said combined input path with one or more words of a set of words stored in a database, one or more of said set of words associated with an indication of frequency, wherein comparing includes comparing a sequence of locations of the keys associated with the letters comprising the spelling of a word with at least one of said input paths;

for each of said two input paths, identifying one or more words stored in the database wherein one or more letters of the identified word are each associated with keys that are within a determined threshold distance of a determined point on said input path;

determining a first numerical score for each of the identified one or more words to establish a relative ranking of the words according to the comparison and the frequency associated with the word; and offering one or more of the highest ranked words for selection.

49. The method of claim 48, further comprising:

detecting when the ranking of the word selected as text to be generated for input is based upon a numerical score calculated by comparing said selected word to said preceding input path;

forming a following input path according to said following recorded input path;

comparing said following input path with one or more words of a set of words stored in a database, one or more of said set of words associated with an indication of frequency, wherein comparing includes comparing a sequence of locations of the keys associated with the letters comprising the spelling of a word with said following input path;

identifying one or more words stored in the database wherein one or more letters of the identified word are each associated with keys that are within a determined threshold distance of a determined point on said following input path; and determining a first numerical score for each of the identified one or more words to establish a relative ranking of the words according to the comparison and the frequency associated with the word.

50. The method of claim 1, in which one or more words of a set of words are stored in a database represented as strings of letters composed of an initial root string component and a final suffix string component.

51. The method of claim 50, further comprising:

comparing or more of said initial root string components present in said database with said input path, wherein comparing includes comparing a sequence of locations of the keys associated with the letters comprising the spelling of a root string component with said input path;

identifying one or more of said root string components wherein one or more letters of the identified root string component are each associated with keys that are within a determined threshold distance of a determined point on said input path;

determining a numerical score for each of the identified one or more root string components to establish a relative ranking of the root string components according to the comparison;

comparing or more of said final suffix string components present in said database with said input path, wherein comparing includes comparing a sequence of locations of the keys associated with the letters comprising the spelling of a suffix string component with said input path;

identifying one or more of said suffix string components wherein one or more letters of the identified suffix string component are each associated with keys that are within a determined threshold distance of a determined point on said input path; and determining a numerical score for each of the identified one or more suffix string components to establish a relative ranking of the suffix string components according to the comparison.

52. The method of claim 51, wherein said identifying one or more words stored in the database further comprises identifying one or more words stored in said database that are represented as strings of letters composed from an initial root string component for which said established relative ranking is higher than a determined root string component ranking threshold and from a final suffix string component for which said established relative ranking is higher than a determined suffix string component ranking threshold.

53. The method of claim 52, wherein said determined root string component ranking threshold and said determined suffix string component ranking threshold are determined for each identified word as functions of the indication of frequency of use stored with said identified word.

54. The method of claim 53, wherein one or more of said determined threshold distances, said determined root string component ranking threshold, and said determined suffix string component ranking threshold are all determined as functions of the setting of a single user adjustable control.

55. The method of claim 53, wherein when said numerical score determined for the highest ranked word is no better than a determined first numerical score threshold, one or more of said determined threshold distances, said determined root string component ranking threshold, and said determined suffix string component ranking threshold are increased and said comparing and identifying is repeated using said increased thresholds.

56. The method of claim 53, wherein one or more of said determined threshold distances, said determined root string component ranking threshold, and said determined suffix string component ranking threshold are increased and said comparing and identifying is repeated one or more times using said successively increased thresholds unless:

said numerical score determined for the highest ranked word is better than a determined first numerical score threshold;

the location of the key associated with the first letter comprising the spelling of said highest ranked word is within said determined threshold distance of said initial input path location;

the location of the key associated with the last letter comprising the spelling of said highest ranked word is within said determined threshold distance of said final input path location;

each key location of said sequence of locations of the keys associated with the letters comprising the spelling of said highest ranked word are within said determined threshold distance of a determined point on said input path; and the sequence of said determined points occur on said input path in the same sequence as said sequence of locations of said keys from which said respective distances are measured.

57. An apparatus comprising:

a device for presenting a displayed keyboard, said displayed keyboard includes a set of keys wherein each letter of the alphabet is associated with at least one key;

an input device which detects a trace of an input path on said displayed keyboard, said input path comprising a sequence of input path locations on or near said displayed keyboard;

an output device;

a database for storing words; and a processor coupled to the input device, the output device, and the database, the processor comprising:

a first component for recording input path data corresponding to a trace of an input path on said displayed keyboard, wherein said input path data include an initial path location, a sequence of one or more locations along which said input path continues, and a final path location at which said input path terminates;

a second component for identifying one or more words of a set of words stored in a database, one or more of said set of words associated with an indication of frequency of use, wherein one or more letters of each identified word are each associated with keys that are within a determined threshold distance of one or more determined points on said input path; and a third component for comparing said input path with one or more of said identified words, wherein comparing includes comparing a sequence of locations of the keys associated with the letters comprising the spelling of a word with said input path;

a fourth component for determining a numerical score for one or more of the compared one or more words, wherein determining said numerical score for a word includes:

determining two or more points along said input path, including at least one point at or near said initial path location and one point at or near said final path location, that are designated as points of inflection;

for each of one or more of said keys associated with the letters comprising the spelling of said word, determining a corresponding matching point on said input path;

calculating said numerical score from a function of one or more of the distances from each determined matching point on said input path to the location of the corresponding matched key associated with a letter of the compared word;

determining one or more penalty amounts that are included in the calculation of said function when one or more of said designated points of inflection is not determined as a matching point for any key associated with a letter of the compared word;

determining one or more penalty amounts that are included in the calculation of said function for each instance in which no corresponding matching point is determined for one or more keys associated with letters of the compared word;

determining one or more penalty amounts that are included in the calculation of said function for each instance in which the order of the sequence along the input path of matching points does not correspond with the sequence of said associated letters in the spelling of the compared word;

a fifth component for establishing a relative ranking of the words according to the comparison and the frequency associated with the word.

58. The apparatus of claim 57, further comprising:

a sixth component for presenting one or more of the ranked words on the output device.

59. The apparatus of claim 57, further comprising:

a sixth component for comparing the numerical scores determined for the highest ranked word and the second-highest ranked word; and a seventh component for selecting the highest ranked word as text to be generated for input when the comparison between the numerical scores exceeds a determined threshold.

* * * * *